(12) United States Patent
Minegishi et al.

(10) Patent No.: US 10,394,133 B2
(45) Date of Patent: Aug. 27, 2019

(54) LASER UNIT MANAGEMENT SYSTEM

(71) Applicant: GIGAPHOTON INC., Tochigi (JP)

(72) Inventors: Yuji Minegishi, Tochigi (JP); Yutaka Igarashi, Tochigi (JP); Takeshi Ohta, Tochigi (JP)

(73) Assignee: GIGAPHOTON INC., Tochigi (JP)

( * ) Notice: Subject to any disclaimer, the term of this patent is extended or adjusted under 35 U.S.C. 154(b) by 0 days.

(21) Appl. No.: 15/914,299

(22) Filed: Mar. 7, 2018

(65) Prior Publication Data

US 2018/0196347 A1 Jul. 12, 2018

Related U.S. Application Data

(63) Continuation of application No. PCT/JP2015/079421, filed on Oct. 19, 2015.

(51) Int. Cl.
*G03B 27/54* (2006.01)
*G03F 7/20* (2006.01)
(Continued)

(52) U.S. Cl.
CPC ........ *G03F 7/70508* (2013.01); *G03F 7/2002* (2013.01); *G03F 7/70025* (2013.01);
(Continued)

(58) Field of Classification Search
CPC ... H04L 63/102; H04L 63/105; H04L 67/306; G06F 21/604; G06F 21/6218;
(Continued)

(56) References Cited

U.S. PATENT DOCUMENTS

| | | | |
|---|---|---|---|
| 6,185,474 B1* | 2/2001 | Nakamura | G03F 7/70525 430/30 |
| 6,442,182 B1 | 8/2002 | Govorkov et al. | |
| 6,463,084 B1 | 10/2002 | Govorkov et al. | |
| 6,477,192 B2 | 11/2002 | Govorkov et al. | |
| 6,697,695 B1 | 2/2004 | Kurihara et al. | |
| 6,735,236 B2 | 5/2004 | Cybulski et al. | |

(Continued)

FOREIGN PATENT DOCUMENTS

| | | | |
|---|---|---|---|
| JP | 2001-135883 A | 5/2001 | |
| JP | 2002-043219 A | 2/2002 | |

(Continued)

OTHER PUBLICATIONS

International Search Report issued in PCT/JP2015/079421; dated Dec. 28, 2015.

(Continued)

*Primary Examiner* — Christina A Riddle
(74) *Attorney, Agent, or Firm* — Studebaker & Brackett PC

(57) ABSTRACT

A laser unit management system may include a server configured to hold first information provided with access limitation that allows an access with a first access authorization, second information provided with access limitation that allows an access with a second access authorization, and third information provided with access limitation that allows both an access with the first access authorization and an access with the second access authorization; and a laser unit including a laser output section and a controller, the laser output section being configured to output pulsed laser light toward an exposure unit that is configured to perform wafer exposure, the controller being configured to store the first information, the second information, and the third information in the server. The second information may include wafer-exposure-related information on the exposure unit and (Continued)

laser-control-related information on the laser unit that are in association with each other.

13 Claims, 41 Drawing Sheets

(51) Int. Cl.
*G06F 21/62* (2013.01)
*H01S 3/08* (2006.01)
*H01S 3/137* (2006.01)
*H01S 3/225* (2006.01)
*H01S 3/036* (2006.01)

(52) U.S. Cl.
CPC ...... *G03F 7/70483* (2013.01); *G03F 7/70491* (2013.01); *G03F 7/70575* (2013.01); *G03F 7/70725* (2013.01); *G03F 7/70775* (2013.01); *G06F 21/62* (2013.01); *H01S 3/036* (2013.01); *H01S 3/08009* (2013.01); *H01S 3/137* (2013.01); *H01S 3/225* (2013.01); *G06F 2221/2141* (2013.01)

(58) Field of Classification Search
CPC .... G06F 21/62; G06F 21/6209; G06F 21/629; G06F 21/64; G03F 7/2002; G03F 7/20; G03F 7/70025; G03F 7/70575; G03F 7/70775; G03F 7/70725; G03F 7/70033; G03F 7/70008; G03F 7/70141; G03F 7/70483; G03F 7/70491; G03F 7/70508; G03F 7/70525; G03F 7/70533; G03F 7/7055; G03F 7/70558; G03F 7/70975
USPC ........ 355/52, 53, 55, 67–71, 77; 726/4, 5, 6, 726/21, 27, 28; 707/783, 784, 785, 786; 711/163, 164; 250/492.1, 492.2, 492.22, 250/492.23, 493.1, 503.1, 505.1
See application file for complete search history.

(56) References Cited

U.S. PATENT DOCUMENTS

| | | | |
|---|---|---|---|
| 9,825,417 | B2 | 11/2017 | Kurosu et al. |
| 2002/0193901 | A1* | 12/2002 | Kikuchi .............. G03F 7/70025 700/121 |
| 2007/0143292 | A1* | 6/2007 | Nozaki ............... G06F 21/6227 |
| 2015/0168848 | A1* | 6/2015 | Tanaka ............... G03F 7/70041 355/67 |

FOREIGN PATENT DOCUMENTS

| | | |
|---|---|---|
| JP | 2002-084026 A | 3/2002 |
| JP | 2002-373847 A | 12/2002 |
| JP | 2003-503861 A | 1/2003 |
| JP | 2003-258337 A | 9/2003 |
| JP | 2003-283007 A | 10/2003 |
| JP | 2007-172041 A | 7/2007 |
| JP | 2008-134894 A | 6/2008 |
| WO | 2014/030645 A1 | 2/2014 |
| WO | 2015/068205 | 5/2015 |

OTHER PUBLICATIONS

International Preliminary Report on Patentability; issued in PCT/JP2015/079421; dated Dec. 28, 2015.
An Office Action issued by the Japanese Patent Office dated May 28, 2019, which corresponds to Japanese Patent Application No. 2017-546285 and is related to U.S. Appl. No. 15/914,299; with English Translation.

* cited by examiner

| WAFER NO. | SCAN NO. | PULSE NO. | TIME Time | ENERGY-CONTROL-RELATED DATA Db | | | | ENERGY-CONTROL-RELATED DATA Deg | | | SPECTRUM-CONTROL-RELATED DATA Dλc | | | GAS-CONTROL-RELATED DATA Dgs |
|---|---|---|---|---|---|---|---|---|---|---|---|---|---|---|
| | | | | H-DIRECTION BEAM WIDTH Bwh | V-DIRECTION BEAM WIDTH Bwv | H-DIRECTION BEAM POSITION Bch | V-DIRECTION BEAM POSITION Bcv | TARGET PULSE ENERGY Et | PULSE ENERGY E | CHARGING VOLTAGE V | TARGET WAVELENGTH λt | WAVELENGTH λ | SPECTRAL LINE WIDTH Δλ | GAS PRESSURE P |
| #1 | #1 | #1 | Time(1,1,1) | Bwh(1,1,1) | Bwv(1,1,1) | Bch(1,1,1) | Bcv(1,1,1) | Et(1,1,1) | E(1,1,1) | V(1,1,1) | λt(1,1,1) | λ(1,1,1) | Δλ(1,1,1) | P(1,1,1) |
| #1 | #1 | #2 | Time(1,1,2) | Bwh(1,1,2) | Bwv(1,1,2) | Bch(1,1,2) | Bcv(1,1,2) | Et(1,1,2) | E(1,1,2) | V(1,1,2) | λt(1,1,2) | λ(1,1,2) | Δλ(1,1,2) | P(1,1,2) |
| #1 | #1 | #3 | Time(1,1,3) | Bwh(1,1,3) | Bwv(1,1,3) | Bch(1,1,3) | Bcv(1,1,3) | Et(1,1,3) | E(1,1,3) | V(1,1,3) | λt(1,1,3) | λ(1,1,3) | Δλ(1,1,3) | P(1,1,3) |
| #1 | #1 | . | . | . | . | . | . | . | . | . | . | . | . | . |
| #1 | #2 | #1 | Time(1,2,1) | Bwh(1,2,1) | Bwv(1,2,1) | Bch(1,2,1) | Bcv(1,2,1) | Et(1,2,1) | E(1,2,1) | V(1,2,1) | λt(1,2,1) | λ(1,2,1) | Δλ(1,2,1) | P(1,2,1) |
| #1 | #2 | #2 | Time(1,2,2) | Bwh(1,2,2) | Bwv(1,2,2) | Bch(1,2,2) | Bcv(1,2,2) | Et(1,2,2) | E(1,2,2) | V(1,2,2) | λt(1,2,2) | λ(1,2,2) | Δλ(1,2,2) | P(1,2,2) |
| #1 | #2 | #3 | Time(1,2,3) | Bwh(1,2,3) | Bwv(1,2,3) | Bch(1,2,3) | Bcv(1,2,3) | Et(1,2,3) | E(1,2,3) | V(1,2,3) | λt(1,2,3) | λ(1,2,3) | Δλ(1,2,3) | P(1,2,3) |
| #1 | #2 | . | . | . | . | . | . | . | . | . | . | . | . | . |
| #1 | #3 | . | . | . | . | . | . | . | . | . | . | . | . | . |
| . | . | . | . | . | . | . | . | . | . | . | . | . | . | . |
| #w | #s | #p | Time(w,s,p) | Bwh(w,s,p) | Bwv(w,s,p) | Bch(w,s,p) | Bcv(w,s,p) | Et(w,s,p) | E(w,s,p) | V(w,s,p) | λt(w,s,p) | λ(w,s,p) | Δλ(w,s,k) | P(w,s,k) |
| . | . | . | | | | | | | | | | | . | . |

FIG. 7

| SHOT NO. | TIME Time | ENERGY-CONTROL-RELATED DATA Db | | | | ENERGY-CONTROL-RELATED DATA Deg | | | SPECTRUM-CONTROL-RELATED DATA Dλc | | | GAS-CONTROL-RELATED DATA Dgs | ECOLOGY-RELATED DATA Dec | | | |
|---|---|---|---|---|---|---|---|---|---|---|---|---|---|---|---|---|
| | | H-DIRECTION BEAM WIDTH Bwh | V-DIRECTION BEAM WIDTH Bwv | H-DIRECTION BEAM POSITION Bch | V-DIRECTION BEAM POSITION Bcv | TARGET PULSE ENERGY Et | PULSE ENERGY E | CHARGING VOLTAGE V | TARGET WAVELENGTH λt | WAVELENGTH λ | SPECTRAL LINE WIDTH Δλ | GAS PRESSURE P | CONSUMED Ar+Ne MIXED GAS AMOUNT $Q_{Ar+Ne}$ | CONSUMED Ar+Ne+$F_2$ MIXED GAS AMOUNT $Q_{Ar+Ne+F_2}$ | ELECTRIC POWER CONSUMPTION W | CONSUMED ELECTRIC POWER AMOUNT Wh |
| Shot(1) | Time(1) | Bwh(1) | Bwv(1) | Bch(1) | Bcv(1) | Et(1) | E(1) | V(1) | λt(1) | λ(1) | Δλ(1) | P(1) | $Q_{Ar+Ne}$(1) | $Q_{Ar+Ne+F_2}$(1) | W(1) | Wh(1) |
| Shot(2) | Time(2) | Bwh(2) | Bwv(2) | Bch(2) | Bcv(2) | Et(2) | E(2) | V(2) | λt(2) | λ(2) | Δλ(2) | P(2) | $Q_{Ar+Ne}$(2) | $Q_{Ar+Ne+F_2}$(2) | W(2) | Wh(2) |
| Shot(3) | Time(3) | Bwh(3) | Bwv(3) | Bch(3) | Bcv(3) | Et(3) | E(3) | V(3) | λt(3) | λ(3) | Δλ(3) | P(3) | $Q_{Ar+Ne}$(3) | $Q_{Ar+Ne+F_2}$(3) | W(3) | Wh(3) |
| Shot(4) | Time(4) | Bwh(4) | Bwv(4) | Bch(4) | Bcv(4) | Et(4) | E(4) | V(4) | λt(4) | λ(4) | Δλ(4) | P(4) | $Q_{Ar+Ne}$(4) | $Q_{Ar+Ne+F_2}$(4) | W(4) | Wh(4) |
| Shot(5) | Time(5) | Bwh(5) | Bwv(5) | Bch(5) | Bcv(5) | Et(5) | E(5) | V(5) | λt(5) | λ(5) | Δλ(5) | P(5) | $Q_{Ar+Ne}$(5) | $Q_{Ar+Ne+F_2}$(5) | W(5) | Wh(5) |
| Shot(6) | Time(6) | Bwh(6) | Bwv(6) | Bch(6) | Bcv(6) | Et(6) | E(6) | V(6) | λt(6) | λ(6) | Δλ(6) | P(6) | $Q_{Ar+Ne}$(6) | $Q_{Ar+Ne+F_2}$(6) | W(6) | Wh(6) |
| Shot(7) | Time(7) | Bwh(7) | Bwv(7) | Bch(7) | Bcv(7) | Et(7) | E(7) | V(7) | λt(7) | λ(7) | Δλ(7) | P(7) | $Q_{Ar+Ne}$(7) | $Q_{Ar+Ne+F_2}$(7) | W(7) | Wh(7) |
| Shot(8) | Time(8) | Bwh(8) | Bwv(8) | Bch(8) | Bcv(8) | Et(8) | E(8) | V(8) | λt(8) | λ(8) | Δλ(8) | P(8) | $Q_{Ar+Ne}$(8) | $Q_{Ar+Ne+F_2}$(8) | W(8) | Wh(8) |
| ... | ... | ... | ... | ... | ... | ... | ... | ... | ... | ... | ... | ... | ... | ... | ... | ... |
| Shot(n) | Time(n) | Bwh(n) | Bwv(n) | Bch(n) | Bcv(n) | Et(n) | E(n) | V(n) | λt(n) | λ(n) | Δλ(n) | P(n) | $Q_{Ar+Ne}$(n) | $Q_{Ar+Ne+F_2}$(n) | W(n) | Wh(n) |

FIG. 9

| SHOT TIME Time | ENERGY CONTROL PARAMETER Peg | | SPECTRUM CONTROL PARAMETER Pλc | | | | GAS CONTROL PARAMETER Pgs | | | ECOLOGY-RELATED PARAMETER Pec | | | |
|---|---|---|---|---|---|---|---|---|---|---|---|---|---|
| SHOT NO. | INITIAL CHARGING VOLTAGE V0 | PROPORTIONALITY COEFFICIENT OF CHARGING VOLTAGE Vk | INITIAL ROTATION STAGE ANGLE θ0 | WAVELENGTH COEFFICIENT λk | INITIAL LINEAR STAGE POSITION X0 | SPECTRAL LINE WIDTH PROPORTIONALITY COEFFICIENT Δλk | INJECTION COEFFICIENT OF Ar+Ne+F₂ mixed gas Khg | INJECTION COEFFICIENT OF Ar+Ne MIXED GAS Kpg | PARTIAL GAS EXCHANGE CYCLE Tpg | MEASUREMENT CYCLE Teco | CHARGING CAPACITOR CAPACITY C0 | GAS PRESSURE COEFFICIENT α | OFFSET CONSTANT β |
| Shot Time (1) | V0(1) | Vk(1) | θ0(1) | λk(1) | X0(1) | Δλk(1) | Khg(1) | Kpg(1) | Tpg(1) | Teco(1) | C0(1) | α(1) | β(1) |
| Shot Time (2) | V0(2) | Vk(2) | θ0(2) | λk(2) | X0(2) | Δλk(2) | Khg(2) | Kpg(2) | Tpg(2) | Teco(2) | C0(2) | α(2) | β(2) |
| Shot Time (3) | V0(3) | Vk(3) | θ0(3) | λk(3) | X0(3) | Δλk(3) | Khg(3) | Kpg(3) | Tpg(3) | Teco(3) | C0(3) | α(3) | β(3) |
| Shot Time (4) | V0(4) | Vk(4) | θ0(4) | λk(4) | X0(4) | Δλk(4) | Khg(4) | Kpg(4) | Tpg(4) | Teco(4) | C0(4) | α(4) | β(4) |
| Shot Time (5) | V0(5) | Vk(5) | θ0(5) | λk(5) | X0(5) | Δλk(5) | Khg(5) | Kpg(5) | Tpg(5) | Teco(5) | C0(5) | α(5) | β(5) |
| Shot Time (6) | V0(6) | Vk(6) | θ0(6) | λk(6) | X0(6) | Δλk(6) | Khg(6) | Kpg(6) | Tpg(6) | Teco(6) | C0(6) | α(6) | β(6) |
| Shot Time (7) | V0(7) | Vk(7) | θ0(7) | λk(7) | X0(7) | Δλk(7) | Khg(7) | Kpg(7) | Tpg(7) | Teco(7) | C0(7) | α(7) | β(7) |
| Shot Time (8) | V0(8) | Vk(8) | θ0(8) | λk(8) | X0(8) | Δλk(8) | Khg(8) | Kpg(8) | Tpg(8) | Teco(8) | C0(8) | α(8) | β(8) |
| ... | ... | ... | ... | ... | ... | ... | ... | ... | ... | ... | ... | ... | ... |
| Shot Time (n) | V0(n) | Vk(n) | θ0(n) | λk(n) | X0(n) | Δλk(n) | Khg(n) | Kpg(n) | Tpg(n) | Teco(n) | C0(n) | α(n) | β(n) |
| ... | ... | ... | ... | ... | ... | ... | ... | ... | ... | ... | ... | ... | ... |

FIG. 11

LASER UNIT MANAGEMENT SYSTEM

CROSS REFERENCE TO RELATED APPLICATIONS

The present application is a continuation application of International Application No. PCT/JP2015/079421 filed on Oct. 19, 2015. The content of the application is incorporated herein by reference in its entirety.

BACKGROUND

1. Technical Field

The present disclosure relates to a laser unit management system.

2. Related Art

With miniaturization and high integration of a semiconductor integrated circuit, an improvement in resolution has been demanded for a semiconductor exposure unit. Hereinafter, the semiconductor exposure unit is simply referred to as an "exposure unit". Shortening in a wavelength of light to be outputted from an exposure light source has been in progress accordingly. A gas laser unit is used in place of an existing mercury lamp for the exposure light source. Currently, a KrF excimer laser unit and an ArF excimer laser unit may be used as gas laser units for exposure. The KrF excimer laser unit may output ultraviolet light with a wavelength of 248 nm, and the ArF excimer laser unit may output ultraviolet light with a wavelength of about 193.4 nm.

As current exposure technology, liquid immersion exposure is practically used. In the liquid immersion exposure, a clearance between a projection lens on exposure unit side and a wafer is filled with a liquid to change a refractive index of the clearance, thereby shortening an apparent wavelength of light from the exposure light source. When the liquid immersion exposure is performed with use of the ArF excimer laser unit as the exposure light source, ultraviolet light with a wavelength of 134 nm in water is applied to the wafer. This technology is referred to as "ArF liquid immersion exposure". The ArF liquid immersion exposure is also referred to as "ArF liquid immersion lithography".

Since a spectral linewidth in free oscillation of each of the KrF excimer laser unit and the ArF excimer laser unit is wide, e.g., in a range from about 350 pm to about 400 pm, color aberration of laser light (ultraviolet light) that is reduced and projected on the water by the projection lens on the exposure unit side occurs, which results in decrease in resolution. It is therefore necessary to narrow a spectral linewidth of laser light to be outputted from the gas laser unit to an extent in which the color aberration is negligible. The spectral linewidth is also referred to as "spectral width". Accordingly, a line narrow module including a line narrowing device is provided in a laser resonator of the gas laser unit, which achieves narrowing of the spectral width. Non-limiting examples of the line narrowing device may include an etalon and a grating. The laser unit narrowed in spectral width in this way is referred to as "line narrowing laser unit". For example, reference is made to Japanese Unexamined Patent Application Publication No. 2003-258337, Japanese Unexamined Patent Application Publication No. 2003-283007, Japanese Unexamined Patent Application Publication (Published Japanese Translation of PCT Application) No. JP2003-503861, Japanese Unexamined Patent Application Publication No. 2001-135883, Japanese Unexamined Patent Application Publication No. 2002-084026, International Publication No. WO 2015/068205, and International Publication No. WO 2014/03064.5.

SUMMARY

A laser unit management system according to an aspect of the present disclosure may include a server configured to hold first information, second information, and third information, the first information being provided with access limitation that allows an access with a first access authorization, the second information being provided with access limitation that allows an access with a second access authorization, and the third information being provided with access limitation that allows both an access with the first access authorization and an access with the second access authorization; and a laser unit including a laser output section and a controller, the laser output section being configured to output pulsed laser light toward an exposure unit that is configured to perform wafer exposure, the controller being configured to store the first information, the second information, and the third information in the server. The second information may include wafer-exposure-related information on the exposure unit and laser-control-related information on the laser unit that are in association with each other.

BRIEF DESCRIPTION OF THE DRAWINGS

Some example embodiments of the present disclosure are described below as mere examples with reference to the accompanying drawings.

FIG. 7 schematically illustrates a data example of second information stored in the second data region of the server.

FIG. 9 schematically illustrates a data example of third information stored in the third data region of the server.

FIG. 11 schematically illustrates a data example of first information stored in the first data region of the server.

DETAILED DESCRIPTION

Figure 1:
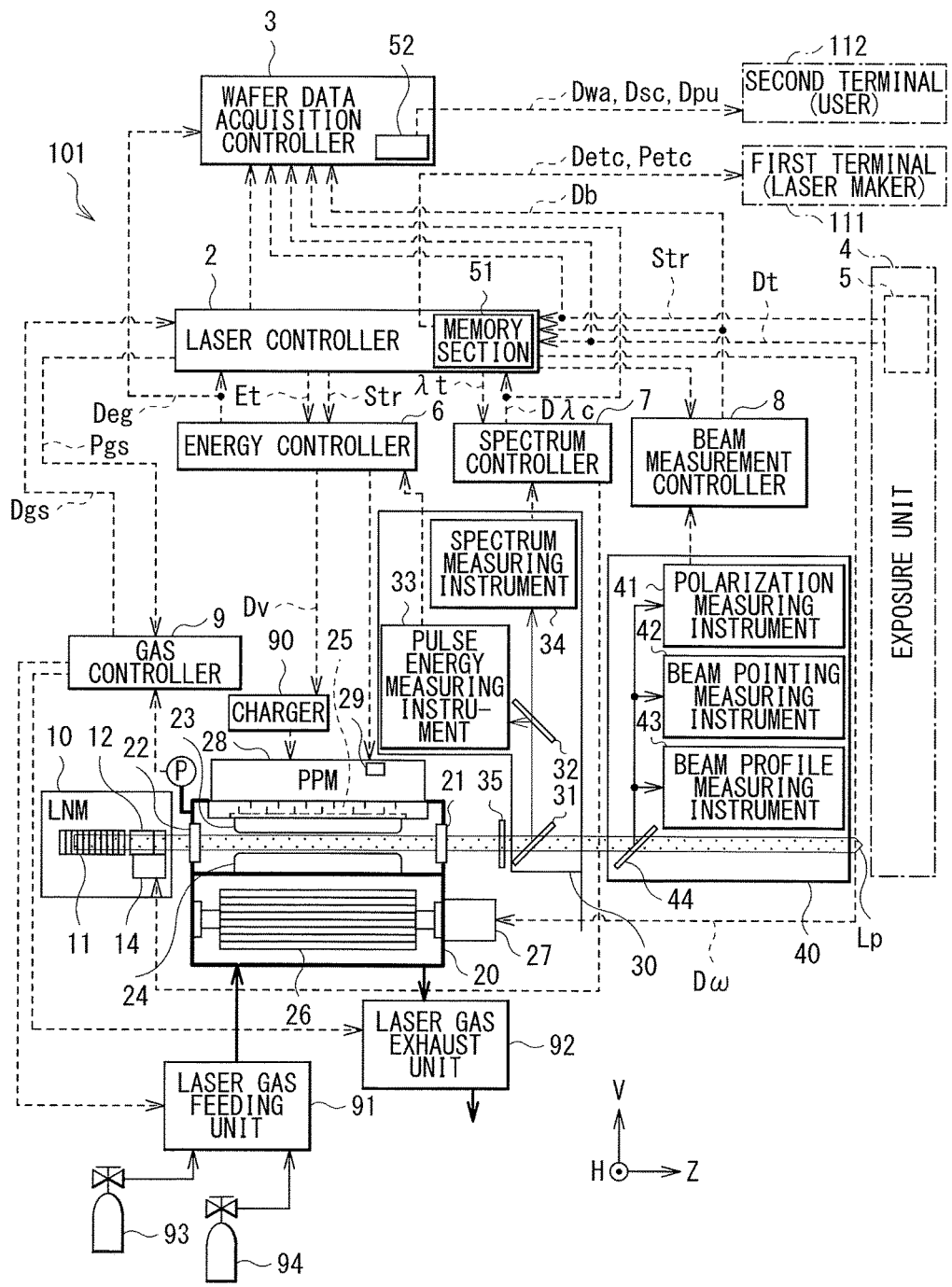
FIG. 1 schematically illustrates a configuration example of a laser unit management system according to a comparative example.

<Contents>
<1. Comparative Example> (Laser Unit Management System) (FIGS. 1 to 3)
  1.1 Configuration
  1.2 Operation
  1.3 Issues
<2. First Embodiment> (Laser Unit Management System Including Server)
  2.1 Outline of Laser Unit Management System Including Server (FIGS. 4 to 11)
    2.1.1 Configuration
    2.1.2 Operation
    2.1.3 Workings and Effects
  2.2 Beam Measurement System (FIGS. 12 to 19)
    2.2.1 Configuration
    2.2.2 Operation
  2.3 Energy Control System (FIGS. 20 and 21)
  2.4 Spectrum Control System (FIGS. 22 to 26)
    2.4.1 Configuration
    2.4.2 Operation
  2.5 Gas Control System (FIGS. 27 to 30)
  2.6 Other Control Systems (FIGS. 31 to 34)
    2.6.1 Configuration
    2.6.2 Operation
  2.7 Modification Examples (FIG. 35)
<3. Second Embodiment> (Laser Unit Management System Having Function of Changing Setting by User) (FIGS. 36 and 37)
  3.1 Configuration and Operation
  3.2 Workings and Effects <4. Third Embodiment> (Specific Examples of Components)
4.1 Specific Example of Monitor Module (FIGS. 38 and 39)
    4.1.1 Configuration
    4.1.2 Operation
4.2 Specific Example of Pulse Power Module (FIG. 40)
    4.2.1 Configuration
    4.2.2 Operation
<5. Hardware Environment of Controller> (FIG. 41)
<6. Et Cetera>

In the following, some example embodiments of the present disclosure are described in detail with reference to the drawings. Example embodiments described below each illustrate one example of the present disclosure and are not intended to limit the contents of the present disclosure. Further, all of the configurations and operations described in each example embodiment are not necessarily essential for the configurations and operations of the present disclosure. Note that like components are denoted by like reference numerals, and redundant description thereof is omitted.

1. Comparative Example

[1.1 Configuration] (Laser Unit Management System)

FIG. 1 schematically illustrates a configuration example of a laser unit management system according to a comparative example with respect to example embodiments of the present disclosure.

In the present specification, an optical path axis direction of laser light may correspond to a Z direction. Two directions substantially orthogonal to the Z direction may correspond to an H direction and a V direction. The H direction may correspond to a direction substantially orthogonal to a paper sheet in FIG. 1.

The laser unit management system according to the comparative example may include a laser unit 101, a first terminal 111, and a second terminal 112. The second terminal 112 may be a terminal such as a personal computer (PC) operated by a user of the laser unit 101 and an exposure unit 4. The first terminal 111 may be a terminal such as a PC operated by a laser maker of the laser unit 101.

The laser unit 101 may include a laser output section that outputs pulsed laser light Lp toward the exposure unit 4. The laser output section may include a laser chamber 20, a line narrow module (LNM) 10, and an output coupler mirror 35 serving as an outcoupler (OC). A laser gas may be supplied to the laser chamber 20.

The exposure unit 4 may be a unit that performs wafer exposure. The wafer exposure may include scan exposure. The "scan exposure" may be a method of exposing an exposure region of a wafer while scanning the exposure region with the pulsed laser light Lp.

The laser unit 101 may perform a burst operation in combination with the wafer exposure in the exposure unit 4. The "burst operation" may be an operation of alternately repeating a burst time period and an oscillation stop time period. In the burst time period, the pulsed laser light Lp having a narrowed band continuously oscillates in combination with the scan exposure, and in the oscillation stop time period, oscillation of the pulsed laser light Lp is stopped.

Figure 2:
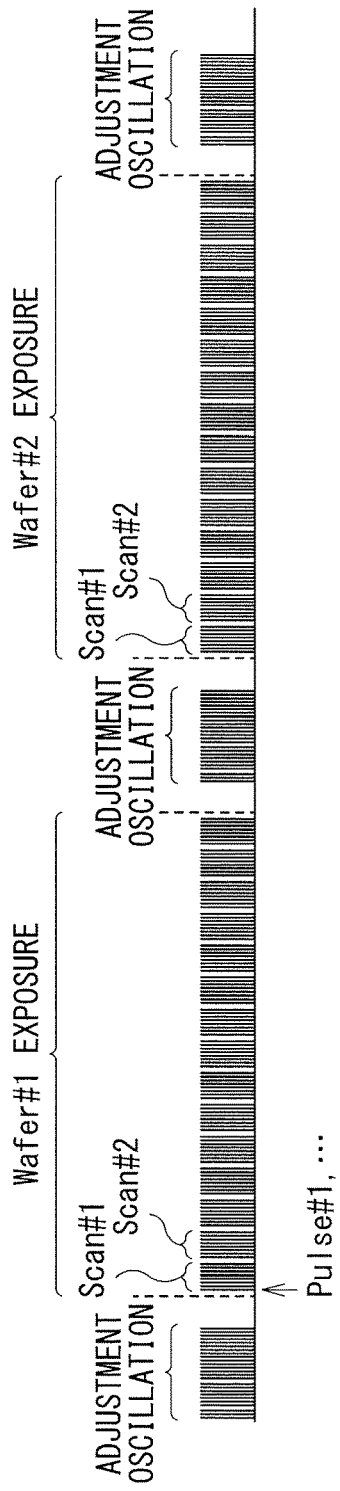
FIG. 2 schematically illustrates an example of an output timing of pulsed laser light to be outputted by a laser unit through a burst operation.
Figure 3:
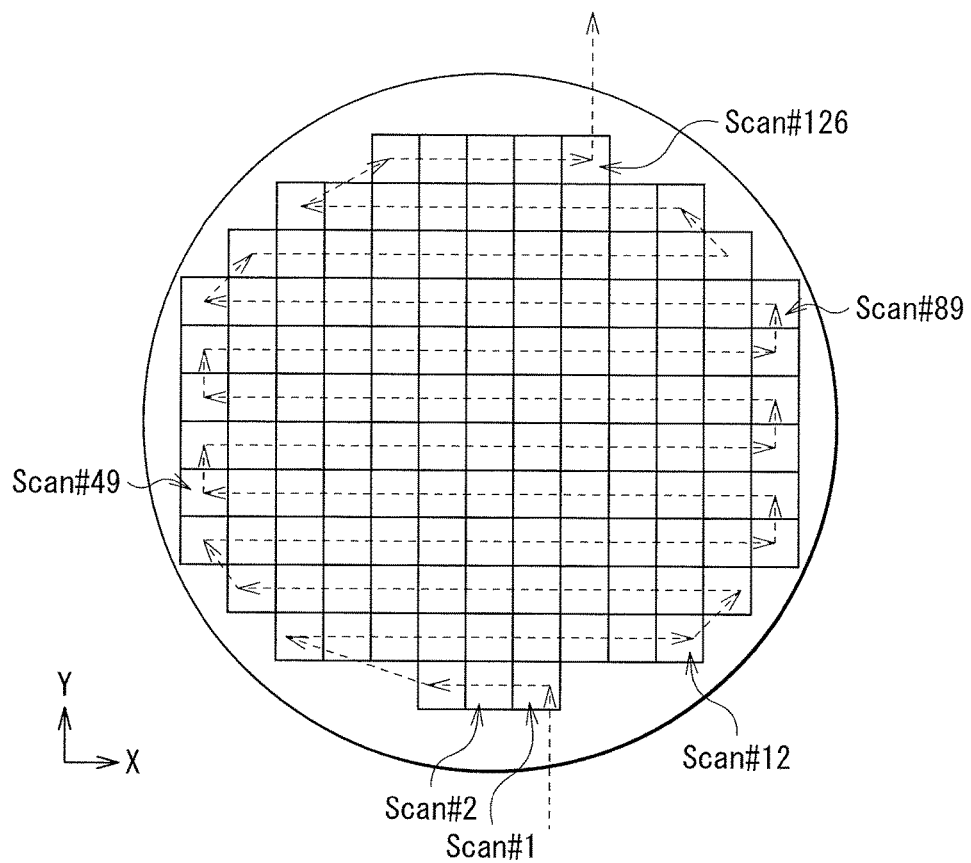
FIG. 3 schematically illustrates an outline of scan exposure.

Outlines of the burst operation and the wafer exposure are described below before description of a configuration of the laser unit management system. FIG. 2 schematically illustrates an example of an output timing of the pulsed laser light Lp to be outputted by the laser unit 101 through the burst operation. FIG. 3 schematically illustrates an outline of the scan exposure.

In FIG. 2, one vertical line indicates one pulse of the pulsed laser light Lp. As illustrated in FIG. 2, the laser unit 101 may first perform adjustment oscillation, and after a lapse of a predetermined time period, the laser unit 101 may perform the burst operation for exposure of a first wafer (Wafer #1). In the adjustment oscillation, the pulsed laser light Lp is not applied to a wafer, but oscillation may be performed to output the pulsed laser light Lp for adjustment. The pulsed laser light Lp may be outputted at a predetermined frequency, e.g., in a range from about several hundred Hz to about several kHz. In general, the burst operation in which the burst time period and the oscillation stop time period are repeated may be performed during the wafer exposure. The burst operation may be performed also during the adjustment oscillation. A zone where pulses are closely provided in FIG. 2 may correspond to the burst time period in which the pulsed laser light Lp is outputted continuously in a predetermined time period. Moreover, a zone where no pulse exists may correspond to the oscillation stop time period. It is to be noted that in the adjustment oscillation, each continuous output time period of pulses may not necessarily have a uniform length, and a continuous output operation may be performed while varying the length of each continuous output time period.

The exposure unit 4 may perform the exposure of the first wafer (Wafer #1) at a relatively long time interval after the adjustment oscillation. The wafer exposure may be performed by dividing the wafer into a plurality of predetermined exposure regions and performing the scan exposure of each of the exposure regions, as illustrated in FIG. 3. In other words, in the wafer exposure, a step of exposing be repeated such that a first predetermined exposure region of the wafer in a first scan exposure (Scan #1) is exposed, and then a second predetermined exposure region in a second scan exposure (Scan #2) is exposed. In a single scan exposure, the laser unit 101 may successively output a plurality of beams of the pulsed laser light Lp (Pulse #1, Pulse #2, . . . ). The scan exposure (Scan#2) of the second predetermined exposure region may be performed at a predetermined time interval after completion of the scan exposure (Scan #1) of the first predetermined exposure region. The scan exposure may be performed repeatedly and successively, and the scan exposure of the entire exposure region of the first wafer may be completed. Thereafter, the adjustment oscillation may be performed again, and then exposure of a second wafer (Wafer #2) may be performed.

The laser unit management system may be a system that acquires various data in the laser unit 101 for the wafer exposure described above, and manages such data.

Returning to FIG. 1, the configuration of the laser unit management system is described again below.

The laser unit 101 may further include a laser controller 2, a wafer data acquisition controller 3, an energy controller 6, a spectrum controller 7, a beam measurement controller 8, and a gas controller 9. The laser unit 101 may further include a monitor module (MM) 30, a beam position monitor (BPM) 40, a charger 90, a laser gas feeding unit 91, and a laser gas exhausting unit 92.

The laser chamber 20 may include windows 21 and 22, a pair of discharge electrodes 23 and 24, an electrical insulation member 25, a cross flow fan (CFF) 26, a motor 27, and a pulse power module (PPM) 28.

The electrical insulation member 25 may be, for example, alumina ceramics. The pulse power module 28 may include a switch 29, and may be coupled to the discharge electrode 23 via an unillustrated feedthrough of the electrical insulation member 25. The discharge electrode 24 may be coupled to the laser chamber 20 that is grounded.

The line narrow module 10 and the output coupler mirror 35 may configure an optical resonator. The laser chamber 20 may be so disposed as to allow discharge regions of the discharge electrodes 23 and 24 to be located in an optical path of the resonator. The output coupler mirror 35 may be coated with a multilayer film that reflects a part of laser light generated in the laser chamber 20 and allows a part of the laser light to pass therethrough.

The line narrow module 10 may include a grating 11, a prism 12, and a rotation stage 14.

The prism 12 may be so disposed as to allow a beam of the laser light outputted from the laser chamber 20 to be expanded by the prism 12 and enter the grating 11 at a predetermined angle.

The rotation stage 14 may be so disposed as to change an incident angle of the beam onto the grating 11 upon rotation of the prism 12. The grating 11 may be so disposed in Littrow arrangement as to allow the incident angle and a diffraction angle of the beam to be equal to each other.

The charger 90 and the pulse power module 28 may be electrically coupled to each other to allow for charging of a charging capacitor 612 having a capacity C0 of the pulse power module 28 illustrated in FIG. 40 to be described later. The charger 90 may receive charging voltage data Dv indicating a charging voltage V from the energy controller 6.

The laser controller 2 may receive a light emission trigger signal Str from the exposure unit controller 5 of the exposure unit 4. The energy controller 6 may receive the light emission trigger signal Str via the laser controller 2. The energy controller 6 and the pulse power module 28 may be electrically coupled to each other so as to allow the switch 29 to be turned on or off in synchronization with the light emission trigger signal Str.

The monitor module 30 may include beam splitters 31 and 32, a pulse energy measuring instrument 33, and a spectrum measuring instrument 34.

The beam splitter 31 may be disposed in an optical path of the pulsed laser light Lp outputted from the output coupler mirror 35. The beam splitter 32 may be disposed in an optical path of the pulsed laser light Lp reflected by the beam splitter 31. The beam splitter 32 may be so disposed as to allow reflected light to enter the pulse energy measuring instrument 33 and as to allow light having passed therethrough to enter the spectrum measuring instrument 34.

Figure 38:
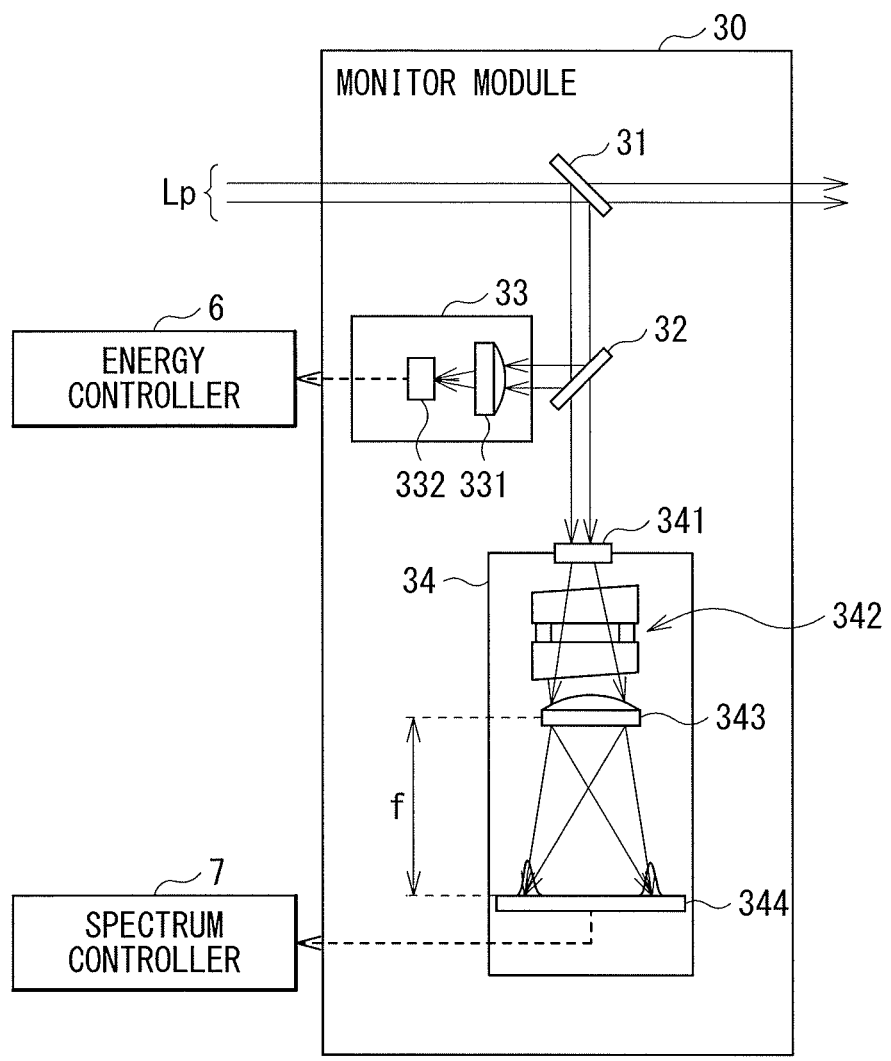
FIG. 38 schematically illustrates a configuration example of a monitor module in the laser unit management system according to the first embodiment or the second embodiment.

The pulse energy measuring instrument 33 may include a condenser lens 331 and an optical sensor 332, as illustrated in FIG. 38 to be described later. The optical sensor 332 may be a high-speed photodiode having resistance to ultraviolet light.

The spectrum measuring instrument 34 may be a spectrometer including an etalon, as illustrated in FIG. 38 to be described later.

The beam position monitor 40 may include a polarization measuring instrument 41, a beam pointing measuring instrument 42, a beam profile measuring instrument 43, and a beam splitter 44. The beam splitter 44 may be disposed in the optical path of the pulsed laser light Lp outputted from the output coupler mirror 35.

The beam measurement controller 8 may calculate beam-measurement-related data Db on the basis of image data measured by the beam position monitor 40. A signal line through which the beam-measurement-related data Db is transmitted to the laser controller 2 may be provided between the beam measurement controller 8 and the laser controller 2, and a signal line through which the beam-measurement-related data Db is transmitted to the wafer data acquisition controller 3 may be provided between the beam measurement controller 8 and the wafer data acquisition controller 3.

A signal line through which a stage angle control signal $S\theta$ is transmitted to the rotation stage 14 may be provided between the spectrum controller 7 and the rotation stage 14 of the line narrow module 10. The stage angle control signal $S\theta$ may be used to control a rotation stage angle $\theta$ of the rotation stage 14. The rotation stage angle $\theta$ of the rotation stage 14 may be controlled on the basis of a wavelength $\lambda$ detected by the spectrum measuring instrument 34.

Moreover, a signal line through which spectrum-control-related data $D\lambda c$ based on a result of measurement by the spectrum measuring instrument 34 is transmitted to the laser controller 2 and may be provided between the spectrum controller 7 and the laser controller 2, and a signal line through which the spectrum-control-related data $D\lambda c$ is transmitted to the wafer data acquisition controller 3 may be provided between the spectrum controller 7 and the wafer data acquisition controller 3.

A signal line through which the charging voltage data Dv indicating the charging voltage V is transmitted to the charger 90 may be provided between the energy controller 6 and the charger 90. The charging voltage V may be controlled on the basis of pulse energy E measured by the pulse energy measuring instrument 33. The charging voltage V may be a voltage used to charge a charging capacitor 610 illustrated in FIG. 40 to be described later of the pulse power module 28.

A signal line through which energy-control-related data Deg based on a result of measurement by the pulse energy measuring instrument 33 is transmitted to the laser controller 2 may be provided between the energy controller 6 and the laser controller 2, and a signal line through which the energy-control-related data Deg is transmitted to the wafer data acquisition controller 3 may be provided between the energy controller 6 and the wafer data acquisition controller 3.

A signal line through which gas-control-related data Dgs is transmitted to the laser controller 2 may be provided between the gas controller 9 and the laser controller 2.

The laser gas feeding unit 91 may be configured to feed, as a laser gas, an Ar+Ne mixed gas and an $Ar+Ne+F_2$ mixed gas into the laser chamber 20 on the basis of a control signal from the gas controller 9. The laser gas feeding unit 91 may be coupled to a gas cylinder 93 that feeds the Ar+Ne mixed gas and a gas cylinder 94 that feeds the $Ar+Ne+F_2$ mixed gas. The laser gas feeding unit 91 may include a valve that controls feeding of the Ar+Ne mixed gas from the gas cylinder 93 and a valve that controls feeding of the $Ar+Ne+F_2$ mixed gas from the gas cylinder 94.

The laser gas exhausting unit 92 may be configured to allow for exhausting of the laser gas contained in the laser chamber 20 on the basis of a control signal from the gas controller 9. The laser gas exhausting unit 92 may include a valve that controls exhausting, an exhaust pump, and a halogen filter. The halogen filter may trap an $F_2$ gas contained in an exhaust gas.

The wafer data acquisition controller 3 may include a memory section 52. Per-wafer data Dwa, per-scan data Dsc, and per-pulse data Dpu may be stored in the memory section 52. The per-wafer data Dwa, the per-scan data Dsc, the per-pulse data Dpu stored in the memory section 52 may be accessible from the second terminal 112.

The laser controller 2 may include a memory section 51. Various data Detc and data of various parameters Petc may be stored in the memory section 51. The various data Detc and the data of the various parameters Petc stored in the memory section 51 may be accessible from the first terminal 111.

A signal line through which data of a gas control parameter Pgs for gas control is transmitted to the gas controller 9 may be provided between the laser controller 2 and the gas controller 9.

A signal line through which data of target pulse energy Et for energy control is transmitted to the energy controller 6 may be provided between the laser controller 2 and the energy controller 6. Moreover, a signal line through which the light emission trigger signal Str is transmitted to the energy controller 6 may be provided between the laser controller 2 and the energy controller 6.

A signal line through which data of a target wavelength $\lambda t$ for spectrum control is transmitted to the spectrum controller may be provided between the laser controller 2 and the spectrum controller 7.

A signal line through which the light emission trigger signal Str is transmitted to the beam position monitor 40 may be provided between the laser controller 2 and the beam position monitor 40.

A signal line through which revolution data D$\omega$ for control of revolutions $\omega$ of the cross flow fan 26 is transmitted to the motor 27 of the laser chamber 20 may be provided between the laser controller 2 and the motor 27.

A signal line through which various target data Dt are transmitted to the data controller 2 may be provided between the exposure unit controller 5 and the laser controller 2. The various target data Dt may include the target pulse energy Et and the target wavelength $\lambda t$.

1.2 Operation

The laser controller 2 may receive the various target data Dt and the light emission trigger signal Str from the exposure unit controller 5.

(Energy Control)

The laser controller 2 may transmit data of the target pulse energy Et and the light emission trigger signal Str to the energy controller 6. The energy controller 6 may transmit the charging voltage data Dv to the charger 90. Moreover, the energy controller 6 may transmit an ON signal to the switch 29 of the pulse power module 28 in synchronization with the light emission trigger signal Str. Thus, in the laser chamber 20, a high voltage may be applied between the discharge electrodes 23 and 24 to cause an insulation breakdown of the laser gas in a discharge region between the discharge electrodes 23 and 24, thereby resulting in discharge. As a result, the laser gas may excite in the laser chamber 20 to cause laser oscillation between the line narrow module 10 and the output coupler mirror 3 that configure an optical resonator. The output coupler mirror 35 may output the pulsed laser light Lp resulting from the laser oscillation.

The beam splitter 31 and the beam splitter 32 may cause a part of the pulsed laser light Lp outputted from the output coupler mirror 35 to enter the pulse energy measuring instrument 33 as sample light used to detect the pulse energy E.

The pulse energy measuring instrument 33 may detect the pulse energy E of the pulsed laser light Lp outputted from the output coupler mirror 35. The pulse energy measuring instrument 33 may transmit data of the thus-detected pulse energy E to the energy controller 6.

The energy controller 6 may calculate a charging voltage V of a subsequent pulse on the basis of a difference $\Delta E$ between the pulse energy E and the target pulse energy Et, and may transmit the charging voltage data Dv indicating the charging voltage V to the charger 90. This makes it possible for the pulse energy E of the pulsed laser light Lp outputted from the output coupler mirror 35 to approach the target pulse energy Et.

At this occasion, the energy controller 6 may transmit the energy-control-related data Deg to the laser controller 2 and the wafer data acquisition controller 3. The energy-control-related data Deg may include, for example, the target pulse energy Et, the measured pulse energy E, and the charging voltage V.

(Spectrum Control)

The laser controller 2 may transmit data of the target wavelength $\lambda t$ and the light emission trigger signal Str to the spectrum controller 7. The spectrum controller 7 may measure the wavelength $\lambda$ and a spectral linewidth $\Delta\lambda$ of the pulsed laser light Lp outputted from the output coupler mirror 35 with use of the spectrum measuring instrument 34 of the monitor module 30.

The spectrum controller 7 may transmit the stage angle control signal S$\theta$ to the rotation stage 14 of the line narrow module 10 so as to cause a difference $\delta\lambda$ between the measured wavelength $\lambda$ and the target wavelength $\lambda t$ to approach zero on the basis of the difference $\delta\lambda$. The rotation stage angle $\theta$ of the rotation stage 14 may be controlled by the stage angle control signal S$\theta$. This makes it possible for the wavelength $\lambda$ of the pulsed laser light Lp outputted from the output coupler mirror 35 to approach the target wavelength $\lambda t$.

At this occasion, the spectrum controller 7 may transmit the spectrum-control-related data D$\lambda$c to the laser controller 2 and the wafer data acquisition controller 3. The spectrum-control-related data D$\lambda$c may include, for example, the target wavelength $\lambda t$, the measured wavelength $\lambda$ and the spectral linewidth $\Delta\lambda$.

(Beam Measurement Control)

The beam measurement controller 8 may analyze image data measured by each of the beam profile measuring instrument 43, the beam pointing measuring instrument 42, and the polarization measuring instrument 41 to calculate the beam-measurement-related data Db.

The beam measurement controller 8 may calculate, for example, beam widths (Bwh and Bwv) and beam positions (Bch and Bcv) as beam profiles in the H direction and the V direction on the basis of the image data measured by the beam profile measuring instrument 43. Moreover, the beam measurement controller 8 may calculate, for example, beam divergences (Bdh and Bdv) in the H direction and the V direction and beam pointings (Bph and Bpv) in the H direction and the V direction on the basis of the image data measured by the beam pointing measuring instrument 42. Further, the beam measurement controller 8 may calculate, for example, a polarization degree P on the basis of the image data measured by the polarization measuring instrument 41.

The beam measurement controller 8 may transmit these calculation data as the beam-measurement-related data Db to the laser controller 2 and the wafer data acquisition controller 3.

(Gas Control)

The gas controller 9 may perform gas pressure control and partial gas exchange control as gas control. The laser controller 2 may transmit the gas control parameter Pgs to the gas controller 9. The gas control parameter Pgs may include a parameter for gas pressure control and a parameter for partial gas exchange control. The gas control parameter Pgs for gas pressure control may include, for example, the charging voltage V, a maximum charging voltage Vmax, a minimum charging voltage Vmin, and a gas pressure variable amount ΔP. The gas control parameter Pgs for partial gas exchange control may include, for example, a partial gas exchange cycle Tpg, an injection coefficient Kpg of the Ar+Ne mixed gas, and an injection coefficient Khg of the Ar+Ne+$F_2$ mixed gas.

(Gas Pressure Control)

The gas pressure control by the gas controller 9 may be performed by a gas control system using the following properties. As laser gas pressure increases, an insulation breakdown voltage may rise to increase the pulse energy E of the pulsed laser light Lp outputted from the output coupler mirror 35. Conversely, as the laser gas pressure decreases, the insulation breakdown voltage may drop to decrease the pulse energy E of the pulsed laser light Lp outputted from the output coupler mirror 35.

The gas controller 9 may measure a gas pressure P in the laser chamber 20 with use of a pressure sensor. The gas controller 9 may transmit data of the gas pressure P to the laser controller 2.

In a case where the charging voltage V becomes the maximum charging voltage Vmax or higher, the gas controller 9 may control the laser gas feeding unit 91 so as to inject the Ar+Ne mixed gas into the laser chamber 20 to increase the gas pressure P by the gas pressure variable amount ΔP. Conversely, in a case where the charging voltage V becomes the minimum charging voltage Vmin or lower, the gas controller 9 may control the laser gas exhaust unit 92 so as to exhaust the gas contained in the laser chamber 20 to decrease the gas pressure P by the gas pressure variable amount ΔP.

(Partial Gas Exchange Control)

The partial gas exchange control by the gas controller 9 may be performed at fixed intervals, for example. In the partial gas exchange control, a predetermined amount of the Ar+Ne mixed gas and a predetermined amount of the Ar+Ne+$F_2$ mixed gas may be injected into the laser chamber 20, and thereafter the gas contained in the laser chamber 20 may be exhausted by the injected amounts of the gases. The partial gas exchange control may be performed to refill the laser chamber 20 with an $F_2$ gas by a decreased amount of the $F_2$ gas by discharge.

(Data Management)

The laser controller 2 may store, in the memory section 51, the various data Detc and data of various parameters Petc on a regular basis, e.g., at fixed time intervals or at every fixed shot number. The various data Detc may include, for example, one or more of the energy-control-related data Deg, the spectrum-control-related data Dλc, the gas-control-related data Dgs, and the beam-measurement-related data Db. The various parameters Petc may include one or more of various control parameters.

The laser maker may directly access the memory section 51 of the laser controller 2 from the first terminal 111 to acquire the various data Detc and the data of the various parameters Petc. Available data for disclosure to the user out of these data may be disclosed to the user.

The wafer data acquisition controller 3 may receive the light emission trigger signal Str having an exposure pattern as illustrated in FIG. 2 and measure a trigger time interval, thereby recognizing wafer-exposure-related information in the exposure unit 4. The wafer-exposure-related information may include a wafer number #w as wafer-identification information, a scan number #s as scan-identification information, and a pulse number #p as pulse identification information.

The wafer data acquisition controller 3 may perform a calculation process so as to cause the various data Detc and the data of the various parameters Petc mentioned above to be in association with the foregoing wafer-exposure-related information, and may store the various data Detc and the data of the various parameters Petc in the memory section 52.

The data stored in the memory section 52 may be accessible, as the per-wafer data Dwa, the per-scan data Dsc, and the per-pulse data Dpu, from the second terminal 112 by the user.

1.3 Issues

In the laser unit management system according to the comparative example, only available data for disclosure to the user out of the data acquired by the laser controller 2 may be disclosed to the user via the laser maker. The wafer-exposure-related information such as the wafer number #w and the scan number #s out of the data to be disclosed to the user may be recognized in the wafer data acquisition controller 3 by analysis of the pattern of the light emission trigger signal Str. However, in a method of recognizing the wafer number #w and the scan number #s by the analysis of the pattern of the light emission trigger signal Str, adjustment oscillation may cause a possibility of false recognition.

<2. First Embodiment> (Laser Unit Management System Including Server)

Next, description is given of a laser unit management system according to a first embodiment of the present disclosure. Note that substantially same components as the components of the laser unit management system according to the foregoing comparative example are denoted by same reference numerals, and redundant description thereof is omitted.

2.1 Outline of Laser Unit Management System Including Server (2.1.1 Configuration)

Figure 4:
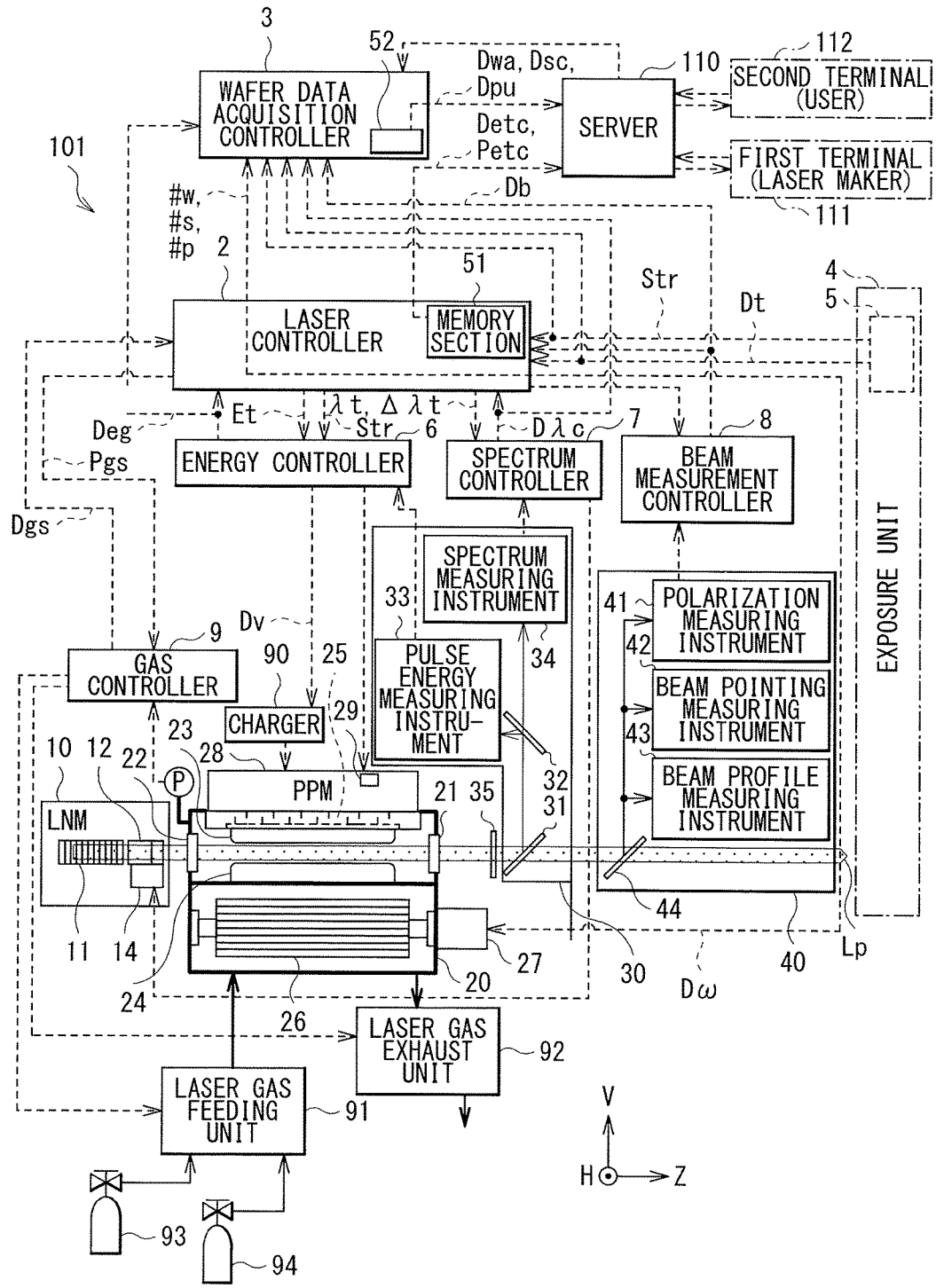
FIG. 4 schematically illustrates a configuration example of a laser unit management system according to a first embodiment.

FIG. 4 schematically illustrates a configuration example of the laser unit management system according to the first embodiment of the present disclosure.

The laser unit management system according to the present embodiment may include a laser unit 1, the first terminal 111, the second terminal 112, and a server 110.

The server 110 may be coupled to each of the laser unit 1, the first terminal 111, and the second terminal 112 through a network such as a local area network (LAN) and a wide area network (WAN). The server 110 may be disposed inside the laser unit 1. Moreover, the server 110 may be disposed in a semiconductor factory.

(Configuration of Laser Unit 1)

The laser unit 1 may differ from the laser unit 101 according to the foregoing comparative example in the following respects.

A signal line used to transmit data such as the various data Detc and the various parameters Petc stored in the memory section 51 to the server 110 and store the data in the server 110 may be provided between the memory section 51 of the laser controller 2 and the server 110.

A signal line used to transmit data such as the per-wafer data Dwa, the per-scan data Dsc, and the per-pulse data Dpu stored in the memory section 52 of the wafer data acquisition controller 3 to the server 110 and store the data in the server 110 may be provided between the memory section 52 and the server 110.

The per-wafer data Dwa, the per-scan data Dsc, and the per-pulse data Dpu may include the wafer-exposure-related information on the exposure unit 4 and laser-control-related information on the laser unit 1 that are in association with each other. The wafer-exposure-related information may include the wafer number #w as the wafer-identification information, the scan number #s as the scan-identification information, and the pulse number #p as the pulse identification information. Data of the laser-control-related information in association with the wafer-exposure-related information may include, for example, one or more of various control-related data such as the energy-control-related data Deg, the spectrum-control-related data Dλc, the gas-control-related data Dgs, and the beam-measurement-related data Db.

The memory section 52 may temporarily hold the per-wafer data Dwa, the per-scan data Dsc, and the per-pulse data Dpu. The per-wafer data Dwa may be data for each wafer upon the wafer exposure. The per-scan data Dsc may be data for each scan upon the scan exposure. The per-pulse data Dpu may be data for each pulsed laser light upon the scan exposure. A data storage time period in the memory section 52 may be a predetermined default time period. Moreover, the data storage time period in the memory section 52 may be settable and changeable from the second terminal 112 via the server 110.

A signal line through which a setting signal such as setting of the data storage time period in the memory section 52 is transmitted to the wafer data acquisition controller 3 may be provided between the server 110 and the wafer data acquisition controller 3.

A signal line through which the data of the wafer-exposure-related information including the wafer number #w, the scan number #s, and the pulse number #p is transmitted to the laser controller 2 may be provided between the exposure unit controller 5 and the laser controller 2. A signal line used to receive the wafer-exposure-related information by the wafer data acquisition controller 3 via the laser controller 2 may be provided between the laser controller 2 and the wafer data acquisition controller 3.

A signal line through which the gas-control-related data Dgs is transmitted to the wafer data acquisition controller 3 may be provided between the gas controller 9 and the wafer data acquisition controller 3.

A spectrum variable section 60 may be disposed in an optical path between the laser chamber 20 and the output coupler mirror 35. The spectrum variable section 60 may include a cylindrical concave lens 61, a cylindrical convex lens 62, and a linear stage 63.

The cylindrical concave lens 61 and the cylindrical convex lens 62 may be disposed in the optical path between the laser chamber 20 and the output coupler mirror 35. A lens clearance Dx between the cylindrical concave lens 61 and the cylindrical convex lens 62 may be changeable by the linear stage 63.

A signal line through which a stage position control signal Sx for control of a stage position X of the linear stage 63 is transmitted to the linear stage 63 may be provided between the spectrum controller 7 and the linear stage 63.

A signal line through which data of the target wavelength λt and a target spectral linewidth Δλt for spectrum control are transmitted to the spectrum controller 7 may be provided between the laser controller 2 and the spectrum controller 7.

(Configuration of Server 110)

Figure 5:
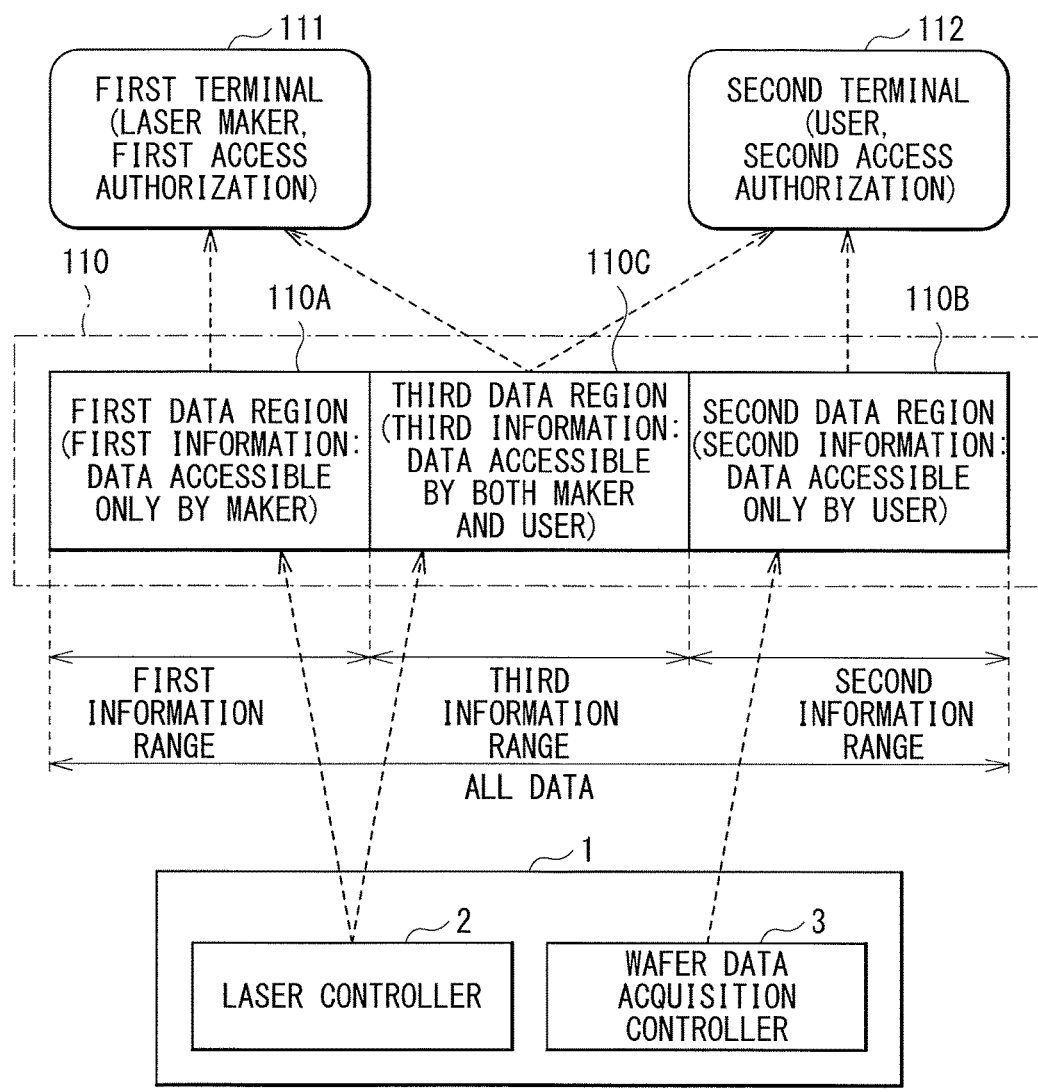
FIG. 5 schematically illustrates an example of a relationship between data regions of a server and access authorizations in the laser unit management system according to the first embodiment.

FIG. 5 schematically illustrates an example of a relationship between data regions of the server 110 and access authorizations.

The server 110 may hold various log data related to wafer exposure and laser control. The log data may include first information, second information, and third information. The first information, the second information, and the third information may be provided with access limitation that allows an access with different access authorizations.

The server 110 may be provided with a first data region 110A, a second data region 110B, and a third data region 110C. The first data region 110A may hold the first information. The second data region 110B may hold the second information. The third data region 110C may hold the third information.

The first data region 110A may be provided with access limitation that allows an access with only a first access authorization. The first access authorization may be an authorization of the laser maker using the first terminal 111. Thus, the first information may be accessible only by the laser maker having the first access authorization. The laser controller 2 may perform control to store the first information in the first data region 110A. The first information may include data of various parameters related to control of the laser unit 1. For example, one or more of data of the various control parameters such as the energy control parameter Peg, the spectrum control parameter Pλc, and the gas control parameter Pgs that are in association with a shot number may be included as the first information, as illustrated in FIG. 11 to be described later. Moreover, the first information may include data of an ecology-related parameter Pec in association with the shot number. Further, the first information may include data of a shot number and a total shot number of the pulsed laser light Lp, and data such as the beam measurement control parameter.

The second data region 110B may be provided with access limitation that allows an access with only a second access authorization. The second access authorization may be an authorization of the user using the second terminal 112. Thus, the second information may be accessible only by the user having the second access authorization. The water data acquisition controller 3 may perform control to store the second information in the second data region 110B. The second information may include the wafer-exposure-related information and the laser-control-related information that are in association with each other, as illustrated in FIG. 7 to be described later. The wafer-exposure-related information may include, for example, the wafer number #w, the scan number #s, and the pulse number #p, as described above. The data of the laser-control-related information in association with the wafer-exposure-related information may include, for example, one or more of various control-related data such as the energy-control-related data Deg, the spectrum-control-related data Dλc, the gas-control-related data Dgs, and the beam-measurement-related data Db, as described above.

Figure 34:
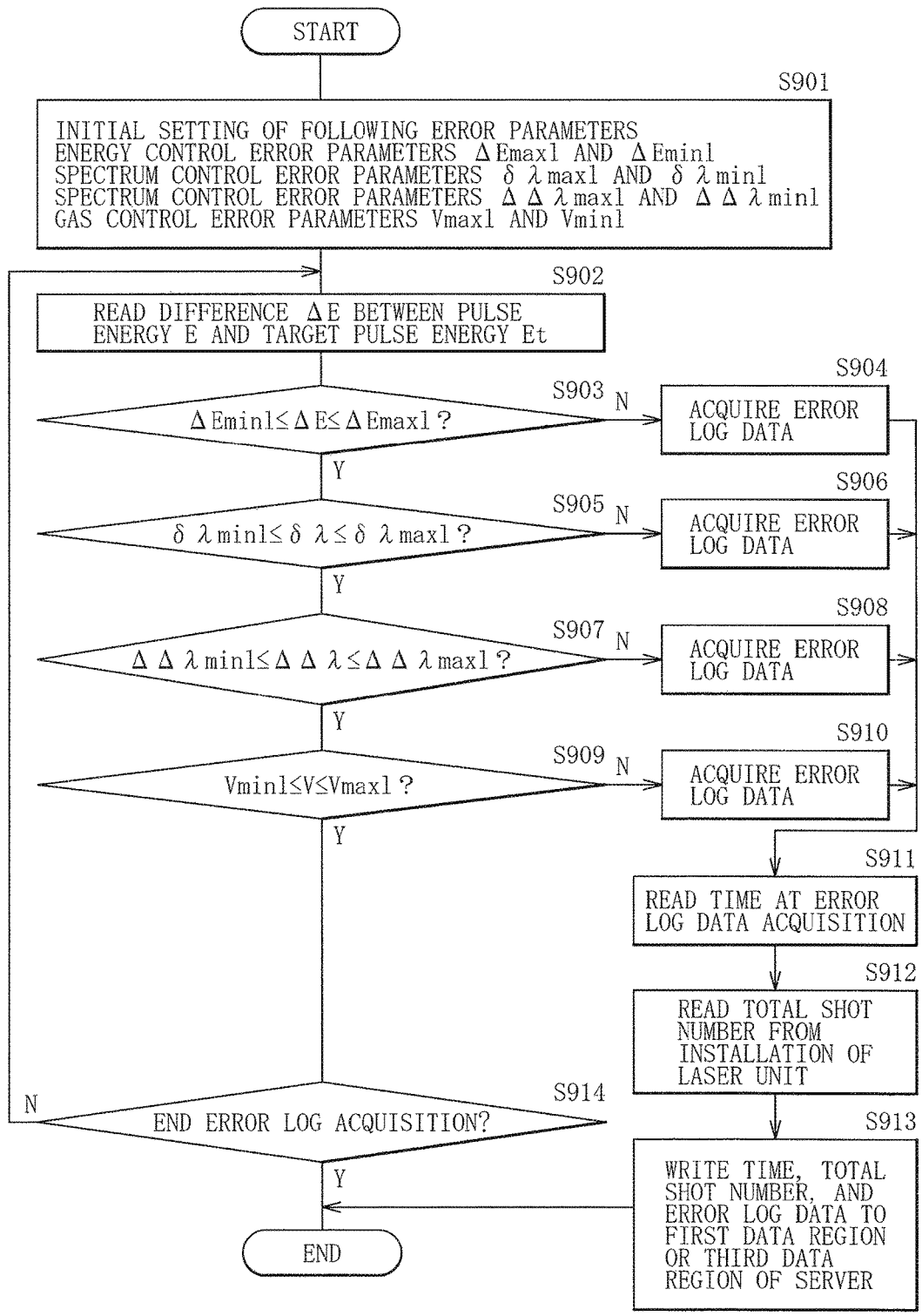
FIG. 34 is a flowchart illustrating an example of a flow of control involving error log acquisition by the laser controller in the laser unit management system according to the first embodiment.

The third data region 110C may be provided with access limitation that allows an access with both the first access authorization and the second access authorization. Thus, the third information may be accessible by both the laser maker having the first access authorization and the user having the second access authorization. The laser controller 2 may perform control to store the third information in the third data region 110C. The third information may include log data related to the laser unit 1. The third information may include, as the log data, the shot number of the pulsed laser light Lp and the laser-control-related information that are in association with each other. For example, the third information may include one or more of various control-related data such as the energy-control-related data Deg, the spectrum-control-related data Dλc, the gas-control-related data Dgs, and the beam-measurement-related data Db that are in association with the shot number, as illustrated in FIG. 9 to be described later. Moreover, the third information may include the ecology-related data Dec in association with the shot number. Further, the third information may include data of the shot number and the total shot number of the pulsed laser light Lp. Furthermore, the third information may include data of an error log, as illustrated in FIG. 34 to be described later.

Other configurations may be substantially similar to those of the laser unit management system according to the foregoing comparative example.

(2.1.2 Operation)
(Data Management)

The wafer data acquisition controller 3 may receive the foregoing various control-related data in synchronization with the wafer-exposure-related information such as the wafer number #w and the scan number #s transmitted from the exposure unit controller 5. The wafer data acquisition controller 3 may associate the received wafer-exposure-related information with the received various control-related data, and may temporarily store, as the per-wafer data Dwa, the per-scan data Dsc, and the per-pulse data Dpu, the wafer-exposure-related information and the various control-related data in the memory section 52.

The wafer data acquisition controller 3 may write, as the second information, the temporarily stored per-wafer data Dwa, the temporarily stored per-scan data Dsc, and the temporarily stored per-pulse data Dpu to the second data region 110B, which is accessible only by the user, of the server 110.

The laser controller 2 may store the energy-control-related data Deg, the spectrum-control-related data Dλc, the gas-control-related data Dgs, the beam-measurement-related data Db, the ecology-related data Dec, and the error log in the memory section 51 on a regular basis, e.g., at fixed time intervals or at every fixed shot number. The laser controller 2 may write, as the third information, these data stored in the memory section 51 to the third data region 110C, which is accessible by both the user and the laser maker, of the server 110 on a regular basis, e.g., at fixed time intervals or at every fixed shot number.

Moreover, the laser controller 2 may store data of the beam measurement control parameter, the energy control parameter Peg, the spectrum control parameter Pλc, the gas control parameter Pgs, and the ecology-related parameter Pec in the memory section 51 on a regular basis, e.g., at fixed time intervals or at every fixed shot number. The laser controller 2 may write, as the first information, the data of these parameters stored in the memory section 51 to the first data region 110A, which is accessible only by the laser maker, of the server 110 on a regular basis, e.g., at fixed time intervals or at every fixed shot number.

(Spectral Linewidth Control)

The laser controller 2 may transmit data of the target spectral linewidth Δλt and the light emission trigger signal Str to the spectrum controller 7. The spectrum controller 7 may measure the spectral linewidth Δλ of the pulsed laser light Lp outputted from the output coupler mirror 35 with use of the spectrum measuring instrument 34 of the monitor module 30.

The spectrum controller 7 may transmit the stage position control signal Sx to the linear stage 63 of the spectrum variable section 60 on the basis of a difference ΔΔλ between the measured spectral linewidth Δλ and the target spectral linewidth Δλt so as to cause the difference ΔΔλ to approach zero. The stage position X of the linear stage 63 may be controlled by the stage position control signal Sx. This makes it possible for the spectral linewidth Δλ of the pulsed laser light Lp outputted from the output coupler mirror 35 to approach the target spectral linewidth Δλt.

At this occasion, the spectrum controller 7 may transmit the spectrum-control-related data Dλc including the target spectral linewidth Δλt and the measured spectral linewidth Δλ to the laser controller 2 and the wafer data acquisition controller 3.

(Gas Control)

The gas controller 9 may transmit the gas-control-related data Dgs to both the wafer data acquisition controller 3 and the laser controller 2. The gas controller 9 may transmit, for example, data of the gas pressure P of the laser chamber 20 as the gas-control-related data Dgs to the wafer data acquisition controller 3.

(Control of Data Writing to Second Data Region 110B)

Figure 6:
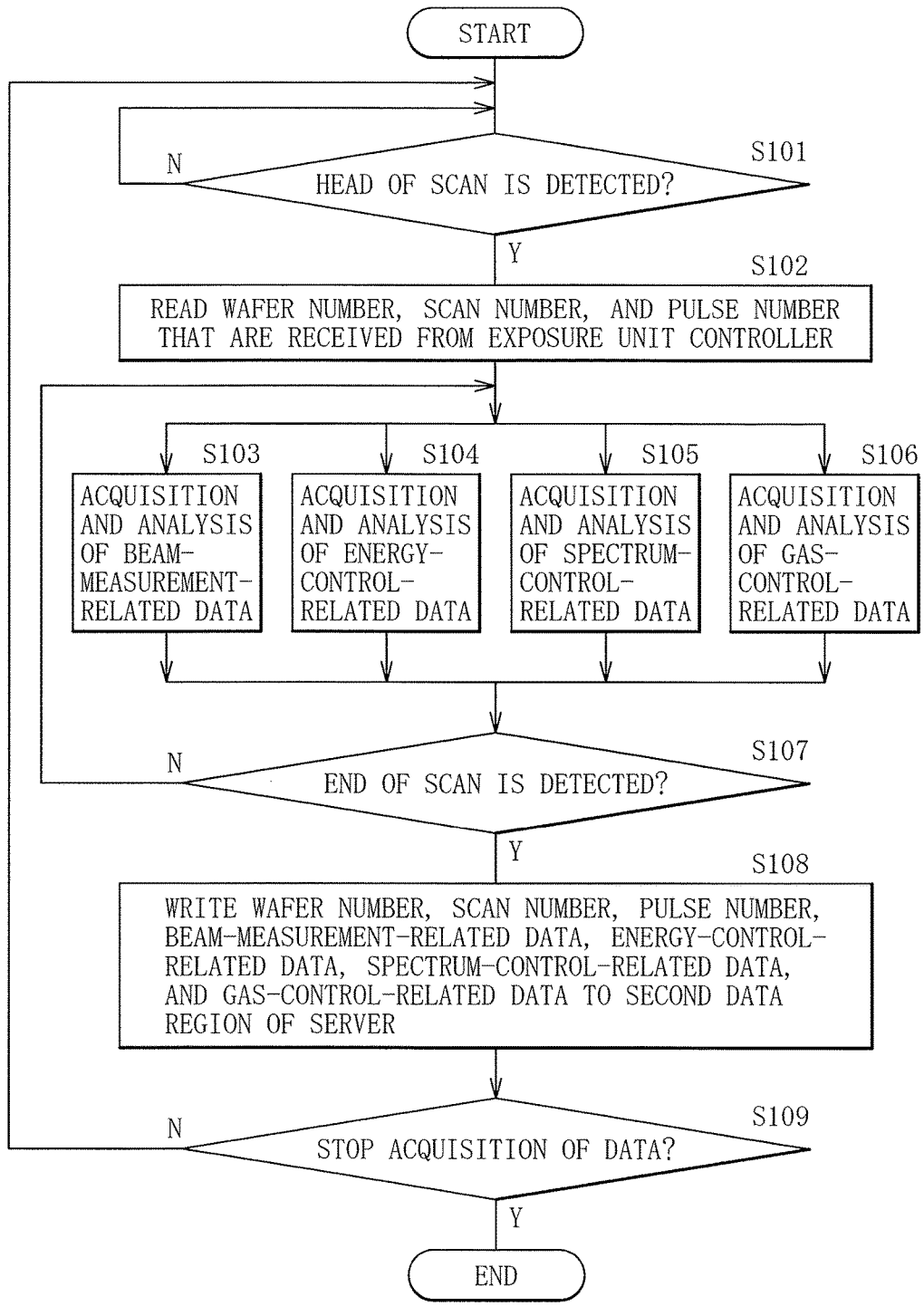
FIG. 6 is a flowchart illustrating an example of a flow of control of data writing to a second data region by a wafer data acquisition controller in the laser unit management system according to the first embodiment.

FIG. 6 is a flowchart illustrating an example of a flow of control of data writing to the second data region 110B by the wafer data acquisition controller 3.

The wafer data acquisition controller 3 may detect a head of a burst time period per wafer exposure as illustrated in FIG. 2. Detection of the head of the burst time period may be performed by determining whether a head of a scan is detected (step S101). For example, the wafer data acquisition controller 3 may receive a first scan number Scan#1 from the exposure unit controller 5 via the laser controller 2, thereby detecting the head of the scan. Moreover, the wafer data acquisition controller 3 may measure an oscillation stop time period to detect a head pulse after a predetermined time period or longer, e.g., after the oscillation stop time period of 0.1 s or longer, thereby detecting the head of the burst time period.

In a case where the wafer data acquisition controller 3 determines that the head of the scan is not detected (step S101; N), the wafer data acquisition controller 3 may repeat the process in the step S101.

In contrast, in a case where the wafer data acquisition controller 3 determines that the head of the scan is detected (step S101; Y), the wafer data acquisition controller 3 may next read the wafer number #w, the scan number #s, and the pulse number #p that are received from the exposure unit controller 5 via the laser controller 2 (step S102).

Next, the wafer data acquisition controller 3 may perform one or more of processes in steps S103 to S106. The wafer data acquisition controller 3 may perform acquisition and analysis of the beam-measurement-related data Db as the process in the step S103. The wafer data acquisition controller 3 may perform acquisition and analysis of the energy-control-related data Deg as the process in the step S104. The wafer data acquisition controller 3 may perform acquisition and analysis of the spectrum-control-related data Dλc as the process in the step S105. The wafer data acquisition controller 3 may perform acquisition and analysis of the gas-control-related data Dgs as the process in the step S106.

Subsequently, the wafer data acquisition controller 3 may detect an end of the burst time period. Detection of the end of the burst time period may be performed by determining whether an end of the scan is detected (step S107). For example, the wafer data acquisition controller 3 may detect the end of the scan in a case where an effective scan number is not transmitted from the exposure unit controller 5. Moreover, the wafer data acquisition controller 3 may measure the oscillation stop time period and detect a predetermined time period or longer, e.g., the oscillation stop time period of 0.1 s or longer, thereby detecting the end of the burst time period.

In a case where the wafer data acquisition controller 3 determines that the end of the scan is not detected (step S107; N), the wafer data acquisition controller 3 may repeat the process in the step S107.

In contrast, in a case where the wafer data acquisition controller 3 determines that the end of the scan is detected (step S107; Y), the wafer data acquisition controller 3 may write acquired and analyzed data to the second data region 110B, which is accessible only by the user, of the server 110 (step S108). The data acquired and analyzed by the wafer data acquisition controller 3 may include the wafer number #w, the scan number #s, and the pulse number #p. The data acquired and analyzed by the wafer data acquisition controller 3 may include the beam-measurement-related data Db, the energy-control-related data Deg, the spectrum-control-related data Dλc, and the gas-control-related data Dgs for each pulse. FIG. 7 illustrates an example of data written to the second data region 110B of the server 110.

Next, the wafer data acquisition controller 3 may determine whether to stop acquisition of data (step S109). In a case where the wafer data acquisition controller 3 determines not to stop the acquisition of data (step S109; N), the wafer data acquisition controller 3 may return to the process in the step S101. In contrast, in a case where the water data acquisition controller 3 determines to stop the acquisition of the data (step S109; Y), the water data acquisition controller 3 may end the process of the acquisition of data.

(Control of Data Writing to Third Data Region 110C)

Figure 8:
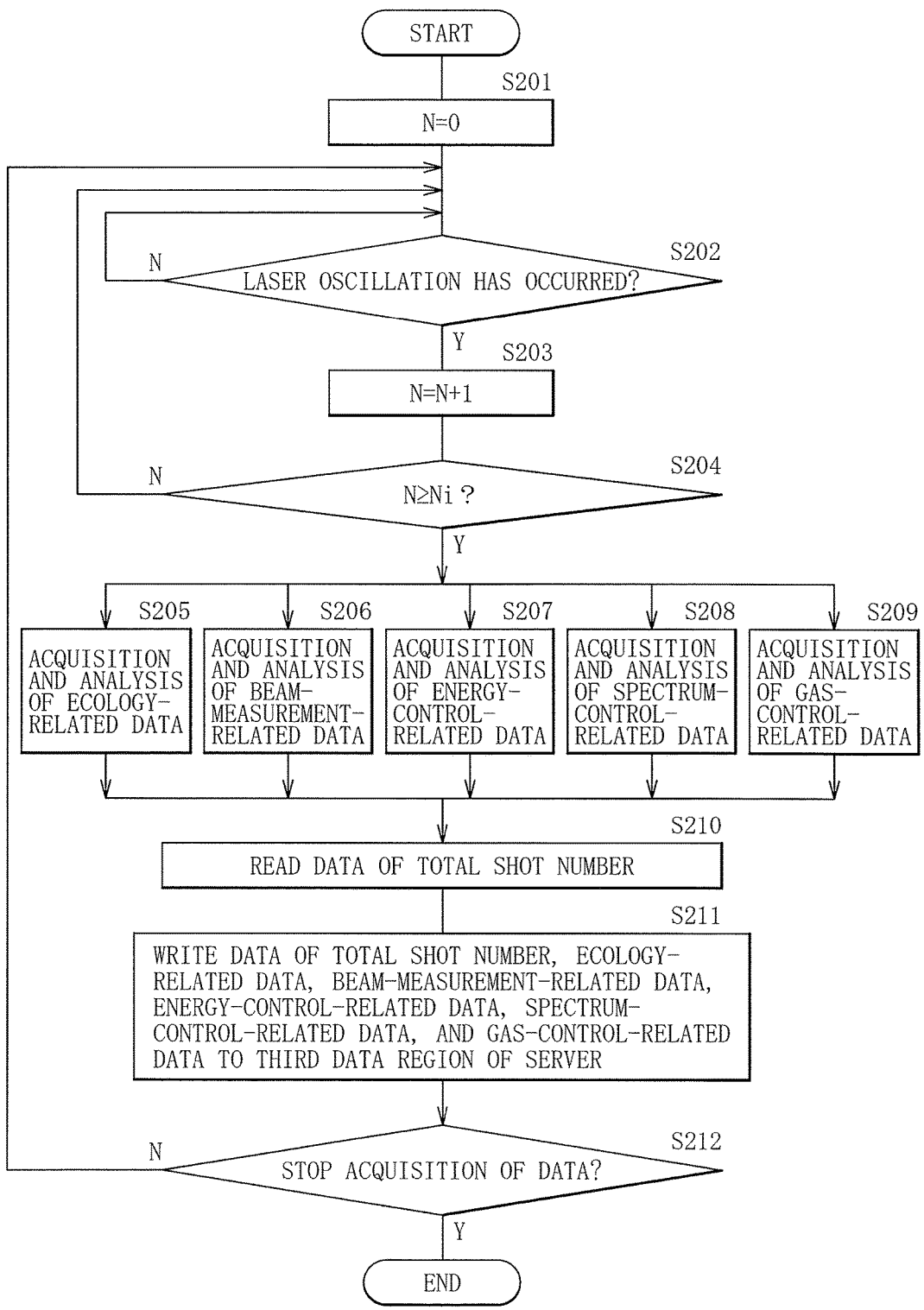
FIG. 8 is a flowchart illustrating an example of a flow of control of data writing to a third data region by a laser controller in the laser unit management system according to the first embodiment.

FIG. 8 is a flowchart illustrating an example of a flow of control of data writing to the third data region 110C by the laser controller 2.

The laser controller 2 may set an initial value of a counter value N of the pulse number to zero (step S201). Next, the laser controller 2 may determine whether laser oscillation has occurred (step S202). The laser controller 2 may determine whether laser oscillation has occurred, on the basis of, for example, the light emission trigger signal Str from the exposure unit controller 5.

In a case where the laser controller 2 determines that the laser oscillation has not occurred (step S202; N), the laser controller 2 may repeat the process in the step S202.

In contrast, in a case where the laser controller 2 determines that the laser oscillation has occurred (step S202; Y), the laser controller 2 may next set the counter value N of the pulse number to N+1 (step S203).

Subsequently, the laser controller 2 may determine whether the counter value N of the pulse number reaches a predetermined shot number Ni (step S204). At this occasion, the predetermined shot number Ni may be, for example, 1000000 or 6000000 as a value of the pulse number. In a case where the laser controller 2 determines that the counter value N of the pulse number does not reach the predetermined shot number Ni (Step S204; N), the laser controller 2 may return to the process in the step S202.

In contrast, in a case where the laser controller 2 determines that the counter value N of the pulse number reaches the predetermined shot number Ni (Step S204; Y), the laser controller 2 may next perform one or more of processes in steps S205 to S209.

The laser controller 2 may perform acquisition and analysis of the ecology-related data Dec as the process in the step S205. The laser controller 2 may perform acquisition and analysis of the beam-measurement-related data Db as the process in the step S206. The laser controller 2 may perform acquisition and analysis of the energy-control-related data Deg as the process in the step S207. The laser controller 2 may perform acquisition and analysis of the spectrum-control-related data Dλc as the process in the step S208. The laser controller 2 may perform acquisition and analysis of the gas-control-related data Dgs as the process in the step S209.

Next, the laser controller 2 may read data of the total shot number (step S210). The total shot number herein may be a total shot number from installation of the laser unit 1. The laser unit 1 may include a counter for counting of the total shot number.

Subsequently, the laser controller 2 may write acquired and analyzed data to the third data region 110C, which is accessible by both the user and the laser maker, of the server 110 (step S211). The data acquired and analyzed by the laser controller 2 may include data of the total shot number. Moreover, the data acquired and analyzed by the laser controller 2 may include the shot number of the pulsed laser light Lp and the laser-control-related information that are in association with each other. The data acquired and analyzed by the laser controller 2 may include, for example, the beam-measurement-related data Db, the energy-control-related data Deg, the spectrum-control-related data Dλc, and the gas-control-related data Dgs for each shot. FIG. 9 illustrates an example of data written to the third data region 110C of the server 110. As can be seen from comparison with a data example in FIG. 7, the data to be written to the third data region 110C may not include the wafer-exposure-related information such as the wafer number #w and the scan number #s.

Next, the laser controller 2 may determine whether to stop acquisition of data (step S212). In a case where the laser controller 2 determines not to stop the acquisition of data (step S212; N), the laser controller 2 may return to the step S202. In contrast, in a case where the laser controller 2 determines to stop the acquisition of data (step S212; Y), the laser controller 2 may end the process of the acquisition of data.

(Control of Data Writing to First Data Region 110A)

Figure 10:
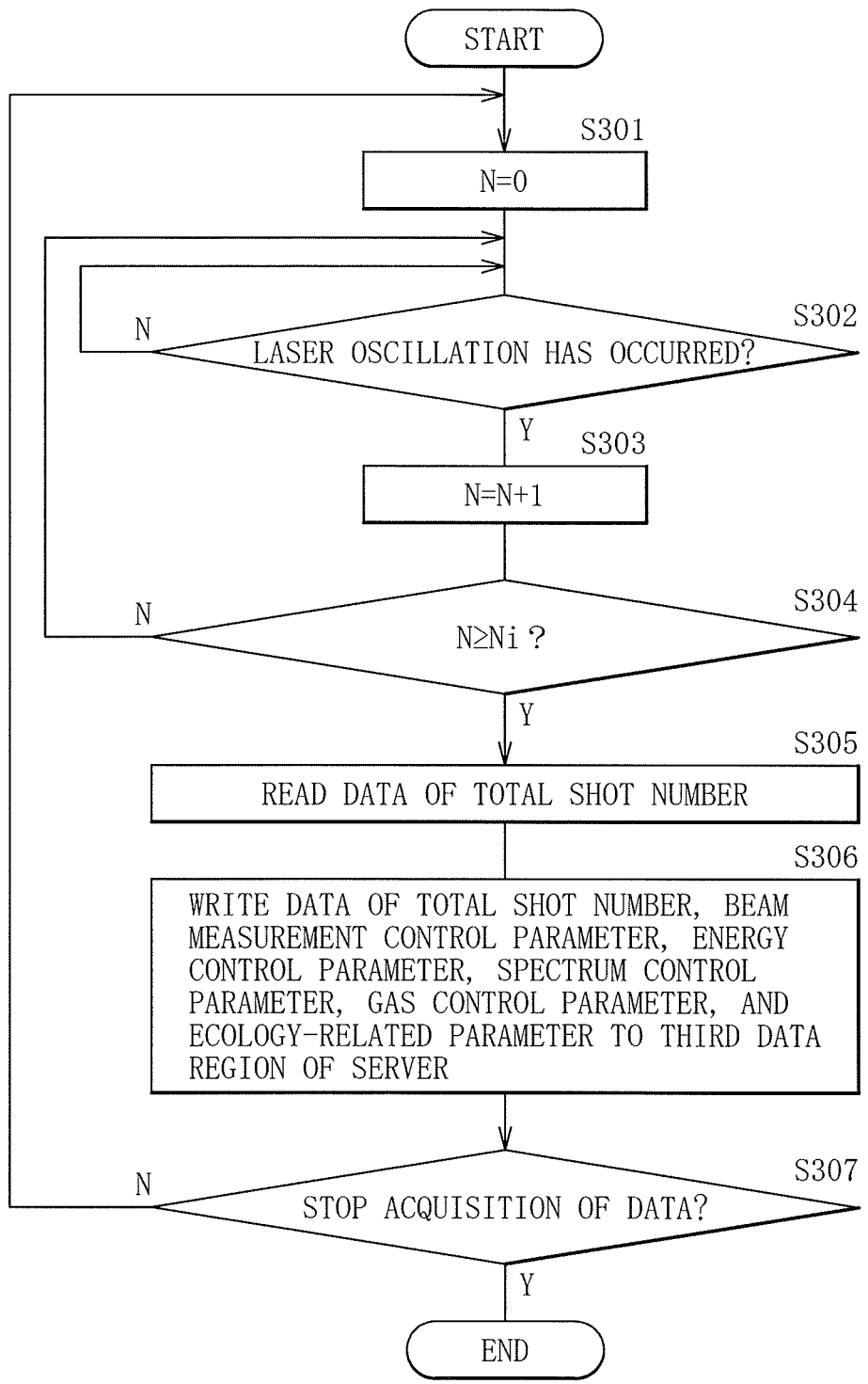
FIG. 10 is a flowchart illustrating an example of a flow of control of data writing to a first data region by the laser controller in the laser unit management system according to the first embodiment.

FIG. 10 is a flowchart illustrating an example of a flow of control of data writing to the first data region 110A by the laser controller 2.

The laser controller 2 may set the initial value of the counter value N of the pulse number to zero (step S301). Next, the laser controller 2 may determine whether laser oscillation has occurred (step S302). The laser controller 2 may determine whether laser oscillation has occurred, on the basis of, for example, the light emission trigger signal Str from the exposure unit controller 5.

In a case where the laser controller 2 determines that laser oscillation has not occurred (step S302; N), the laser controller 2 may repeat the process in the step S302.

In contrast, in a case where the laser controller 2 determines that laser oscillation has occurred (step S302; Y), the laser controller 2 may next set the counter value of the pulse number to N+1 (step S303).

Subsequently, the laser controller 2 may determine whether the counter value N of the pulse number reaches the predetermined shot number Ni (step S304). At this occasion, the predetermined shot number Ni may be, for example, 1000000 or 6000000 as the value of the pulse number. In a case where the laser controller 2 determines that the counter value N of the pulse number does not reach the predetermined shot number Ni (Step S304; N), the laser controller 2 may return to the process in the step S302.

In contrast, in a case where the laser controller 2 determines that the counter value N of the pulse number reaches the predetermined shot number Ni (step S304; Y), the laser controller 2 may next read data of the total shot number (step S305). The total shot number herein may be a total shot number from installation of the laser unit 1. The laser unit 1 may include a counter for counting of the total shot number.

Subsequently, the laser controller 2 may write the data of the total shot number and various parameters to the first data region 110A, which is accessible only by the laser maker, of the server 110 (step S306). The various parameters to be written to the first data region 110A may include, for example, the beam measurement control parameter, the energy control parameter Peg, the spectrum control parameter Pλc, and the gas control parameter Pgs for each shot, and the ecology-related parameter Pec. FIG. 11 illustrates an example of data written to the first data region 110A of the server 110.

Subsequently, the laser controller 2 may determine whether to stop acquisition of data (step S307). In a case where the laser controller 2 determines not to stop the acquisition of data (step S307; N), the laser controller 2 may return to the process in the step S301. In contrast, in a case where the laser controller 2 determines to stop the acquisition of data (step S307; Y), the laser controller 2 may end the process of the acquisition of data.

Other operations may be substantially similar to those in the laser unit management system according to the foregoing comparative example.

(2.1.3 Workings and Effects)

According to the laser unit management system of the present embodiment, the server 110 disposed inside the laser unit 1 or in the semiconductor factory may be provided with the second data region 110B that is accessible only by the user, and data related to the wafer number #w, the scan number #s, etc. may be written to the second data region 110B. In this case, the water-exposure-related information such as the wafer number and the scan number #s may be acquired from the exposure unit controller 5 without analyzing the pattern of the light emission trigger signal Str in the wafer data acquisition controller 3. Even if adjustment oscillation is performed, this makes it possible to reduce a possibility of false recognition of the scan number #s, etc., as compared with a case where the pattern of the light emission trigger signal Str is analyzed to recognize the scan number #s, etc.

Moreover, the server 110 may be provided with the third data region 110C that is accessible by both the user and the laser maker, and various control-related data, etc. may be written to the third data region 110C without being associated with the wafer number #w, the scan number #s, etc. This makes it possible to easily acquire data necessary for both the user and the laser maker.

Further, the server 110 may be provided with the first data region 110A that is accessible only by the laser maker, and data of various parameters may be written to the first data region 110A without being associated with the wafer number #w, the scan number #s, etc. This makes it possible to easily acquire only data necessary for the laser maker.

2.2 Beam Measurement System (2.2.1 Configuration)

Figure 12:
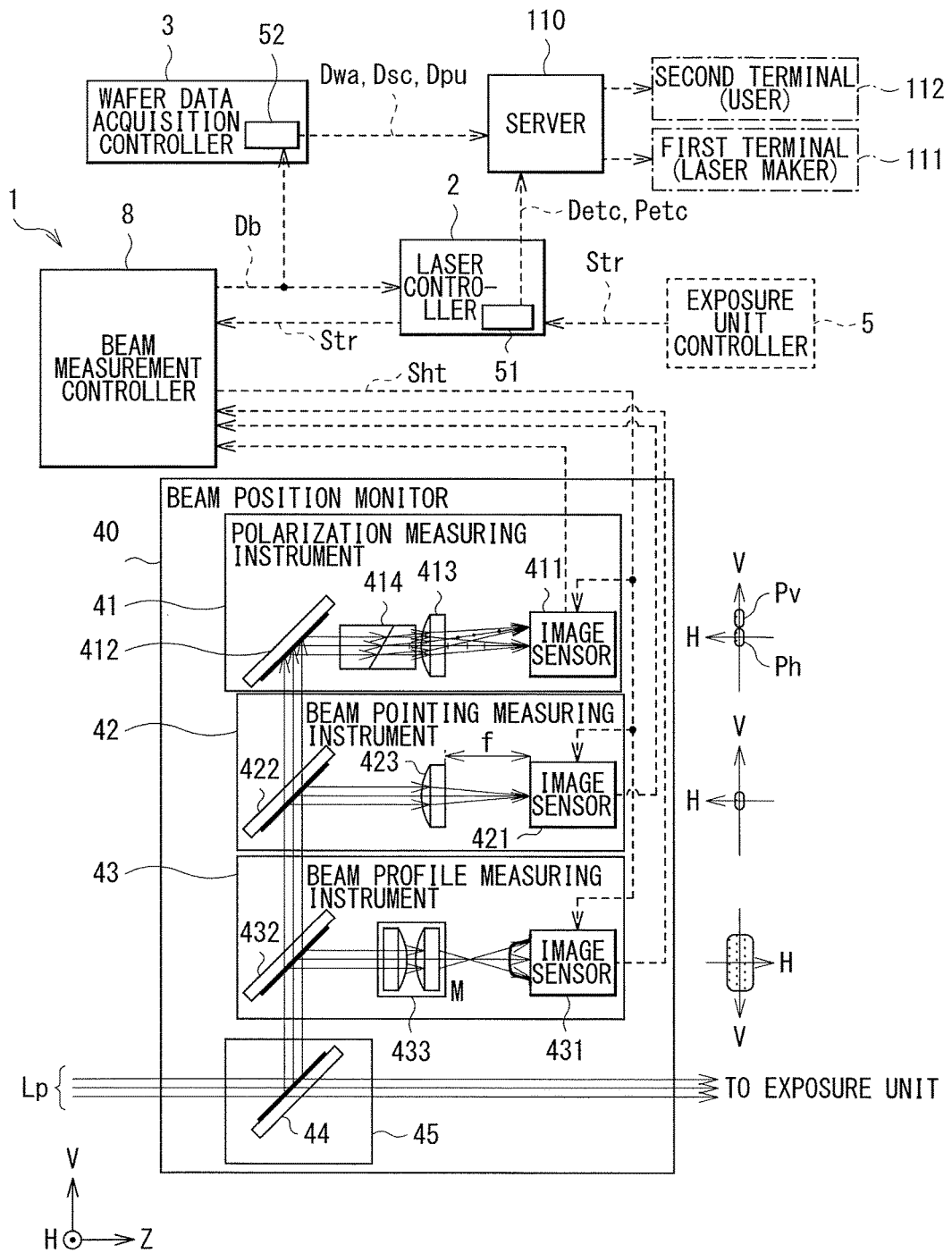
FIG. 12 schematically illustrates a configuration example of a part involving beam measurement in the laser unit management system according to the first embodiment.

FIG. 12 schematically illustrates a configuration example of a part involving beam measurement in the laser unit management system.

The beam position monitor 40 may include a polarization measuring instrument 41, a beam pointing measuring instrument 42, a beam profile measuring instrument 43, and a beam sample section 45.

The beam sample section 45 may include a beam splitter 44. The beam splitter 44 may be coated with a multilayer film so as to allow reflectance of S-polarized light and reflectance of S-polarized light to be substantially coincident with each other.

The beam profile measuring instrument 43 may include an image sensor 431, a beam splitter 432, and a transfer optical system 433.

The beam splitter 432 may be coated with a multilayer film so as to allow reflectance of P-polarized light and reflectance of S-polarized light to be substantially coincident with each other. The transfer optical system 433 may be a group lens having magnification M. A light reception surface of the image sensor 431 may be located at a position where a beam is transferred by M times.

The beam pointing measuring instrument 42 may include an image sensor 421, a beam splitter 422, and a condenser optical system 423.

The beam splitter 422 may be coated with a multilayer film so as to allow reflectance of P-polarized light and reflectance of S-polarized light to be substantially coincident with each other. The condenser optical system 423 may be a convex lens having a focal length f. A light reception surface of the image sensor 421 may be located on a focal surface of the condenser optical system 423.

The polarization measuring instrument 41 may include an image sensor 411, a high-reflection mirror 412, a condenser optical system 413, and a Rochon prism 414.

The high-reflection mirror 412 may be coated with a multilayer film so as to allow reflectance of P-polarized light and reflect of S-polarized light to be substantially coincident with each other. The Rochon prism 414 may be a prism including an $MgF_2$ crystal, and may be disposed in an optical path between the high-reflection mirror 412 and the condenser optical system 413. The condenser optical system 413 may be a convex lens having a focal length f. A light reception surface of the image sensor 411 may be located on a focal surface of the condenser optical system 413.

(2.2.2 Operation)

The beam measurement controller 8 may receive the light emission trigger signal Str from the exposure unit controller 5 via the laser controller 2. The beam measurement controller 8 may transmit a shutter signal Sht to the image sensors 411, 421, and 431 on the basis of the light emission trigger signal Str and receive image data from the image sensors 411, 421, and 431.

The beam measurement controller 8 may calculate a beam profile on the basis of the image data of the image sensor 431 and the magnification M of the transfer optical system 433 in the beam profile measuring instrument 43. The beam measurement controller 8 may calculate, for example, beam widths (Bwh and Bwv) and beam positions (Bch and Bcv) as beam profiles in the H direction and the V direction.

Moreover, the beam measurement controller 8 may calculate, for example, beam divergences (Bdh and Bdv) and beam pointings (Bph and Bpv) in the H direction and the V direction on the basis of the image data of the image sensor 421 and the focal length f of the condenser optical system 423 in the beam pointing measuring instrument 42.

Further, the beam measurement controller 8 may calculate, for example, a polarization degree P on the basis of the image data of the image sensor 411 in the polarization measuring instrument 41.

The beam measurement controller 8 may transmit these calculation data as the beam-measurement-related data Db to the laser controller 2 and the wafer data acquisition controller 3.

Figure 13:
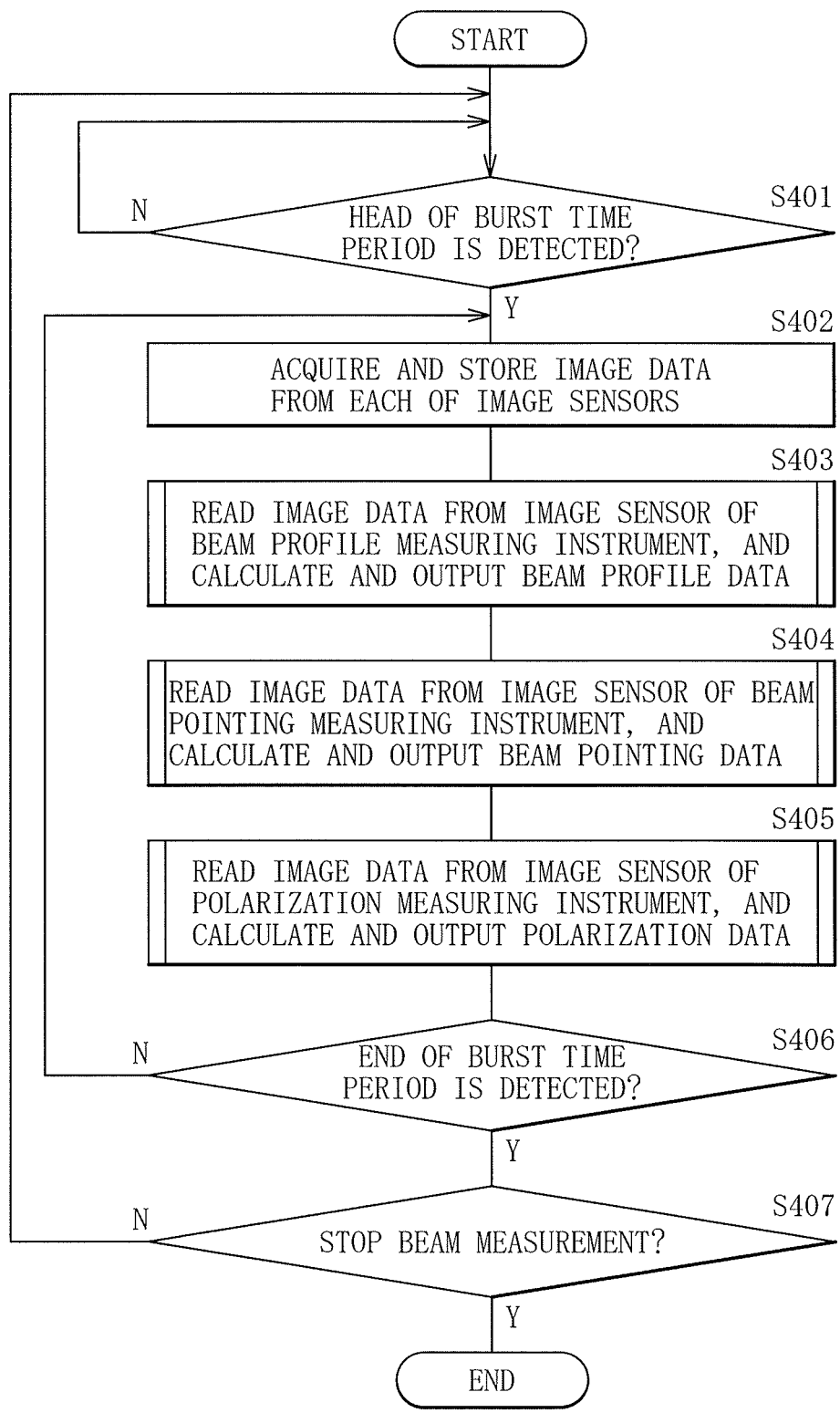
FIG. 13 is a flowchart illustrating an example of a flow of control involving beam measurement by a beam measurement controller in the laser unit management system according to the first embodiment.

FIG. 13 is a flowchart illustrating an example of a flow of control involving beam measurement by the beam measurement controller 8.

The beam measurement controller 8 may determine whether the head of the burst time period per wafer exposure as illustrated in FIG. 2 is detected (step S401). In a case where the beam measurement controller 8 determines that the head of the burst time period is not detected (step S401; N), the beam measurement controller 8 may repeat the process in the step S401.

In contrast, in a case where the beam measurement controller 8 determines that the head of the burst time period is detected (step S401; Y), the beam measurement controller 8 may next acquire the image data from each of the image sensors 411, 421, and 431 in the beam position monitor 40 and store the image data in an unillustrated memory section (step S402).

Next, the beam measurement controller 8 may perform reading of the image data from the image sensor 431 of the beam profile measuring instrument 43 and calculation and output of beam profile data (step S403).

Subsequently, the beam measurement controller 8 may perform reading of the image data from the image sensor 421 of the beam pointing measuring instrument 42 and calculation and output of beam pointing data (step S404).

Thereafter, the beam measurement controller 8 may perform reading of the image data from the image sensor 411 of the polarization measuring instrument 41 and calculation and output of polarization data (step S405).

Next, the beam measurement controller 8 may determine whether the end of the burst time period is detected (step S406). In a case where the beam measurement controller 8 determines that the end of the burst time period is not detected (step S406; N), the beam measurement controller 8 may return to the process of the step S402.

In contrast, in a case where the beam measurement controller 8 determines that the end of the burst time period is detected (step S406; Y), the beam measurement controller 8 may next determine whether to stop the beam measurement (step S407).

In a case where the beam measurement controller 8 determines not to stop the beam measurement (step S407; N), the beam measurement controller 8 may return to the process in the step S401. In contrast, in a case where the beam measurement controller 8 determines to stop the beam measurement (step S407; Y), the beam measurement controller 8 may end the process of the beam measurement.

Figure 14:
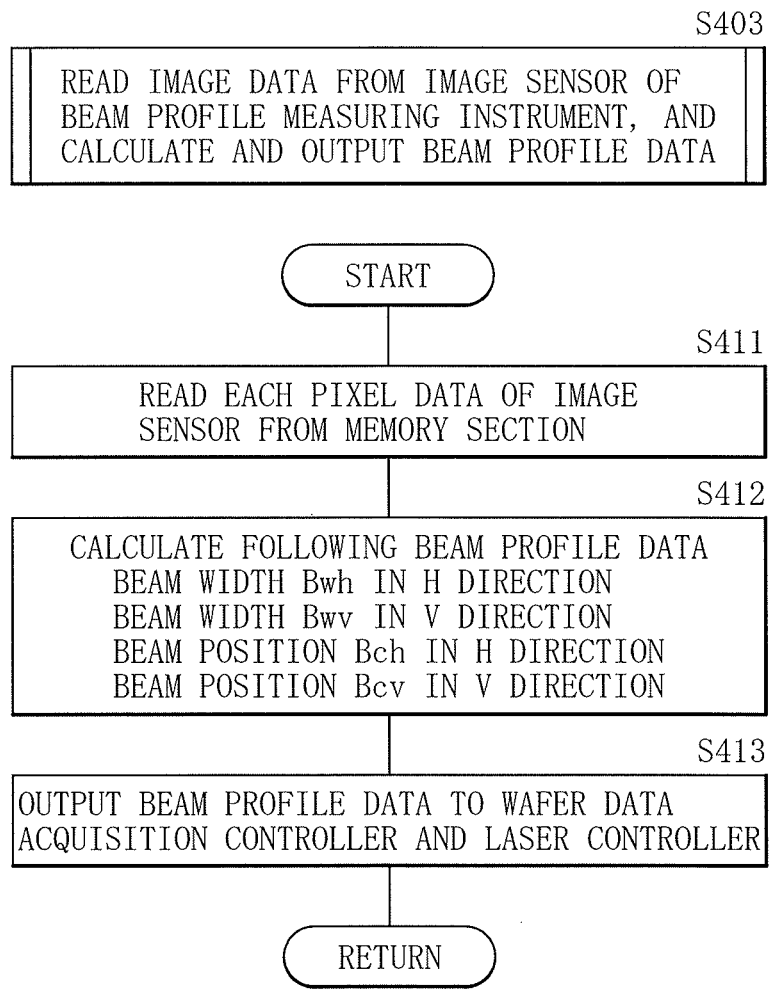
FIG. 14 is a sub-flowchart illustrating details of a process in step S403 in the flowchart illustrated in FIG. 13.

FIG. 14 is a sub-flowchart illustrating details of the process in step S403 in the flowchart illustrated in FIG. 13.

The beam measurement controller 8 may read each pixel data in the image data of the image sensor 431 of the beam profile measuring instrument 43 from the unillustrated memory section (step S411). Thereafter, the beam measurement controller 8 may calculate, as beam profile data, the beam width Bwh in the H direction, the beam width Bwv in the V direction, the beam position Bch in the H direction, and the beam position Bcv in the V direction on the basis of each pixel data (step S412).

Next, the beam measurement controller 8 may transmit the thus-calculated beam profile data to the laser controller 2 and the wafer data acquisition controller 3 (step S413). Thereafter, the beam measurement controller 8 may perform the process in the step S404 in FIG. 13.

Figure 15:
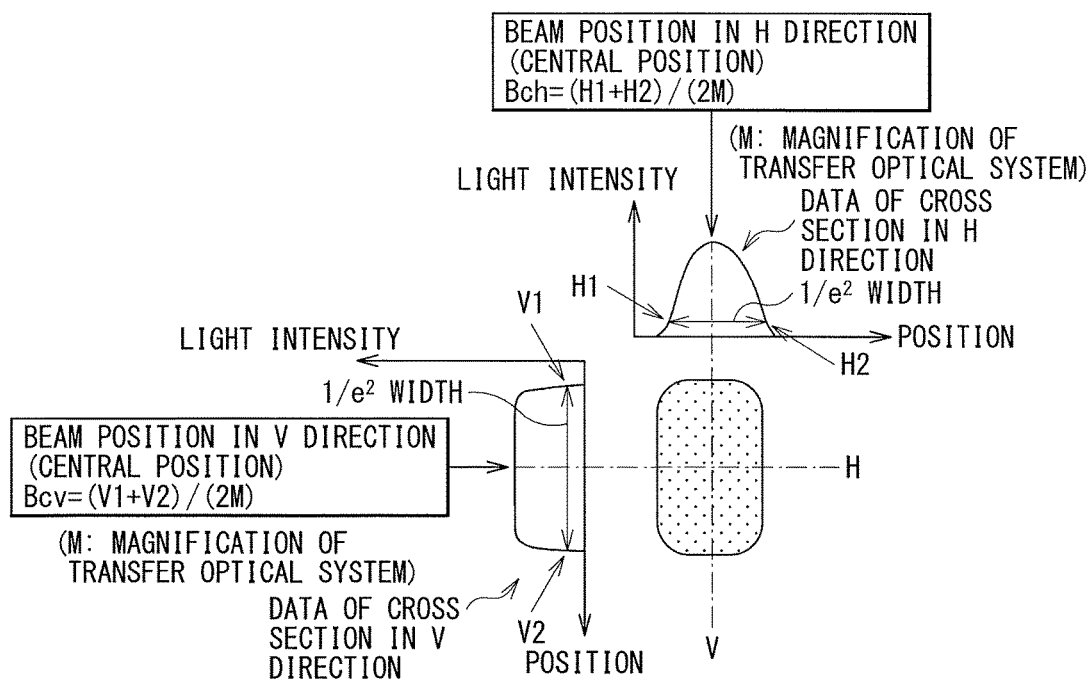
FIG. 15 schematically illustrates an example of a method of calculating beam profiles by the beam measurement controller.

FIG. 15 schematically illustrates an example of a method of calculating the beam profiles by the beam measurement controller 8. FIG. 15 schematically illustrates image data acquired by the image sensor 431.

The beam position Bcv in the V direction may be calculated as a central position in the V direction of a beam by Bcv=(V1+V2)/(2M), where V1 and V2 are positions at which light intensity is $1/e^2$ of peak intensity of the beam in the V direction.

Moreover, the beam position Bch in the H direction may be calculated as a central position in the H direction by Bch=(H1+H2)/(2M), where H1 and H2 are positions at which light intensity is $1/e^2$ of peak intensity of the beam in the H direction.

It is to be noted that the beam measurement controller 8 may determine central positions (Bch and Bcv) of the beam profiles from a position of a barycenter of the image data. Moreover, the beam measurement controller 8 may calculate the beam widths (Bwh and Bwv) as widths of a region in which light intensity is a fixed ratio, e.g., 5% to 10% of a peak value.

Figure 16:
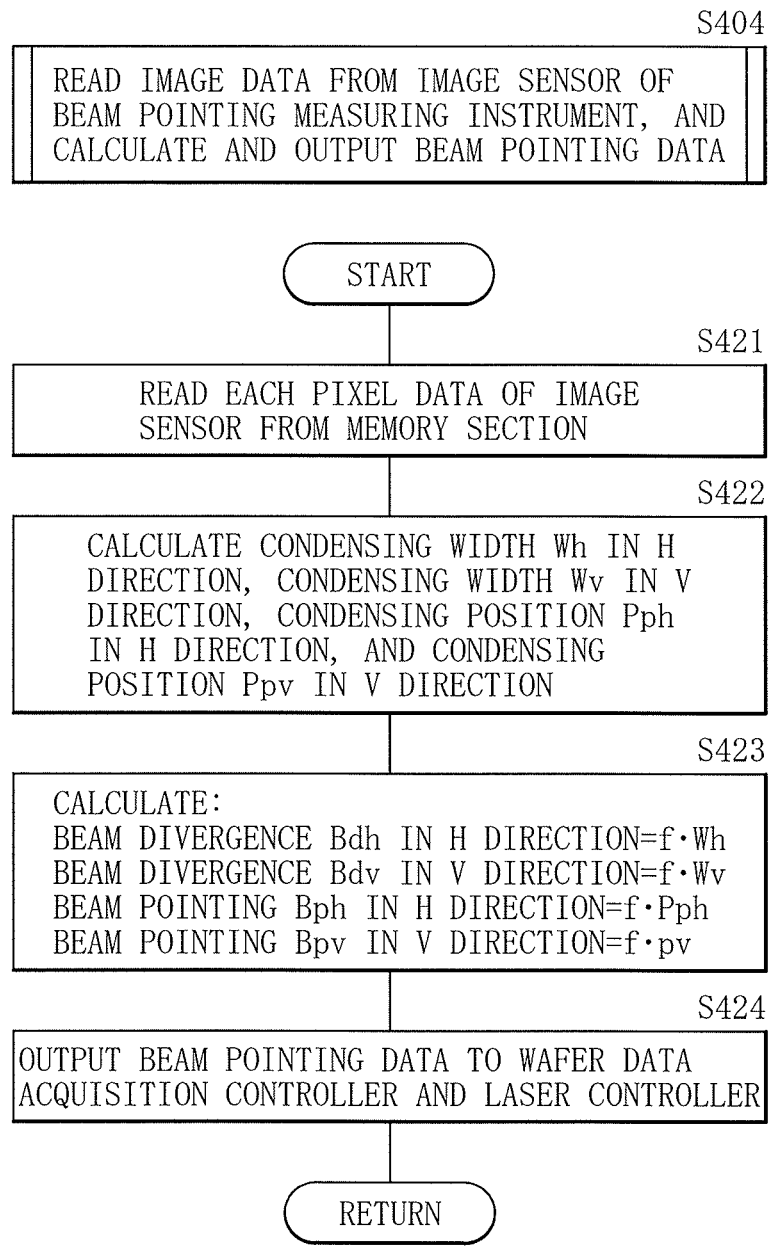
FIG. 16 is a sub-flowchart illustrating details of a process in step S404 in the flowchart illustrated in FIG. 13.

FIG. 16 is a sub-flowchart illustrating details of the process in step S404 in the flowchart illustrated in FIG. 13.

The beam measurement controller 8 may read each pixel data in the image data of the image sensor 421 of the beam pointing measuring instrument 42 from the unillustrated memory section (step S421). Next, the beam measurement controller 8 may calculate a condensing width Wh in the H direction, a condensing width Wv in the V direction, a condensing position Pph in the H direction, and a condensing position Ppv in the V direction (step S422). It is to be noted that the condensing widths and the condensing positions may be condensing widths and condensing positions of a beam by the condenser optical system 423 of the beam pointing measuring instrument 42.

Next, the beam measurement controller 8 may calculate beam divergences (Bdh and Bdv) and the beam pointings (Bph and Bpv) in the H direction and the V direction as follows (step S423).

The beam divergence Bdh in the H direction=f·Wh
The beam divergence Bdv in the V direction=f·Wv
The beam pointing Bph in the H direction=f·Pph
The beam pointing Bpv in the V direction=f·Ppv Note that "f" may be a focal length of the condenser optical system 423 of the beam pointing measuring instrument 42.

Next, the beam measurement controller 8 may transmit thus-calculated beam pointing data to the laser controller 2 and the wafer data acquisition controller 3 (step S424). Thereafter, the beam measurement controller 8 may perform the process in the step S405 in FIG. 13.

Figure 17:
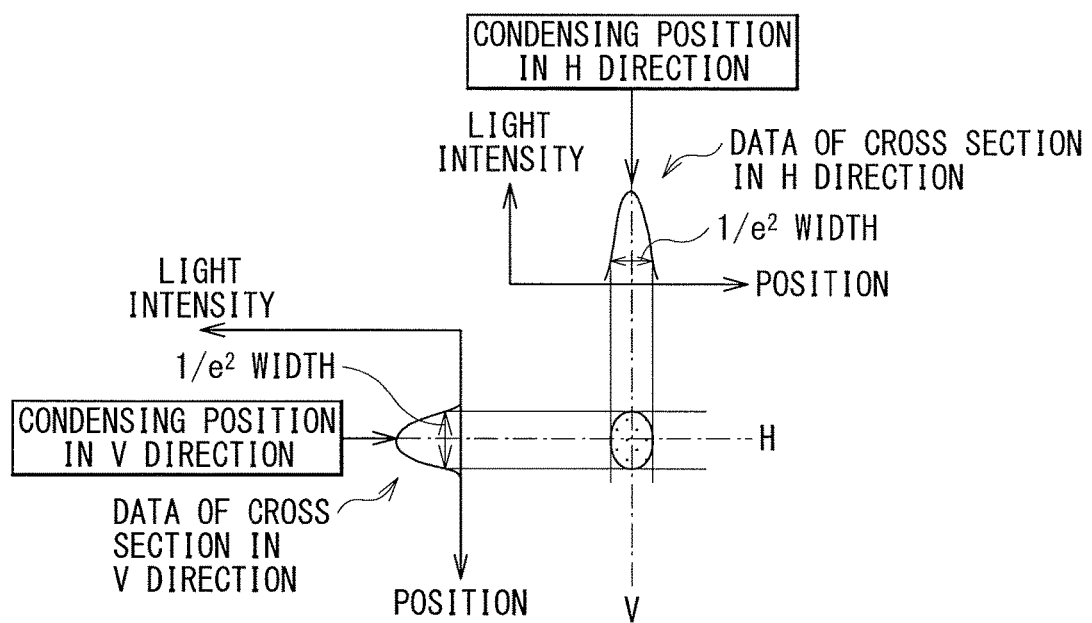
FIG. 17 schematically illustrates an example of a method of calculating beam pointings by the beam measurement controller.

FIG. 17 schematically illustrates an example of a method of calculating the beam pointings by the beam measurement controller 8. FIG. 17 schematically illustrates image data acquired by the image sensor 421.

The beam measurement controller 8 may determine a position of a barycenter of the beam by calculation on the basis of the image data acquired by the image sensor 421 to calculate the beam pointings (Bph and Bpv) in the H direction and the V direction. Moreover, the beam measurement controller 8 may calculate the beam divergences (Bdh and Bdv) in the H direction and the V direction as widths of a region where light intensity is a fixed ratio, e.g., $1/e^2$ of the peak value. Further, the beam measurement controller 8 may calculate the beam divergences (Bdh and Bdv) as widths in a region in which light intensity is a fixed ratio, e.g., 5% to 10% of the peak value.

Figure 18:
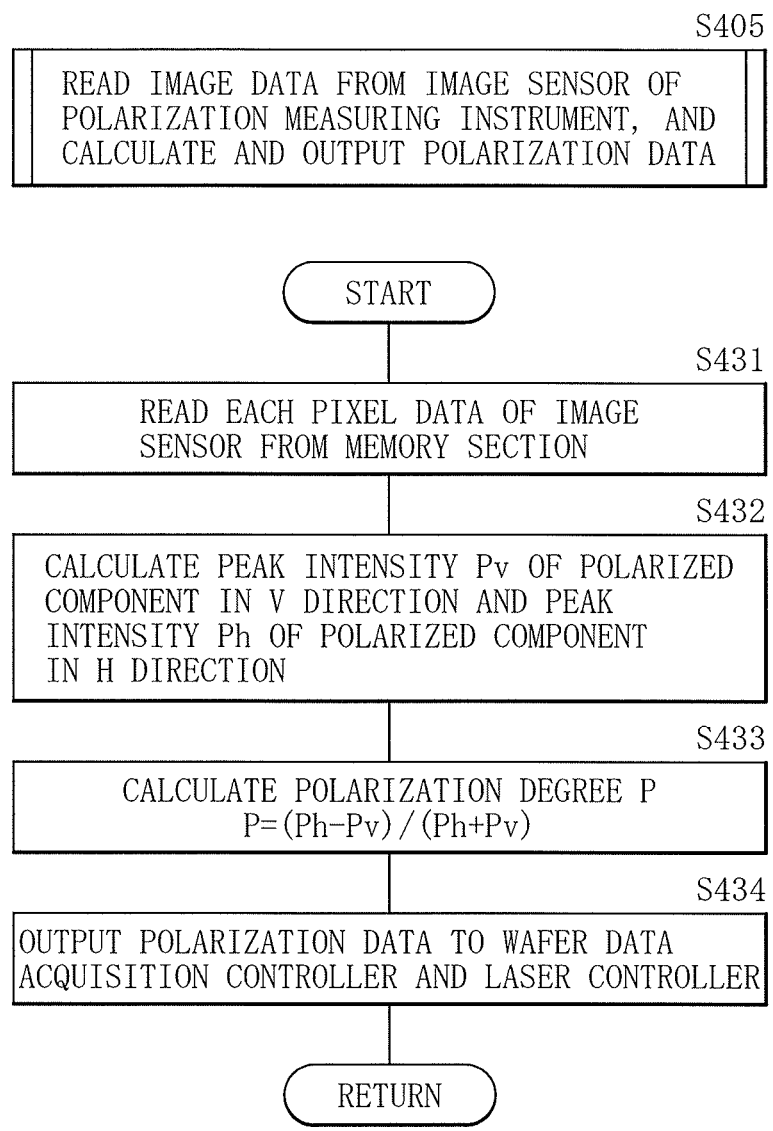
FIG. 18 is a sub-flowchart illustrating details of a process in step S405 in the flowchart illustrated in FIG. 13.

FIG. 18 is a sub-flowchart illustrating details of the process in step S405 in the flowchart illustrated in FIG. 13.

The beam measurement controller 8 may read each pixel data in the image data of the image sensor 411 of the polarization measuring instrument 41 from the unillustrated memory section (step S431). Next, the beam measurement controller 8 may calculate peak intensity Pv of a polarized component in the V direction and peak intensity Ph of a polarized component in the H direction (step S432).

Subsequently, the beam measurement controller 8 may calculate the polarization degree P as follows (step S433).

$$P=(Ph-Pv)/(Ph+Pv)$$

Next, the beam measurement controller 8 may transmit polarization data indicating the calculated polarization degree P to the laser controller 2 and the wafer data acquisition controller 3 (step S434). Thereafter, the beam measurement controller 8 may perform the process in the step S406 in FIG. 13.

Figure 19:
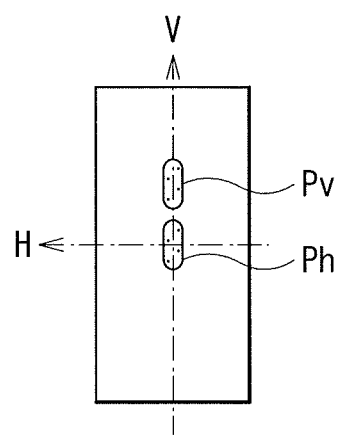
FIG. 19 schematically illustrates an example of peak intensity of a polarized component calculated by the beam measurement controller.

FIG. 19 schematically illustrates an example of the peak intensity Pv and the peak intensity Ph of the polarized components. FIG. 19 schematically illustrates the image data acquired by the image sensor 411.

It is to be noted that a value resulting from integration of light intensity of the polarized component in the V direction and a value resulting from integration of light intensity of the polarized component in the H direction may be determined as the peak intensity Pv and the peak intensity Ph.

2.3 Energy Control System

Figure 20:
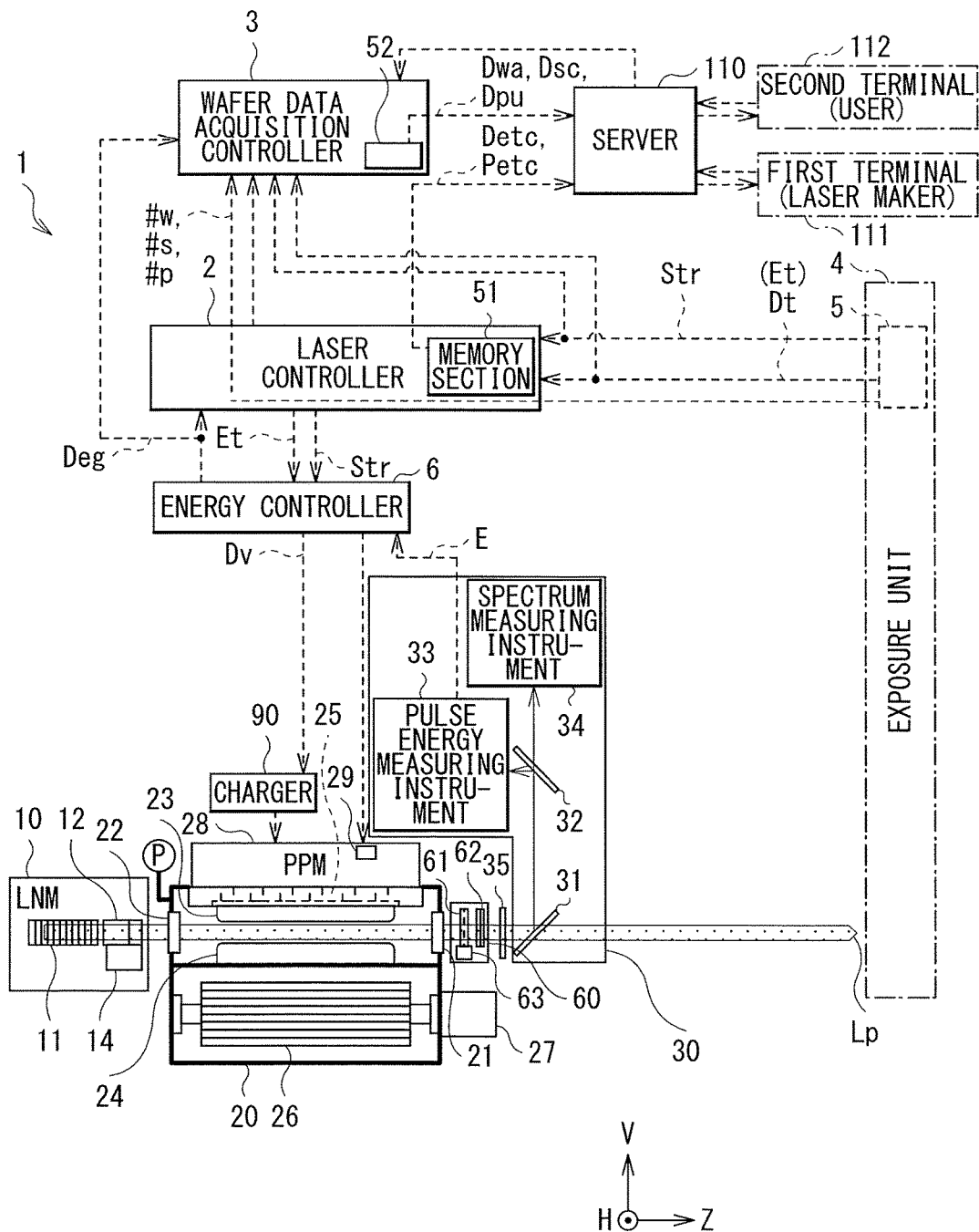
FIG. 20 schematically illustrates a configuration example of a part involving energy control in the laser unit management system according to the first embodiment.
Figure 21:
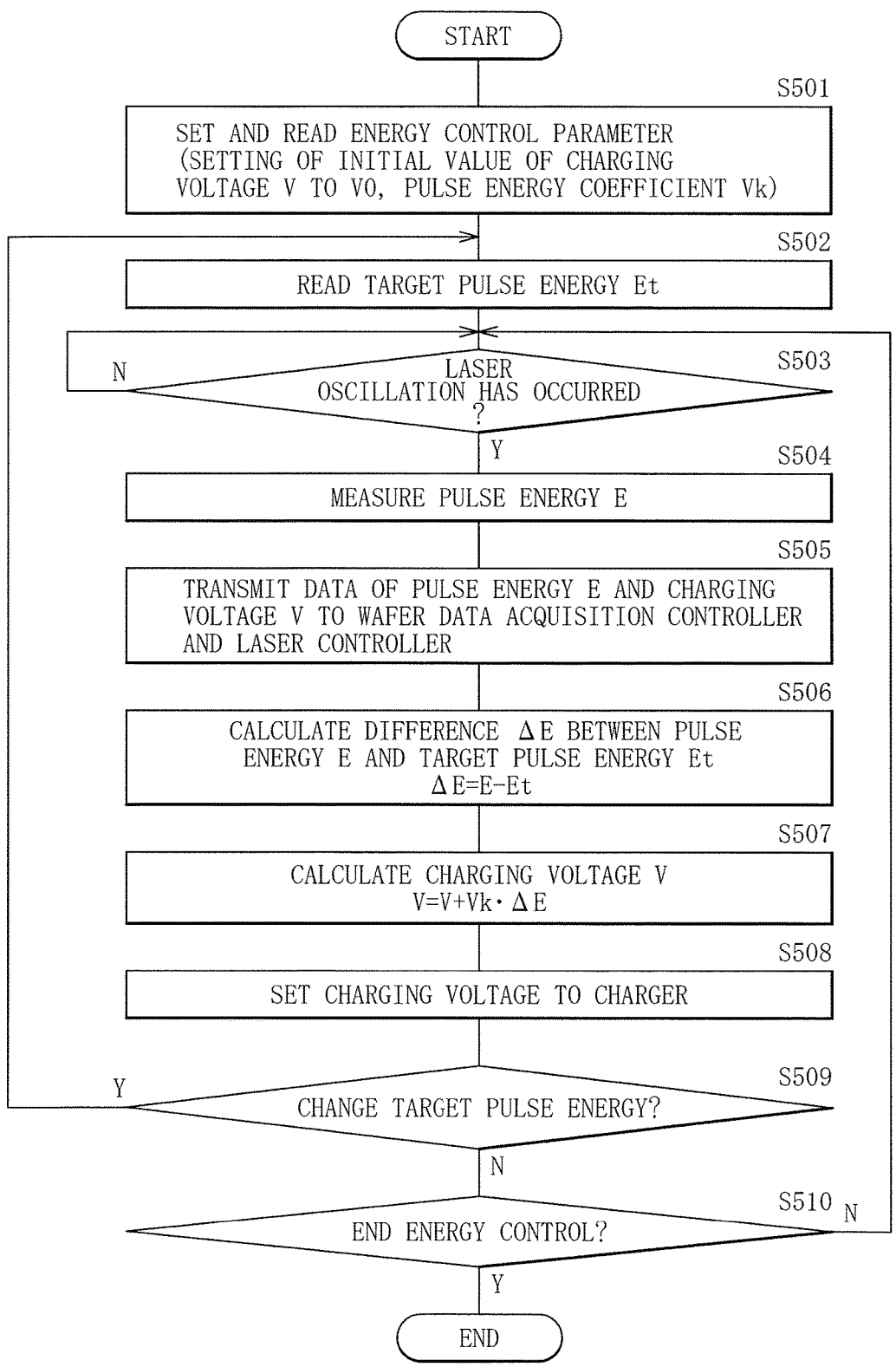
FIG. 21 is a flowchart illustrating an example of a flow of control involving energy control by an energy controller in the laser unit management system according to the first embodiment.

FIG. 20 schematically illustrates a configuration example of a part involving energy control in the laser unit management system. FIG. 21 is a flowchart illustrating an example of a flow of control involving energy control by the energy controller 6.

The energy controller 6 may perform setting and reading of the energy control parameter Peg (step S501). At this occasion, the energy controller 6 may set an initial value of the charging voltage V to V0. Moreover, the energy controller 6 may perform reading of a pulse energy coefficient Vk via the laser controller 2.

Next, the energy controller 6 may perform reading of the target pulse energy Et from the exposure unit controller 5 via the laser controller 2 (step S502).

Subsequently, the energy controller 6 may determine whether laser oscillation has occurred (step S503). The energy controller 6 may determine whether laser oscillation has occurred, on the basis of, for example, the light emission trigger signal Str from the exposure unit controller 5. Alternatively, the energy controller 6 may determine whether laser oscillation has occurred, on the basis of, for example, the pulse energy E detected by the pulse energy measuring instrument 33.

In a case where the energy controller 6 determines that laser oscillation has not occurred (step S503; N), the energy controller 6 may repeat the process in the step S503.

In contrast, in a case where the energy controller 6 determines that laser oscillation has occurred (step S503; Y), the energy controller 6 may next measure the pulse energy E with use of the pulse energy measuring instrument 33 (step S504).

Next, the energy controller 6 may transmit data of the measured pulse energy E and the charging voltage V to the wafer data acquisition controller 3 and the laser controller 2 (step S505).

Subsequently, the energy controller 6 may calculate a difference $\Delta E$ (=E−Et) between the measured pulse energy E and the target pulse energy Et (step S506).

Next, the energy controller 6 may calculate the next charging voltage V on the basis of the difference $\Delta E$ by the following expression (step S507). The pulse energy coefficient Vk may be a proportionality coefficient that converts the difference $\Delta E$ into a change amount of the charging voltage V.

$$V=V+Vk\cdot\Delta E$$

Subsequently, the energy controller 6 may transmit the charging voltage data Dv indicating the calculated charging voltage V to the charger 90, thereby setting the charging voltage V to the charger 90 (step S508).

Thereafter, the energy controller 6 may determine whether to change the target pulse energy Et (step S509). In a case where the energy controller 6 determines to change the target pulse energy Et (step S509; Y), the energy controller 6 may return to the process in the step S502.

In contrast, in a case where the energy controller 6 determines not to change the target pulse energy Et (step S509; N), the energy controller 6 may next determine whether to end the energy control (S510).

In a case where the energy controller 6 determines not to end the energy control (step S510; N), the energy controller 6 may return to the process in the step S503. In contrast, in a case where the energy controller 6 determines to end the energy control (step S510; Y), the energy controller 6 may end the process of the energy control.

2.4 Spectrum Control System (2.4.1 Configuration)

Figure 22:
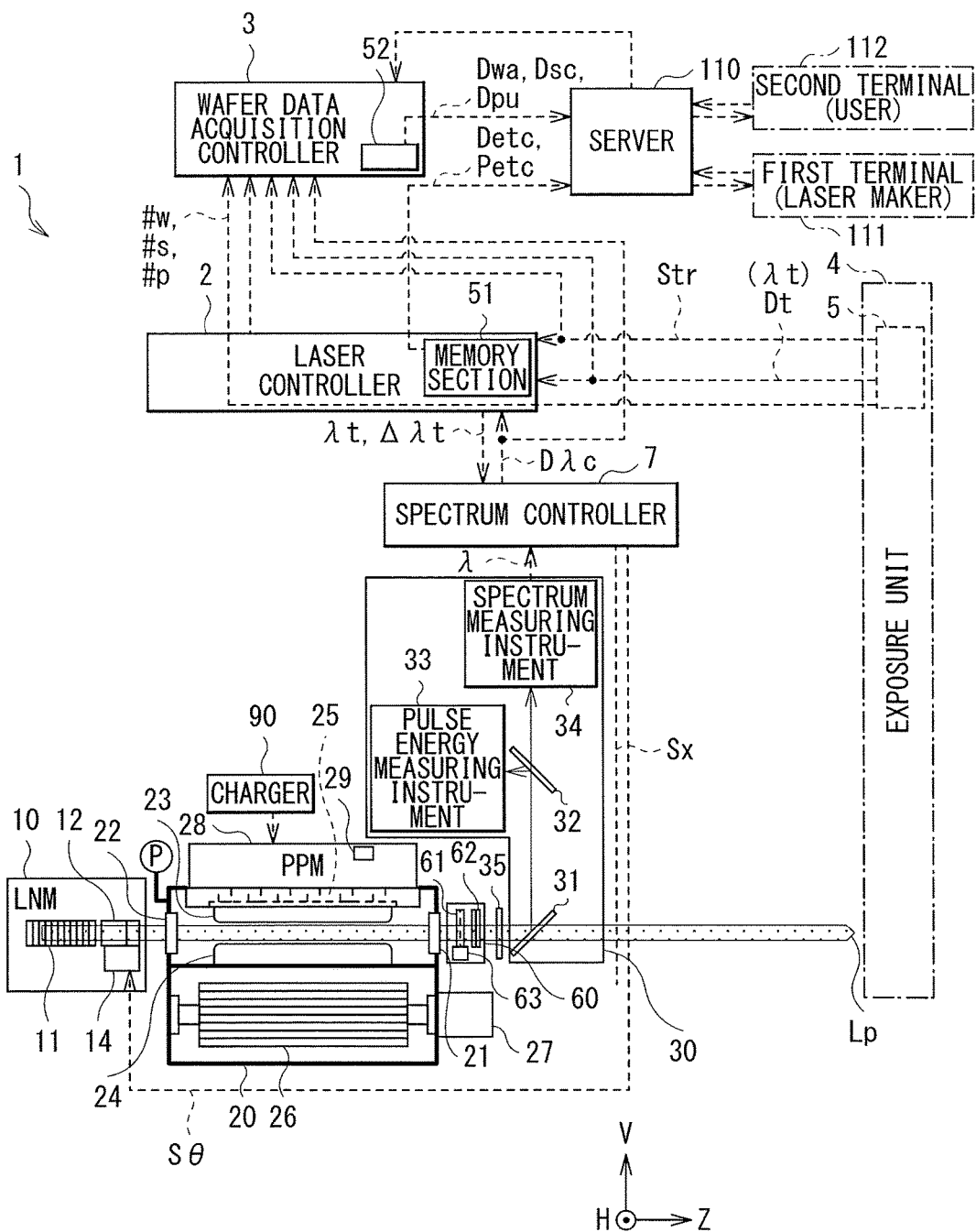
FIG. 22 schematically illustrates a configuration example of a part involving spectrum control in the laser unit management system according to the first embodiment.
Figure 23:
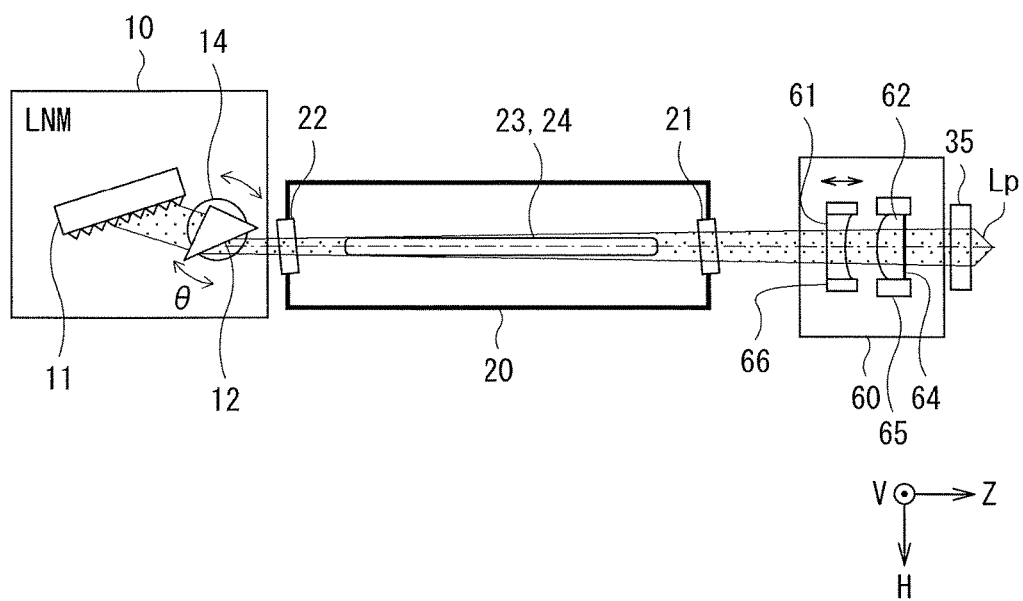
FIG. 23 schematically illustrates configuration examples of a line narrow module and a spectrum variable section.
Figure 24:
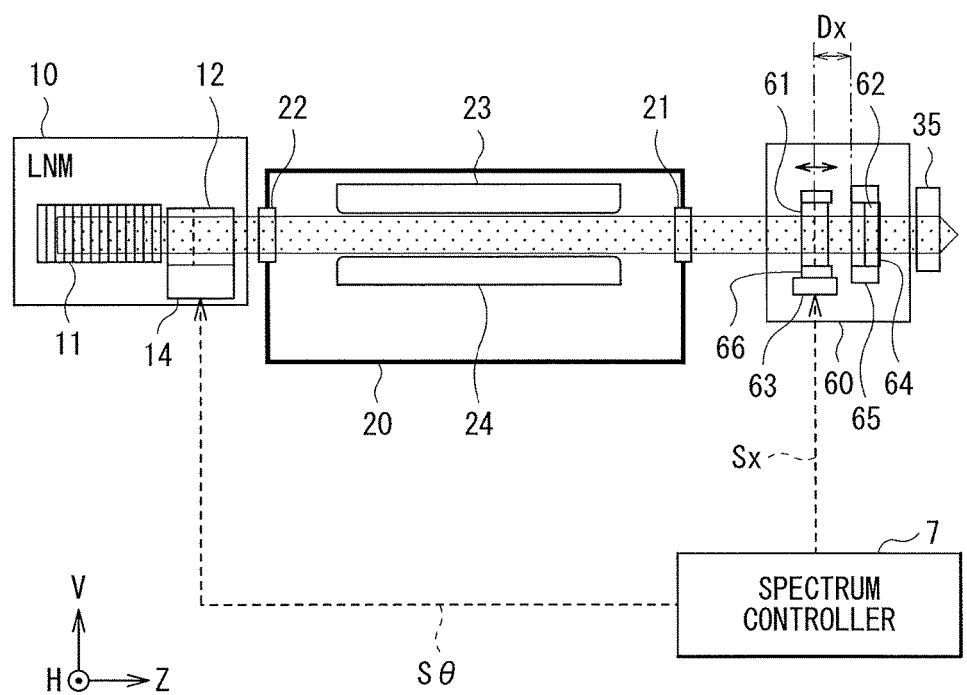
FIG. 24 schematically illustrates configuration examples of the line narrow module and the spectrum variable section.

FIG. 22 schematically illustrates a configuration example of a part involving spectrum control in the laser unit management system. FIGS. 23 and 24 schematically illustrate configuration examples of the line narrow module 10 and the spectrum variable section 60. It is to be noted that FIG. 23 indicates configuration examples viewed from the V direction, and FIG. 24 illustrates configuration examples viewed from the H direction.

The cylindrical concave lens 61 of the spectrum variable section 60 may be a cylindrical plano-concave lens. The cylindrical convex lens 62 may be a cylindrical plano-convex lens. A lens surface facing the output coupler mirror 35 of the cylindrical convex lens 62 may be provided with a partial reflection film (PR film) 64.

The cylindrical concave lens 61 may be held by a holder 66. The cylindrical convex lens 62 may be held by a holder 65. The linear stage 63 may be attached to the cylindrical concave lens 61 with the holder 66 in between.

(2.4.2 Operation)

Figure 25:
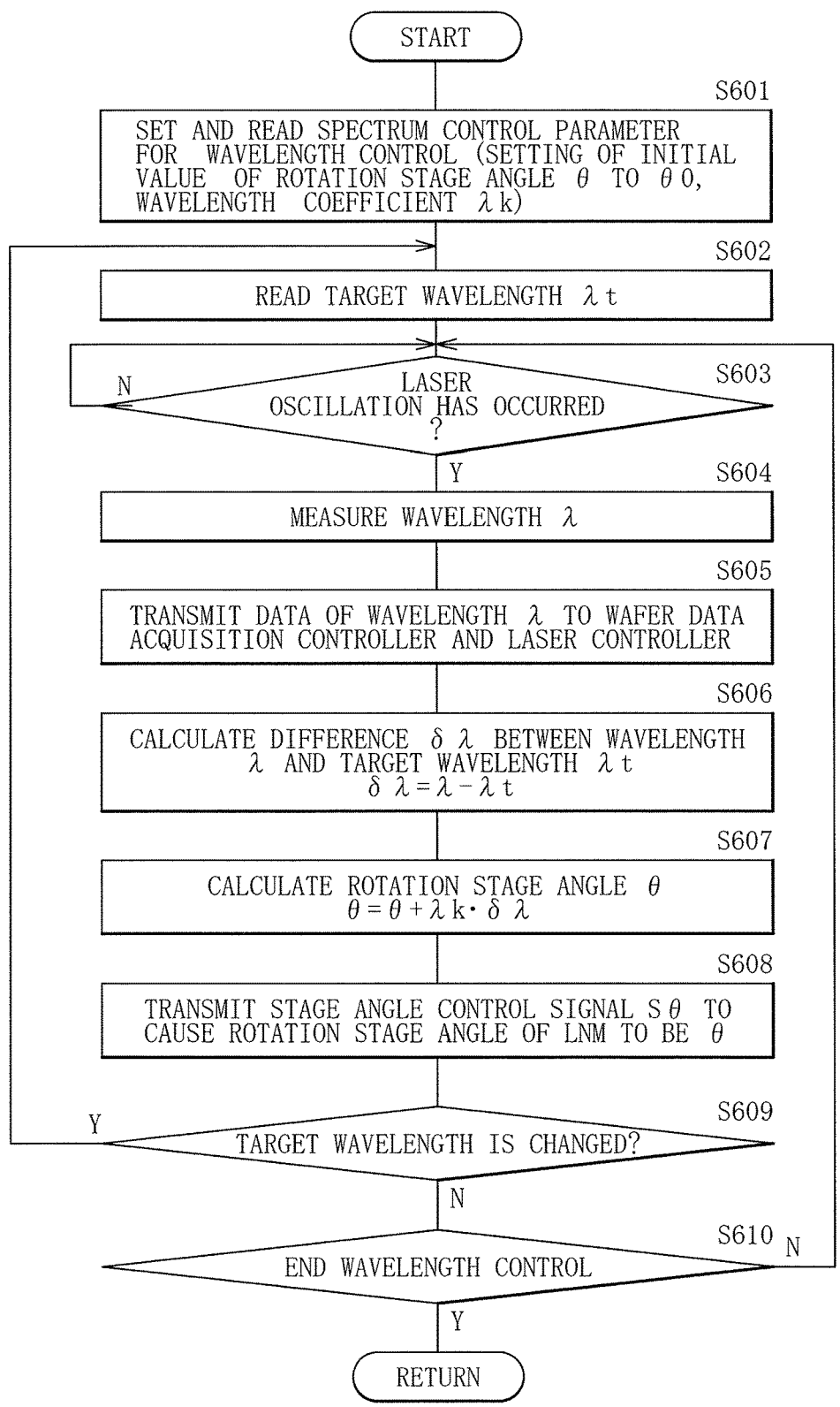
FIG. 25 is a flowchart illustrating an example of a flow of control involving wavelength control by the spectrum controller in the laser unit management system according to the first embodiment.

FIG. 25 is a flowchart illustrating an example of a flow of control involving wavelength control by the spectrum controller 7.

The spectrum controller 7 may perform setting and reading of the spectrum control parameter P$\lambda$c for wavelength control (step S601). At this occasion, the spectrum controller 7 may set an initial value of the rotation stage angle θ of the rotation stage 14 in the line narrow module 10 to θ0. Moreover, the spectrum controller 7 may perform reading of a wavelength coefficient λk via the laser controller 2.

Next, the spectrum controller 7 may perform reading of the target wavelength λt from the exposure unit controller 5 via the laser controller 2 (step S602).

Subsequently, the spectrum controller 7 may determine whether laser oscillation has occurred (step S603). In a case where the spectrum controller 7 determines that laser oscillation has not occurred (step S603; N), the spectrum controller 7 may repeat the process in the step S603.

In contrast, an a case where the spectrum controller 7 determines that laser oscillation has occurred (step S603; Y), the spectrum controller 7 may next measure the wavelength λ with use of the spectrum measuring instrument 34 (step S604).

Next, the spectrum controller 7 may transmit data of the measured wavelength λ to the wafer data acquisition controller 3 and the laser controller 2 (step S605).

Subsequently, the spectrum controller 7 may calculate the difference δλ (=λ−λt) between the measured wavelength λ and the target wavelength λt (step S606).

Thereafter, the spectrum controller 7 may calculate the next rotation stage angle θ on the basis of the difference δλ by the following expression (step S607). The wavelength coefficient λk may be a proportionality coefficient that converts the difference δλ into a change amount of the rotation stage angle θ.

$$\theta = \theta + \lambda k \cdot \delta \lambda$$

Next, the spectrum controller 7 may transmit the stage angle control signal Sθ to the rotation stage 14 of the line narrow module 10 so as to cause the rotation stage angle to be θ (step S608).

Subsequently, the spectrum controller 7 may determine whether to change the target wavelength λt (step S609). In a case where the spectrum controller 7 determines to change the target wavelength λt (step S609; Y), the spectrum controller 7 may return to the process in the step S602.

In contrast, in a case where the spectrum controller 7 determines not to change the target wavelength λt (step S609; N), the spectrum controller 7 may next determine whether to end the wavelength control (step S610).

In a case where the spectrum controller 7 determines not to end wavelength control (step S610; N), the spectrum controller 7 may return to the process in the step S603. In contrast, in a case where the spectrum controller 7 determines to end wavelength control (step S610; Y), the spectrum controller 7 may end the process of the wavelength control.

Figure 26:
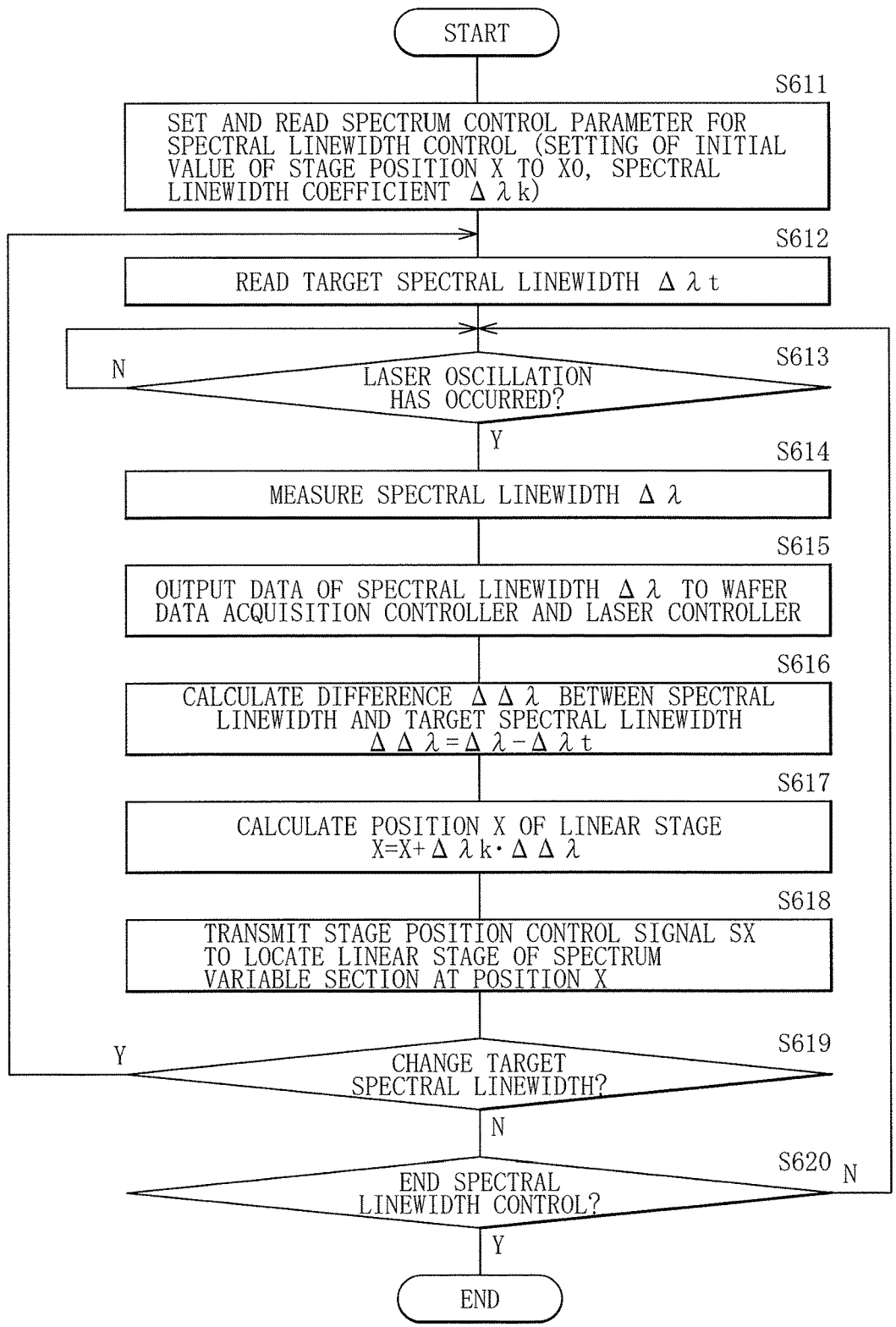
FIG. 26 is a flowchart illustrating an example of a flow of control involving spectral linewidth control by the spectrum controller in the laser unit management system according to the first embodiment.

FIG. 26 is a flowchart illustrating an example of a flow of control involving spectral linewidth control by the spectrum controller 7.

The spectrum controller 7 may perform setting and reading of the spectrum control parameter Pλc for spectral linewidth control (step S611). At this occasion, the spectrum controller 7 may set an initial value of the position X of the linear stage 63 in the spectrum variable section 60 to X0. Moreover, the spectrum controller 7 may perform reading of a spectral linewidth coefficient ΔλK via the laser controller 2.

Next, the spectrum controller 7 may perform reading of the target spectral linewidth Δλt from the exposure unit controller 5 via the laser controller 2 (step S612).

Subsequently, the spectrum controller 7 may determine whether laser oscillation has occurred (step S613). In a case where the spectrum controller 7 determine that laser oscillation has not occurred (step S613; N), the spectrum controller 7 may repeat the process in the step S613.

In contrast, in a case where the spectrum controller 7 determines that laser oscillation has occurred (step S613; Y), the spectrum controller 7 may next measure the spectral linewidth Δλ with use of the spectrum measuring instrument 34 (step S614).

Next, the spectrum controller 7 may transmit data of the measured spectral linewidth Δλ to the wafer data acquisition controller 3 and the laser controller 2 (step S615).

Subsequently, the spectrum controller 7 may calculate the difference ΔΔλ (=Δλ−Δλt) between the measured spectral linewidth Δλ and the target spectral linewidth Δλt (step S616).

Thereafter, the spectrum controller 7 may calculate the next position X of the linear stage 63 on the basis of the difference ΔΔλ by the following expression (step S617). The spectral linewidth coefficient ΔλK may be a proportionality coefficient that converts the difference ΔΔλ into a change amount of the position X.

$$X = X + \Delta \lambda k \cdot \Delta \Delta \lambda$$

Next, the spectrum controller 7 may transmit the stage position control signal Sx to the linear stage 63 of the spectrum variable section 60 so as to locate the linear stage 63 at the position X (step S618).

Subsequently, the spectrum controller 7 may determine whether to change the target spectral linewidth Δλt (step S619). In a case where the spectrum controller 7 determines to change the target spectral linewidth Δλt (step S619; Y), the spectrum controller 7 may return to the process in the step S612.

In contrast, in a case where the spectrum controller 7 determines not to change the target spectral linewidth Δλt (step S619; N), the spectrum controller 7 may next determine whether to end the spectral linewidth control (step S620).

In a case where the spectrum controller 7 determines not to end the spectral linewidth control (step S620; N), the spectrum controller 7 may return to the process in the step S613. In contrast, in a case where the spectrum controller 7 determines to end the spectral linewidth control (step S620; Y), the spectrum controller 7 may end the process of the spectral linewidth control.

2.5 Gas Control System

Figure 27:
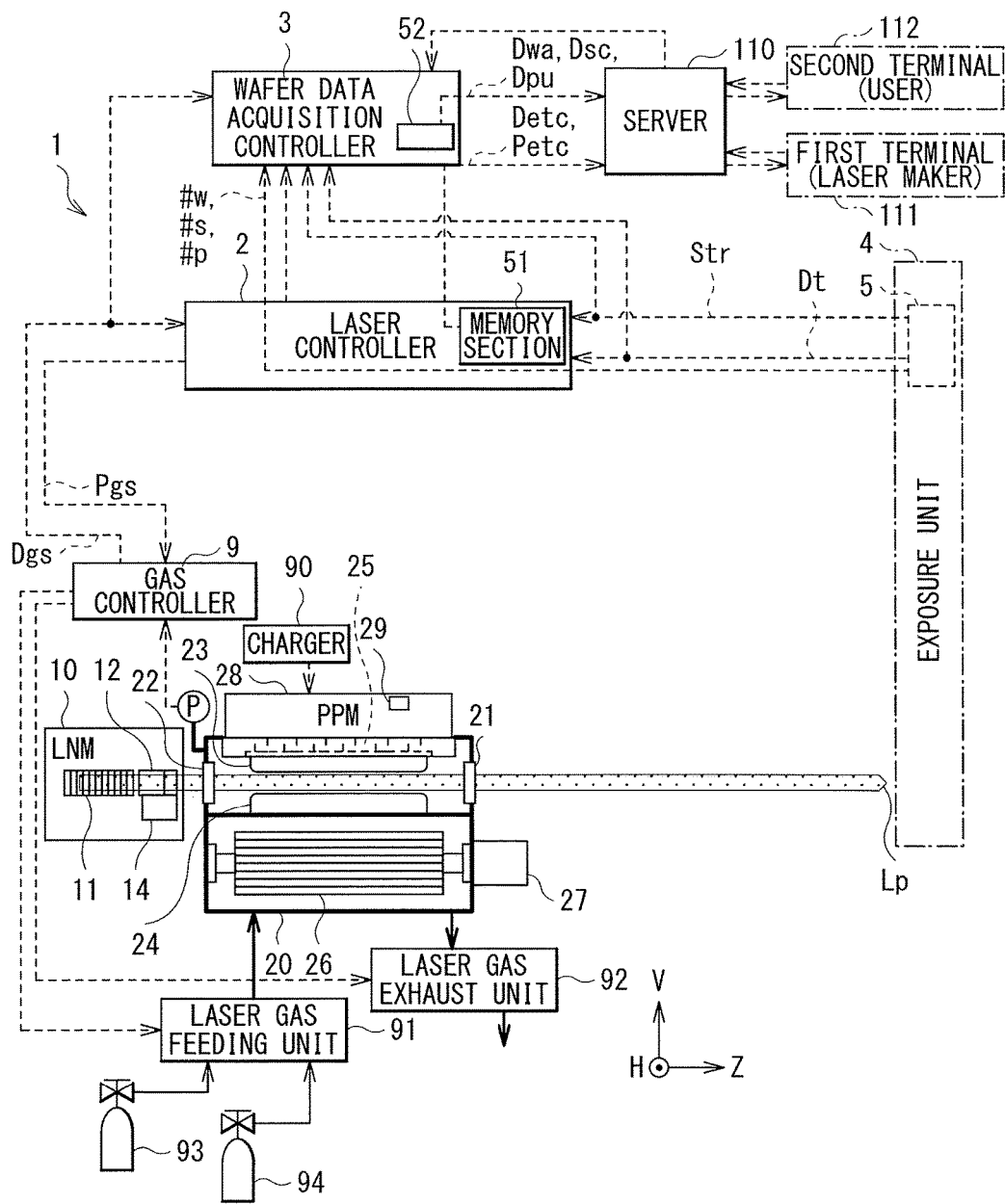
FIG. 27 schematically illustrates a configuration example of a part involving gas control in the laser unit management system according to the first embodiment.
Figure 28:
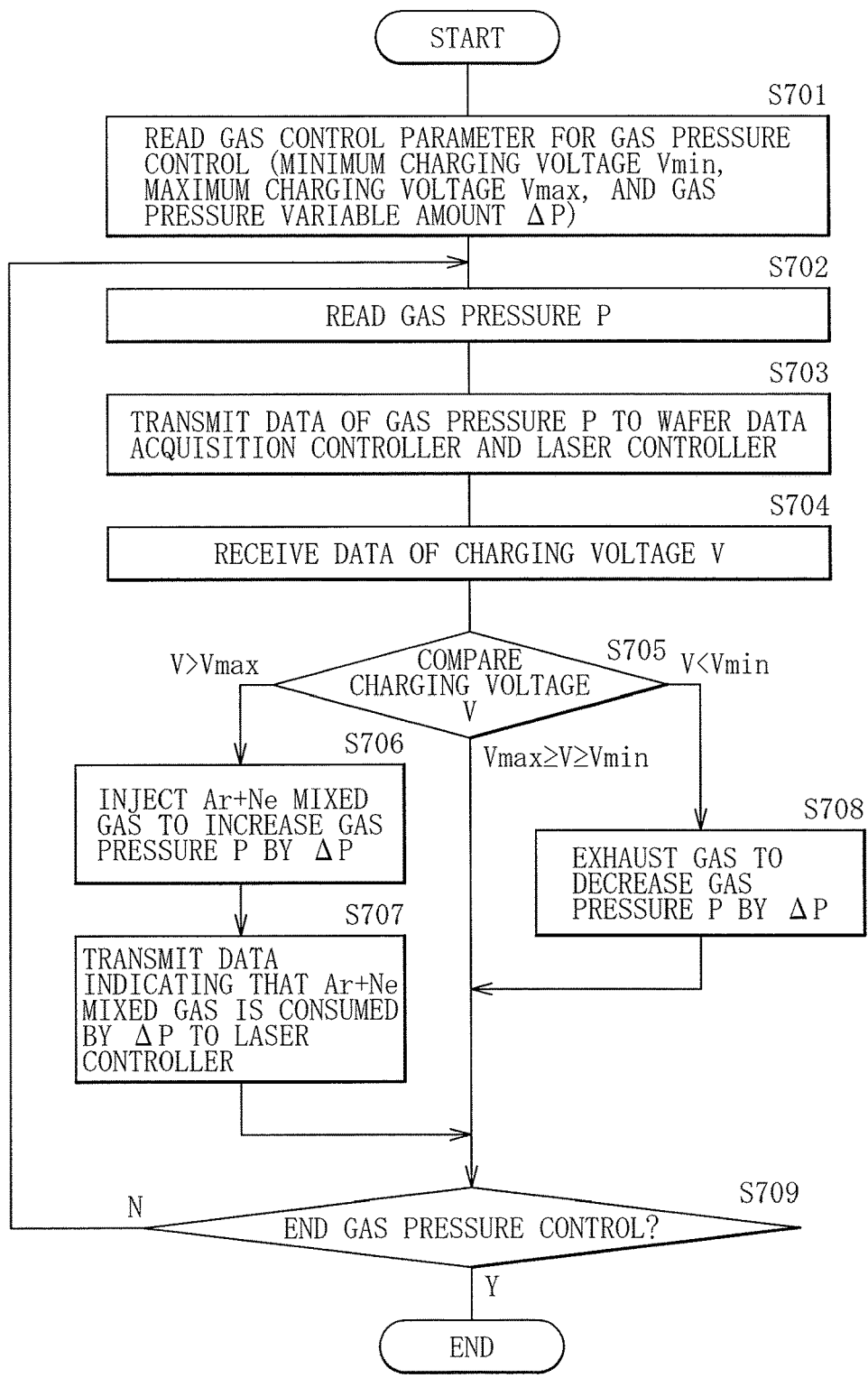
FIG. 28 is a flowchart illustrating an example of a flow of control involving gas pressure control by a gas controller in the laser unit management system according to the first embodiment.

FIG. 27 schematically illustrates a configuration example of a part involving gas control in the laser unit management system. FIG. 28 is a flowchart illustrating an example of a flow of control involving gas pressure control by the gas controller 9.

(Gas Pressure Control)

The gas controller 9 may perform reading of the gas control parameter Pgs for gas pressure control (step S701). At this occasion, the gas controller 9 may perform reading of the minimum charging voltage Vmin, the maximum charging voltage Vmax, and the gas pressure variable amount ΔP as the gas control parameter Pgs for gas pressures control via the laser controller 2.

Next, the gas controller 9 may perform reading of the gas pressure P in the laser chamber 20 measured by a pressure sensor (step S702).

Subsequently, the gas controller 9 may transmit data of the measured gas pressure P to the wafer data acquisition controller 3 and the laser controller 2 (step S703).

Thereafter, the gas controller 9 may receive data of the charging voltage V via the laser controller 2 (step S704).

Next, the gas controller 9 may compare the value of the charging voltage V with the minimum charging voltage Vmin and the maximum charging voltage Vmax (step S705). In a case where Vmax≥V≥Vmin is established, the gas controller 9 may determine whether to end the gas pressure control (step S709).

Moreover, in a case where V>Vmax is established, the gas controller 9 may control the laser gas feeding unit 91 to inject the Ar+Ne mixed gas into the laser chamber 20 so as to increase the gas pressure P by the gas pressure variable amount ΔP (step S706). Next, the gas controller 9 may transmit, to the laser controller 2, data indicating that the Ar+Ne mixed gas is consumed by the gas pressure variable amount ΔP (step S707). The laser controller 2 may integrate the gas pressure variable amount ΔP, thereby calculating a total consumed Ar+Ne mixed gas amount by the gas pressure control. Thereafter, the gas controller 9 may determine whether to end the gas pressure control (step S709).

Moreover, in a case where V<Vmin is established, the gas controller 9 may control the laser gas exhausting unit 92 to exhaust the gas contained in the laser chamber 20 so as to decrease the gas pressure P by the gas pressure variable amount ΔP (step S708). Thereafter, the gas controller 9 may determine whether to end the gas pressure control (step S709).

In a case where the gas controller 9 determines not to end the gas pressure control (step S709; N), the gas controller 9 may return to the process in the step S702. In contrast, in a case where the gas controller 9 determines to end the gas pressure control (step S709; Y), the gas controller 9 may end the process of the gas pressure control.

(Partial Gas Exchange Control)

Figure 29:
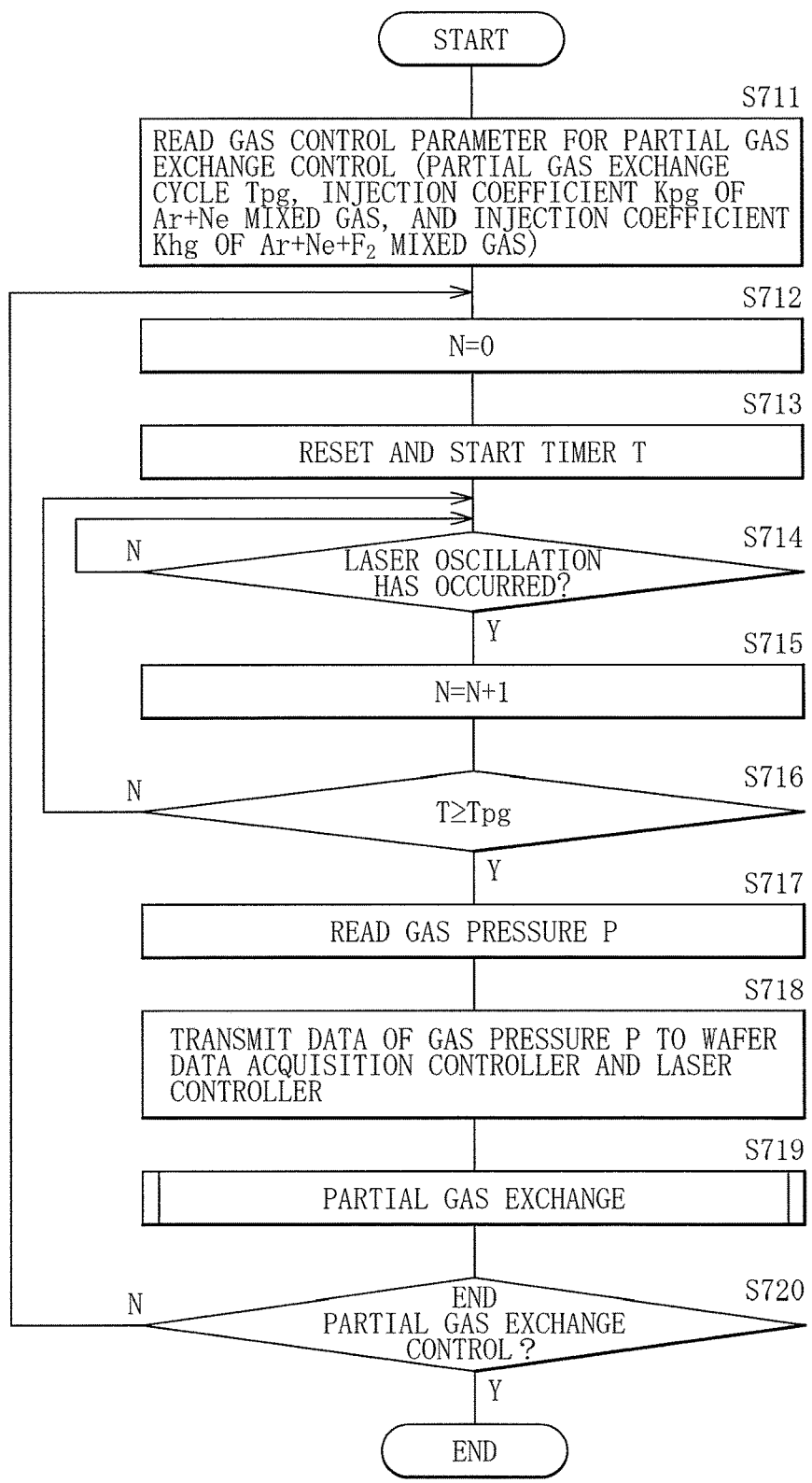
FIG. 29 is a flowchart illustrating an example of a flow of control involving partial gas exchange control by the gas controller in the laser unit management system according to the first embodiment.

FIG. 29 is a flowchart illustrating an example of a flow of control involving partial gas exchange control by the gas controller 9.

The gas controller 9 may perform reading of the gas control parameter Pgs for partial gas exchange control (step S711). At this occasion, the gas controller 9 may perform reading of the partial gas exchange cycle Tpg, the injection coefficient Kpg of the Ar+Ne mixed gas, and the injection coefficient Khg of the Ar+Ne+F$_2$ mixed gas as the gas control parameter Pgs for partial gas exchange control. The injection coefficient Kpg may be an injection amount of the Ar+Ne mixed gas per unit oscillation pulse. The injection coefficient Khg may be an injection amount of the Ar+Ne+F$_2$ mixed gas per unit oscillation pulse.

Next, the gas controller 9 may set an initial value of the counter value N of the pulse number to zero (step S712). Subsequently, the gas controller 9 may reset and start a timer T (step S713).

Thereafter, the gas controller 9 may determine whether laser oscillation has occurred (step S714). In a case where the gas controller 9 determines that laser oscillation has not occurred (step S714; N), the gas controller 9 may repeat the process in the step S714.

In contrast, in a case where the gas controller 9 determines that laser oscillation has occurred (step S714; Y), the gas controller 9 may set the counter value N of the pulse number to N+1 (step S715).

Next, the gas controller 9 may determine whether a value of the timer T reaches the partial gas exchange cycle Tpg (step S716). Thus, the gas controller 9 may measure the pulse number of laser oscillation in the partial gas exchange cycle Tpg. In a case where the gas controller 9 determines that the value of the timer T does not reach the partial gas exchange cycle Tpg (step S716; N), the gas controller 9 may return to the process in the step S714.

In contrast, in a case where the gas controller 9 determines that the value of the timer T reaches the partial gas exchange cycle Tpg (step S716; Y), the gas controller 9 may next perform reading of the gas pressure P in the laser chamber 20 measured by the pressure sensor (step S717).

Next, the gas controller 9 may transmit data of the measured gas pressure P to the wafer data acquisition controller 3 and the laser controller 2 (step S718).

Subsequently, the gas controller 9 may perform the process of the partial gas exchange illustrated in FIG. 30 to be described later (step S719).

The gas controller 9 may next determine whether to end the partial gas exchange (step S720). In a case where the gas controller 9 determines not to end the partial gas exchange control (step S720; N), the gas controller 9 may return to the process in the step S712. In contrast, in a case where the gas controller 9 determines to end the partial gas exchange control (step S720; Y), the gas controller 9 may end the process of the partial gas exchange control.

Figure 30:
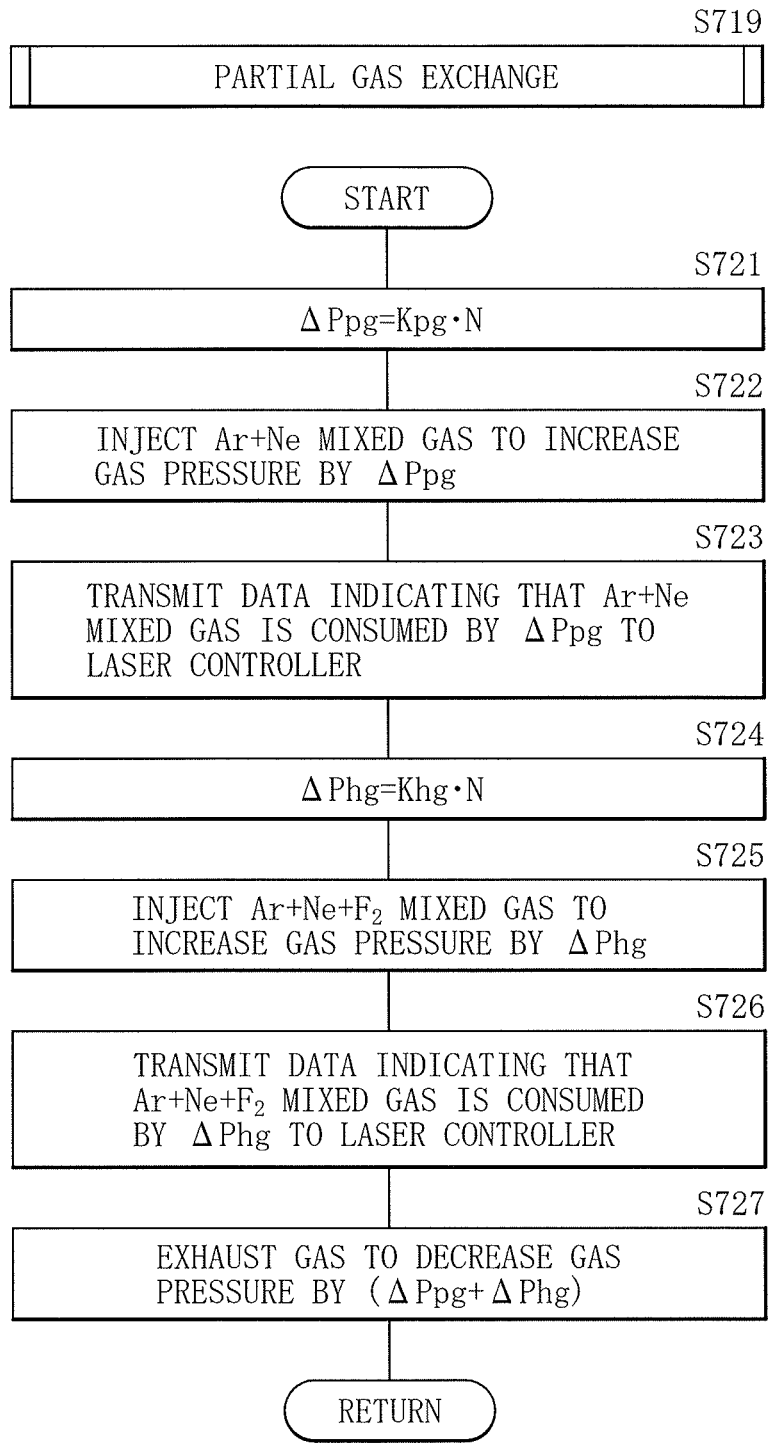
FIG. 30 is a sub-flowchart illustrating details of a process in step S719 in the flowchart illustrated in FIG. 29.

FIG. 30 is a sub-flowchart illustrating details of the process in step S719 in the flowchart illustrated in FIG. 29.

The gas controller 9 may calculate an amount ΔPpg (=Kpg·N) from the injection coefficient Kpg of the Ar+Ne mixed gas and the pulse number N of laser oscillation in the partial gas exchange cycle Tpg (step S721).

Next, the gas controller 9 may inject the Ar+Ne mixed gas into the laser chamber 20 to increase the gas pressure P by the amount ΔPpg (step S722).

Subsequently, the gas controller 9 may transmit, to the laser controller 2, data indicating that the Ar+Ne mixed gas is consumed by the amount ΔPpg (step S723). The laser controller 2 may integrate the amount ΔPpg, thereby calculating a total consumed Ar+Ne mixed gas amount by the gas pressure control.

Next, the gas controller 9 may calculate an amount ΔPhg (=Khg·N) from the injection coefficient Khg of the Ar+Ne+F$_2$ mixed gas and the pulse number N of laser oscillation in the partial gas exchange cycle Tpg (step S724).

Subsequently, the gas controller 9 may inject the Ar+Ne+F$_2$ mixed gas into the laser chamber 20 to increase the gas pressure P by the amount ΔPhg (step S725).

Next, the gas controller 9 may transmit, to the laser controller 2, data indicating that the Ar+Ne+F$_2$ mixed gas is consumed by the amount ΔPhg (step S726). The laser controller 2 may integrate the amount ΔPhg, thereby calculating a total consumed Ar+Ne+F$_2$ mixed gas amount by the gas pressure control.

Subsequently, the gas controller 9 may exhaust the gas contained in the laser chamber 20 to decrease the gas pressure P by an amount (ΔPpg+ΔPhg) (step S727). Thereafter, the gas controller 9 may perform the process in the step S720 in FIG. 29.

2.6 Other Control Systems (2.6.1 Configuration)
(Electric Power Line System)

Figure 31:
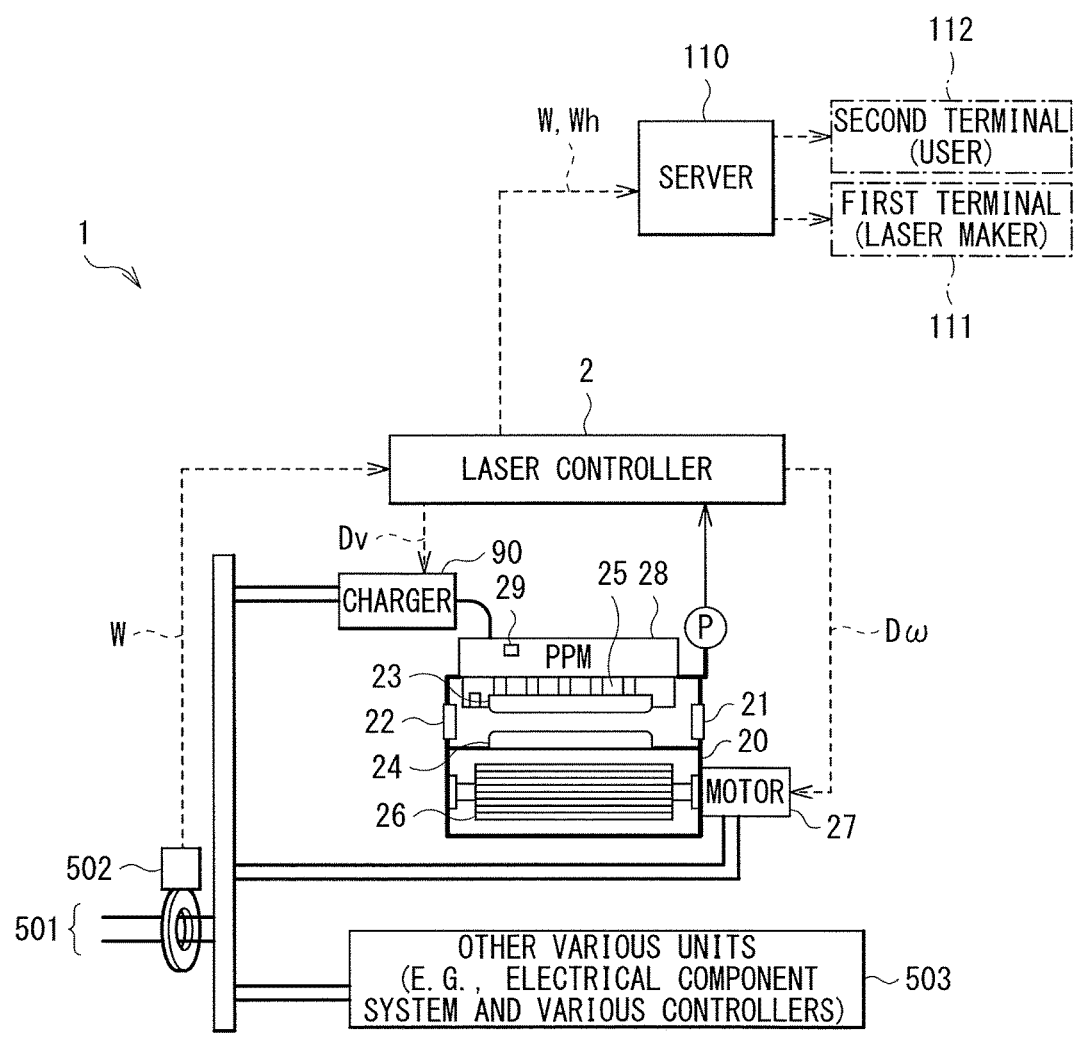
FIG. 31 schematically illustrates a configuration example of a part involving electric power consumption measurement in the laser unit management system according to the first embodiment.

FIG. 31 schematically illustrates a configuration example of a part involving electric power consumption measurement in the laser unit management system.

A wattmeter 502 may be provided to a main AC line 501 supplied to the laser unit 1 to measure electric power consumption in the laser unit 1. The AC line 501 may be coupled to the charger 90, the motor 27, and other various units 503. Examples of the other various units 503 may include an electrical component system and various controllers.

Alternatively, electric power consumption may be determined by calculation from control parameters of respective components.

For example, electric power consumption Wp for discharge in the laser chamber 20 may be determined from the charging voltage V, the capacity C0 of the charging capacitor 610 illustrated in FIG. 40 to be described later, and a repetition frequency Rep as follows.

$$Wp=(\tfrac{1}{2})C0 \cdot V^2 \cdot Rep$$

Electric power consumption Wc of the cross flow fan 26 may be determined from the revolutions of the cross flow fan 26 and the gas pressure P in the laser chamber 20 as follows.

$$Wc=(\alpha \cdot P+\beta) \cdot (\omega/\omega 0)3$$

where Wc is a kilowattage of the cross flow fan 26, $\alpha$ is a gas pressure coefficient, P is a gas pressure, $\beta$ is an offset constant, $\omega$ is revolutions, $\omega 0$ is reference revolutions (revolutions when $\alpha$ and $\beta$ are determined)

Calculation may be performed with electric consumption of other components being calculated as fixed electric power consumption Wo. Accordingly, electric power consumption W may be approximately calculated by W=Wp+Wc+Wo.

(Cooling Water Line System)

Figure 32:
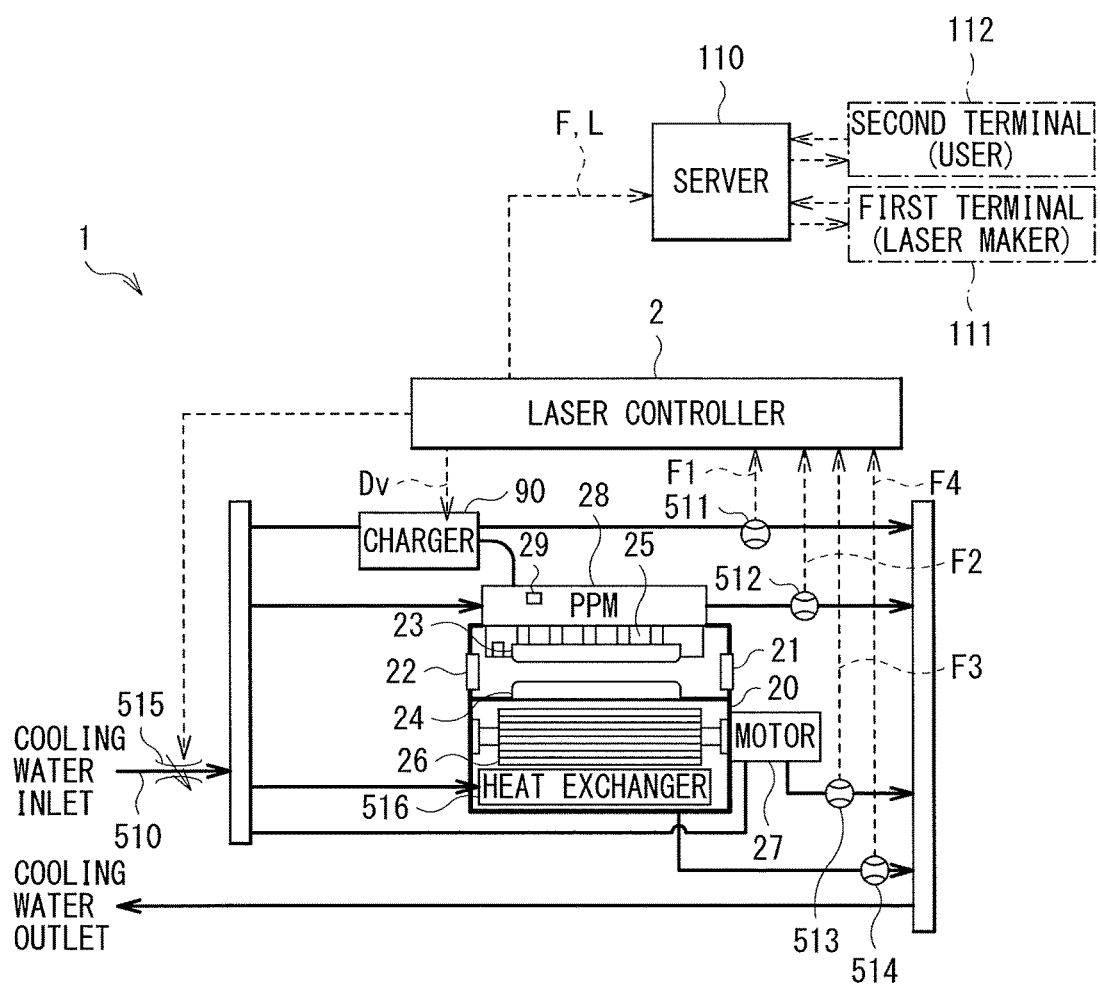
FIG. 32 schematically illustrates a configuration example of a part involving measurement of a cooling water flow rate in the laser unit management system according to the first embodiment.

FIG. 32 schematically illustrates a configuration example of a part involving measurement of a cooling water flow rate in the laser unit management system.

Cooling water 510 may flow mainly through cooling water lines of the charger 90, the pulse power module 213, a heat exchanger 516 of the laser chamber 20, the motor 27, etc. Flowmeters 511, 512, 513, and 514 may be provided to respective cooling water lines to calculate a total cooling water amount F from a total sum of cooling water flow rates F1, F2, F3, and F4 of the flowmeters 511, 512, 513, and 514.

A flow rate adjustment valve 515 may be provided at an inlet of the cooling water 510.

In addition, a cooling water flowmeter may be provided at a cooling water inlet or a cooling water outlet without limitation to the foregoing example to measure a flow rate.

(2.0.2 Operation)

(Control Operation of Ecology Measurement)

Figure 33:
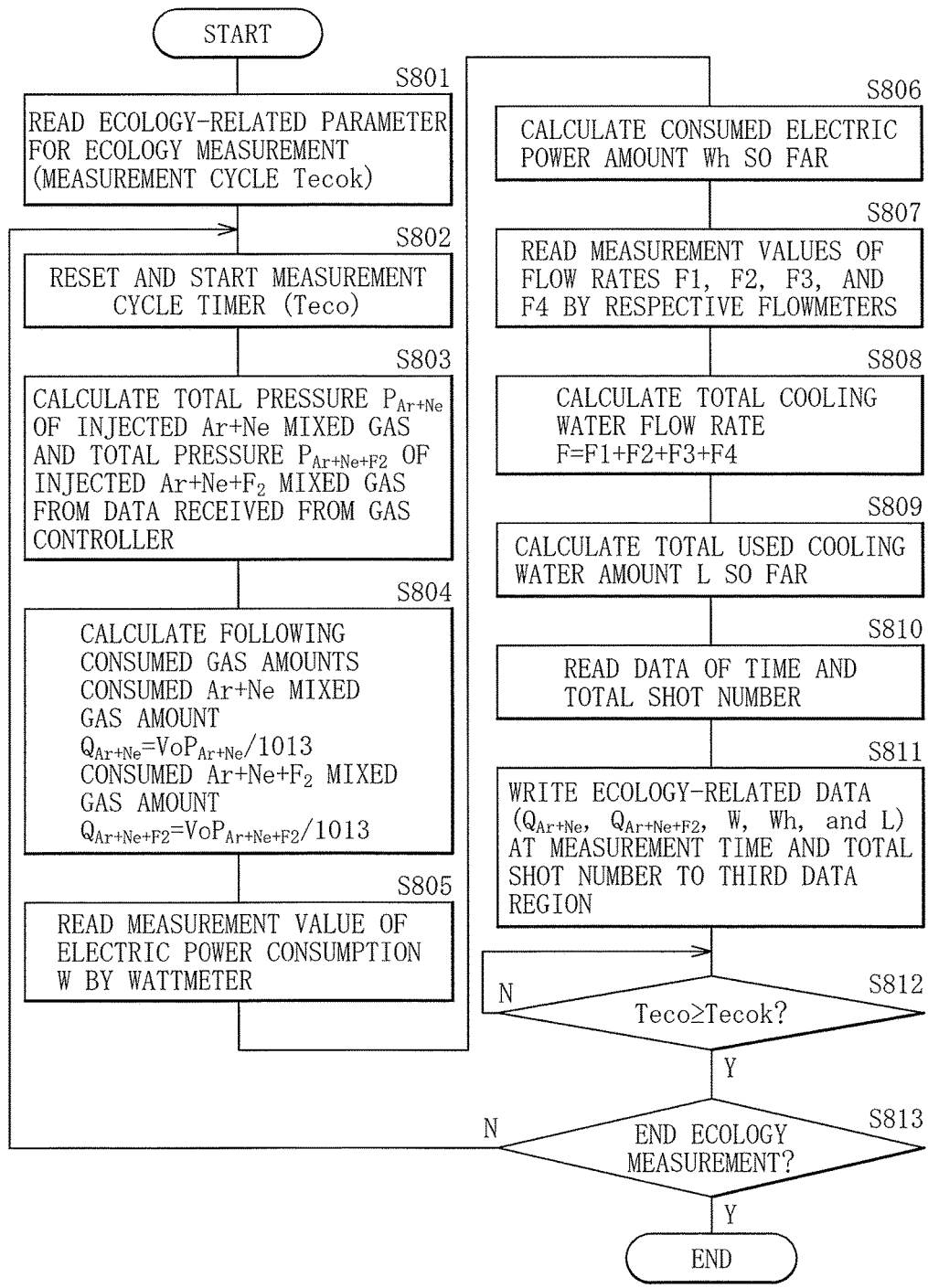
FIG. 33 is a flowchart illustrating an example of a flow of control involving ecology measurement by the laser controller in the laser unit management system according to the first embodiment.

FIG. 33 is a flowchart illustrating an example of a flow of control involving ecology measurement by the laser controller 2.

The laser controller 2 may perform reading of the ecology-related parameter Pec for ecology measurement (step S801). At this occasion, the laser controller 2 may perform reading of a measurement cycle Tecok as the ecology-related parameter Pec for ecology measurement. The ecology measurement may be performed at the measurement cycle Tecok.

Next, the laser controller 2 may reset and start a measurement cycle timer (Teco) (step S802).

Subsequently, the laser controller 2 may calculate total pressure $P_{Ar+Ne}$ of the Ar+Ne mixed gas injected into the laser chamber 20 and total pressure $P_{Ar+Ne+F2}$ of the Ar+Ne+$F_2$ mixed gas injected into the laser chamber 20 from data received from the gas controller 9 (step S803).

Next, the laser controller 2 may calculate a consumed Ar+Ne mixed gas amount $Q_{Ar+Ne}$ and a consumed Ar+Ne+$F_2$ mixed gas amount $Q_{Ar+Ne+F2}$ by the following expression, where Vo is a laser chamber volume and atmospheric pressure is 1013 hpa (step S804).

$$Q_{Ar+Ne}=Vo \cdot P_{Ar+Ne}/1013$$

$$Q_{Ar+Ne+F2}=Vo \cdot P_{Ar+Ne+F2}/1013$$

Subsequently, the laser controller 2 may perform reading of a measurement value of the electric power consumption W by the wattmeter 502 (step S805). Next, the laser controller 2 may integrate the electric power consumption W so far to calculate a consumed electric power amount Wh so far (step S806).

Next, the laser controller 2 may perform reading of measurement values of the flow rates F1, F2, F3, and F4 by the flowmeters 511, 512, 513, and 514 (step S807).

Subsequently, the laser controller 2 may perform calculation of the total cooling water flow rate F from the total sum of the flow rates F1, F2, F3, and F4 (step S808).

$$F=F1+F2+F3+F4$$

Next, the laser controller 2 may integrate the total cooling water flow rate F so far to calculate a total used cooling water amount L so far (step S809).

Subsequently, the laser controller 2 may perform reading of data of a measurement time and the total shot number (step S810).

Thereafter, the laser controller 2 may write, to the third data region 110C of the server 110, the ecology-related data ($Q_{Ar+Ne}$, $Q_{Ar+Ne+F2}$, W, Wh, and L) at the measurement time and the total shot number (step S811).

Next, the laser controller 2 may determine whether the value of the timer (Teco) of the measurement cycle reaches the measurement cycle Tecok (step S812). In a case where the laser controller 2 determines that the value does not reach the measurement cycle Tecok (step S812; N), the laser controller 2 may repeat the process in the step S812.

In contrast, in a case where the laser controller 2 determines that the value reaches the measurement cycle Tecok (step S812; Y), the laser controller 2 may determine whether to end the ecology measurement (step S813).

In a case where the laser controller 2 determines not to end the ecology measurement (step S813; N), the laser controller 2 may return the process in the step S802. In contrast, in a case where the laser controller 2 determines to end the ecology measurement (step S813; Y), the laser controller 2 may end the process of the ecology measurement.

(Control Operation of Error Log Acquisition)

FIG. 34 is a flowchart illustrating an example of a flow of control involving error log acquisition by the laser controller 2.

The laser controller 2 may perform initial setting of an error parameter for error log acquisition (step S901). The error parameter for error log acquisition may include energy control error parameters $\Delta Emax1$ and $\Delta Emin1$, spectrum control error parameters $\delta\lambda max1$ and $\delta\lambda min1$, spectrum control error parameters $\Delta\Delta\lambda max1$ and $\Delta\Delta\lambda min1$, and gas control error parameters Vmax1 and Vmin1.

At this occasion, the energy control error parameter $\Delta Emax1$ may be a maximum limit value of the difference $\Delta E$ (=E−Et) between the pulse energy E and the target pulse energy Et. The energy control error parameter $\Delta Emin1$ may be a minimum limit value of the difference $\Delta E$ between the pulse energy E and the target pulse energy Et. The spectrum control error parameter $\delta\lambda max1$ may be a maximum limit value of the difference $\delta\lambda$ (=$\lambda$−$\lambda t$) between the wavelength $\lambda$ and the target wavelength $\lambda t$. The spectrum control error parameter $\delta\lambda min1$ may be a minimum limit value of the difference $\delta\lambda$ between the wavelength $\lambda$ and the target wavelength $\lambda t$. The spectrum control error parameter $\Delta\Delta\lambda max1$ may be a maximum limit value of the difference $\Delta\Delta\lambda$ ($=\Delta\lambda-\Delta\lambda t$) between the spectral linewidth $\Delta\lambda$ and the target spectral linewidth $\Delta\lambda t$. The spectrum control error parameter $\Delta\Delta\lambda min1$ may be a minimum limit value of the difference $\Delta\Delta\lambda$ between the spectral linewidth $\Delta\lambda$ and the target spectral linewidth $\Delta\lambda t$. The gas control error parameter Vmax1 may be a maximum limit value of the charging voltage V. The gas control error parameter Vmin1 may be a minimum limit value of the charging voltage V.

Next, the laser controller 2 may perform reading of the difference $\Delta E$ between the pulse energy E and the target pulse enemy Et (step S902).

Subsequently, the laser controller 2 determines whether a condition of $\Delta Emin1 \le \Delta E \le \Delta Emax1$ is satisfied (step S903). In a case where the laser controller 2 determines that $\Delta Emin1 \le \Delta E \le \Delta Emax1$ is not satisfied (step S903; N), the laser controller 2 may determine that an energy control error occurs, and acquire error log data (step S904). Thereafter, the laser controller 2 may perform the process in the step S911.

In contrast, in a case where the laser controller 2 determines that $\Delta Emin1 \le \Delta E \le \Delta Emax1$ is satisfied (step S903; Y), the laser controller 2 may next determine whether a condition of $\delta\lambda min1 \le \delta\lambda \le \delta\lambda max1$ is satisfied (step S905).

In a case where the laser controller 2 determines that $\delta\lambda min1 \le \delta\lambda \le \delta\lambda max1$ is not satisfied (step S905; N), the laser controller 2 may determine that a spectrum control error occurs, and acquire error log data (step S906). Thereafter, the laser controller 2 may perform the process in the step S911.

In contrast, in a case where the laser controller 2 determines that $\delta\lambda min1 \le \delta\lambda \le \delta\lambda max1$ is satisfied (step S905; Y), the laser controller 2 may next determine whether a condition of $\Delta\Delta\lambda min1 \le \Delta\Delta\lambda \le \Delta\Delta\lambda max1$ is satisfied (step S907).

In a case where the laser controller 2 determines that $\Delta\Delta\lambda min1 \le \Delta\Delta\lambda \le \Delta\Delta\lambda max1$ is not satisfied (step S907; N), the laser controller 2 may determine that a spectrum control error occurs, and acquire error log data (step S908). Thereafter, the laser controller 2 may perform the process in the step S911.

In contrast, in a case where the laser controller 2 determines that $\Delta\Delta\lambda min1 \le \Delta\Delta\lambda \le \Delta\Delta\lambda max1$ is satisfied (step S907; Y), the laser controller 2 may next determine whether a condition of $Vmin1 \le V \le Vmax1$ is satisfied (step S909).

In a case where the laser controller 2 determines that $Vmin1 \le V \le Vmax1$ is not satisfied (step S909; N), the laser controller 2 may determine that a gas control error occurs, and acquire error log data (step S910). Thereafter, the laser controller 2 may perform the process in the step S911.

In contrast, in a case where the laser controller 2 determines that $Vmin1 \le V \le Vmax1$ is satisfied (step S909; Y), the laser controller 2 may next determine whether to end the process of error log acquisition (step S914). In a case where the laser controller 2 determines not to end the process of the error log acquisition (step S914; N), the laser controller 2 may return to the process in the step S902. In contrast, in a case where the laser controller 2 determines to end the process of the error log acquisition (step S914; Y), the laser controller 2 may end the process of the error log acquisition of data.

Moreover, the laser controller 2 may perform reading of a time upon the error log data acquisition as the process in the step S911. Next, the laser controller 2 may perform reading of the total shot number from installation of the laser unit 1 (step S912). Thereafter, the laser controller 2 may perform writing of the time, the total shot number, and the error log data to the first data region 110A or the third data region 110C of the server 110 (step S913). Thereafter, the laser controller 2 may end the process of the error log acquisition.

2.7 Modification Examples

The above description involves an example in which the laser unit 1 is an ArF excimer laser; however, the present embodiment is not limited to the example. For example, the laser unit 1 may be, for example, an excimer laser such as a KrF excimer laser, a XeCl excimer laser, and a XeF excimer laser. Moreover, a predetermined amount of a mixed gas of a rare gas and a buffer gas and a predetermined amount of a mixed gas of a rare gas, a buffer gas, and a halogen gas may be injected into the laser chamber 20 to produce a laser gas.

Moreover, the above description involves an example in which the laser unit 1 is of a single chamber system; however, the present embodiment is not limited to the example. For example, the laser unit 1 may be a laser unit including, in the optical path between the output coupler mirror 35 and the monitor module 30, another amplifier provided with a laser chamber and an optical resonator.

Further, the above description involves an example in which the laser maker and the user access the server 110 from different terminals; however, the present embodiment is not limited to the example.

Figure 35:
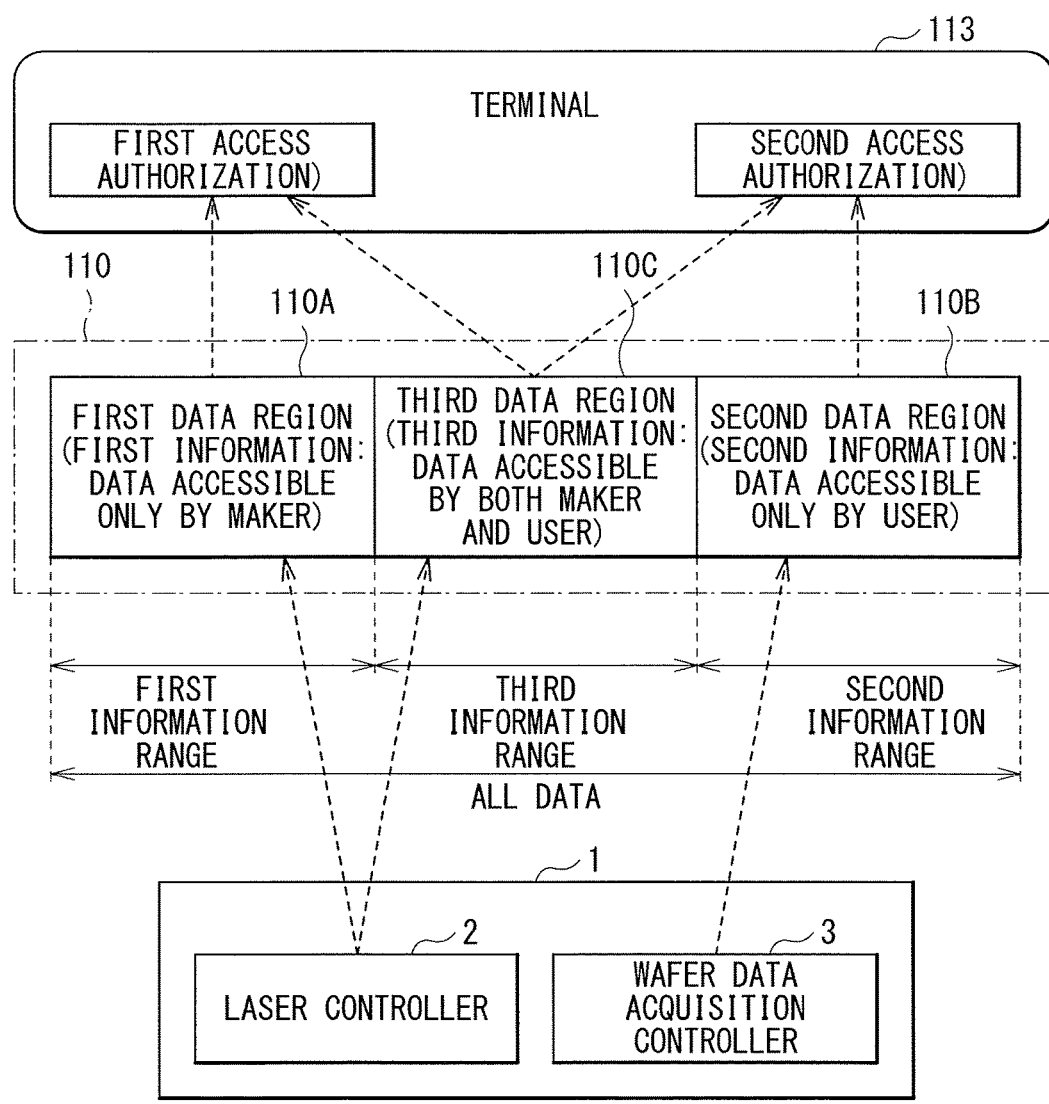
FIG. 35 schematically illustrates an example of a relationship between data regions of a server and access authorizations in a laser unit management system according to a modification example of the first embodiment.

For example, the first access authorization serving as an authorization of the laser maker and the second access authorization serving as an authorization of the user may be set to one terminal 113, as illustrated in FIG. 35. For example, the first access authorization and the second access authorization may be set to one PC serving as the terminal 113 with use of an ID and a password.

Moreover, for example, an operation section such as a console panel may be provided to the laser unit 1 without providing a terminal as a unit different from the laser unit 1, and the first access authorization and the second access authorization may be set as authorizations to operate the operation section. This may allow an access to the server 110 with the first access authorization or the second access authorization via the operation section provided to the laser unit 1.

<3. Second Embodiment> (Laser Unit Management System Having Function of Changing Setting by User)

Next, description is given of a laser unit management system according to a second embodiment of the present disclosure. Note that substantially same components as the components of the laser unit management system according to the foregoing comparative example or the foregoing first embodiment are denoted by same reference numerals, and redundant description thereof is omitted.

3.1 Configuration and Operation

Figure 36:
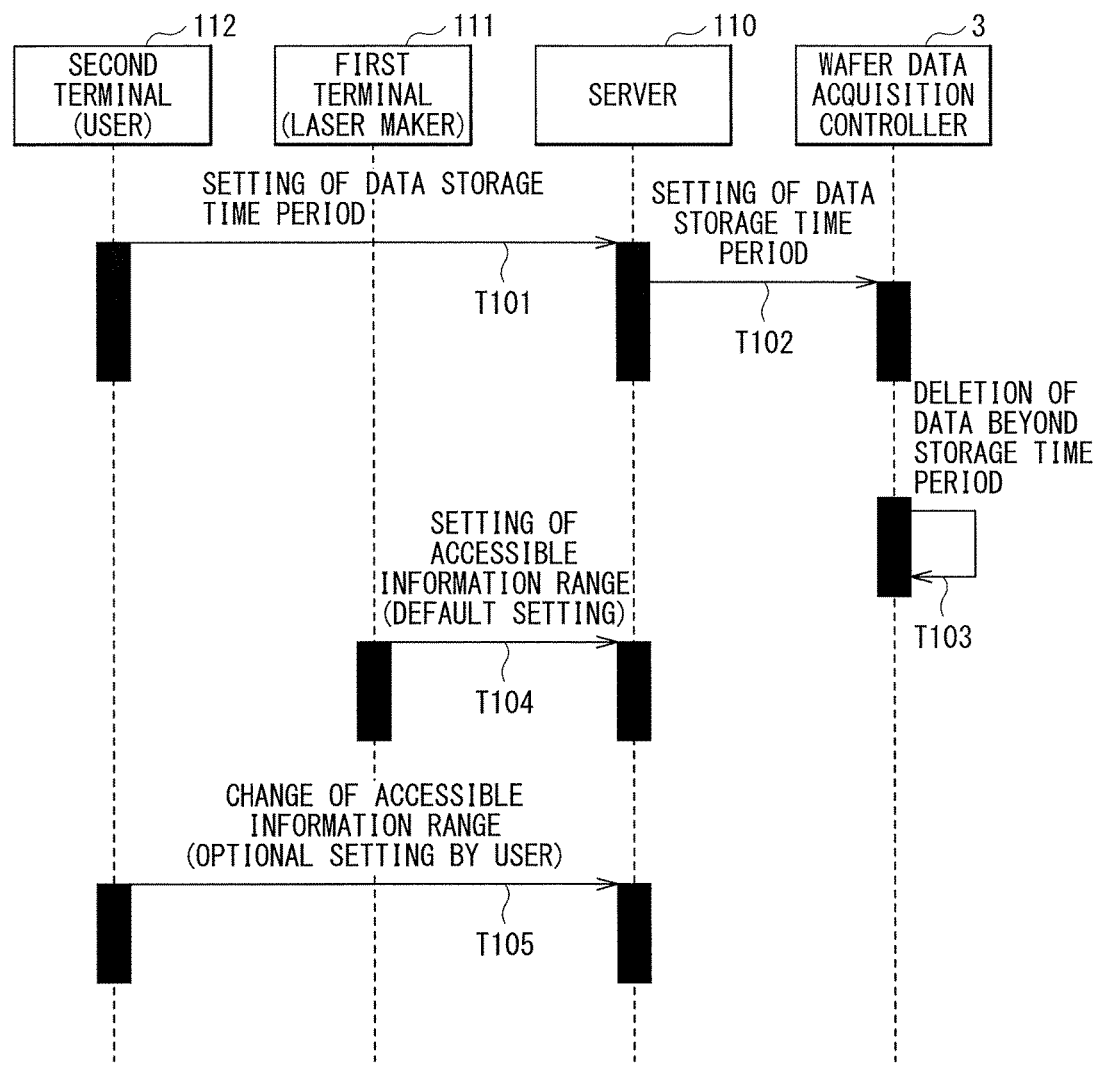
FIG. 36 is a sequence diagram related to setting of a server in a laser unit management system according to a second embodiment.
Figure 37:
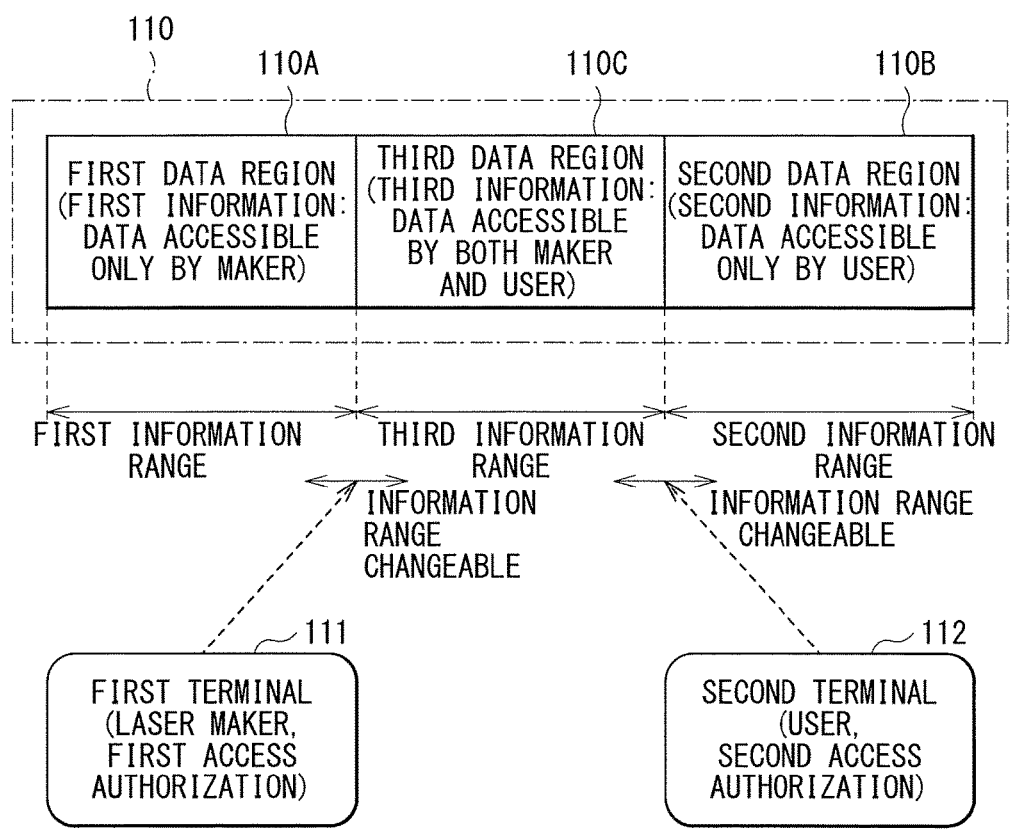
FIG. 37 schematically illustrates an example of setting of information ranges in data regions of the server in the laser unit management system according to the second embodiment.

FIG. 36 is a sequence diagram related to setting of the server 110 in the laser unit management system according to the second embodiment of the present disclosure. FIG. 37 schematically illustrates an example of setting of information ranges in data regions of the server 110.

(Setting of Data Storage Time Period)

A data storage time period in the memory section 52 of the wafer data acquisition controller 3 may be settable and changeable from the second terminal 112 via the server 110, as indicated by T101 and T102 in FIG. 36. Data beyond the storage time period may be deleted from the memory section 52, as indicated by T103 in FIG. 36. It is to be noted that deletion of data may include overwriting with newly received data, etc.

(Setting of Information Range)

As illustrated in FIG. 37, a range of contents in the first information stored in the first data region 110A of the server 110 may be changeable with the first access authorization from the first terminal 111. A range of contents in the third information that is accessible with both the first access authorization and the second access authorization may be changed with a change in the range of contents in the first information. For example, the range of contents in the third information may be changed with the first access authorization so as to include one of various control parameters such as the ecology-related parameter Pec in the third information.

Moreover, a range of contents in the second information stored in the second data region 110B of the server 110 may be changeable with the second access authorization from the second terminal 112. The range of contents in the third information that is accessible with both the first access authorization and the second access authorization may be changed with a change in the range of contents in the second information. For example, the range of contents in the third information may be changed with the second access authorization so as to associate the ecology-related parameter Pec included in the third information with the wafer exposure-related information and include the ecology-related parameter Pec in the second information.

The range of contents in the first information and the range of contents in the second information may be set to default ranges with the first access authorization from the first terminal 111, as indicated by T104 in FIG. 36. Thereafter, the range of contents in the second information may be changed with the second access authorization from the second terminal 112, as indicated by T105 in FIG. 36.

Other configurations and operations may be substantially similar to those of the laser unit management system according to the foregoing comparative example or the foregoing first embodiment.

3.2 Workings and Effects

According to the laser unit management system of the present embodiment, the range of contents in the second information that is accessible only by the user may be changed to any range by the user himself. Moreover, the data storage time period in the memory section 52 of the wafer data acquisition controller 3 may be changed to any time period by the user himself. This makes it possible to enhance safety of the second information that is accessible only by the user.

Other workings and effects may be substantially similar to those of the laser unit management system according to the foregoing first embodiment.

<4. Third Embodiment> (Specific Examples of Components)

Next, description is given of specific examples of components in the laser unit management system of the foregoing first embodiment or the foregoing second embodiment. Note that substantially same components as the components of the laser unit management system according to any of the foregoing comparative example, the foregoing first embodiment, and the foregoing second embodiment are denoted by same reference numerals, and redundant description thereof is omitted.

4.1 Specific Example of Monitor Module (4.1.1 Configuration)

FIG. 38 schematically illustrates a configuration example of the monitor module 30 in the laser unit management system according to the foregoing first embodiment or the foregoing second embodiment. FIG. 38 schematically illustrates a configuration example in a case where the spectrum measuring instrument 34 in the monitor module 30 is a monitor etalon spectroscope.

The monitor module 30 may include the beam splitters 31 and 32, the pulse energy measuring instrument 33, and the spectrum measuring instrument 34.

The spectrum measuring instrument 34 may include a diffusion device 341, a monitor etalon 342, a condenser lens 343, and an image sensor 344. The image sensor 344 may be a photodiode array. A focal length of the condenser lens 343 may be defined as f.

The pulse energy measuring instrument 33 may include a condenser lens 331 and an optical sensor 332. The optical sensor 332 may be a high-speed photodiode having resistance to ultraviolet light. The optical sensor 332 may be located substantially at a condensing position of the condenser lens 331.

The beam splitter 31 may be disposed in the optical path of the pulsed laser light Lp outputted from the output coupler mirror 35. The beam splitter 32 may be disposed in the optical path of the pulsed laser light Lp reflected by the beam splitter 31. The beam splitter 32 may be so disposed as to allow reflected light to enter the pulse energy measuring instrument 33 and as to allow light having passed therethrough to enter the spectrum measuring instrument 34.

(4.1.2 Operation)

The beam splitter 31 and the beam splitter 32 may cause a part of the pulsed laser light Lp outputted from the output coupler mirror 35 to enter the pulse energy measuring instrument 33 as sample light used to detect the pulse energy E. The condenser lens 331 may cause the sample light having entered the pulse energy measuring instrument 33 to be condensed on a sensor surface of the optical sensor 332. Thus, the pulse energy measuring instrument 33 may detect the pulse energy E of the pulsed laser light Lp outputted from the output coupler mirror 35. The pulse energy measuring instrument 33 may transmit data of the thus-detected pulse energy E to the energy controller 6.

In contrast, the light having passed through the beam splitter 32 may first enter the diffusion device 341. The diffusion device 341 may scatter the incident light. The thus-scattered light may enter the monitor etalon 342. The light having passed through the monitor etalon 342 may enter the condenser lens 343, and an interference fringe may be generated on a focal surface of the condenser lens 343.

The image sensor 344 may be disposed on the focal surface of the condenser lens 343. The image sensor 344 may detect the interference fringe on the focal surface. The square of a radius r of the interference fringe may be proportional to the wavelength λ of the pulsed laser light Lp. Accordingly, the image sensor 344 may detect the spectral linewidth Δλ and a central wavelength as spectrum profiles of the pulsed laser light Lp from the detected interference fringe. The spectral linewidth Δλ and the central wavelength may be determined from the detected interference fringe by an unillustrated information processor, or may be calculated by the spectrum controller 7.

A relationship between the radius r of the interference fringe and the wavelength λ may be approximated by the following expression (1).

$$\lambda = \lambda c + \alpha r^2 \quad (1)$$

where α is a proportionality constant, r is the radius of the interference fringe, and λc is a wavelength when light intensity of a center of the interference fringe is maximum.

Figure 39:
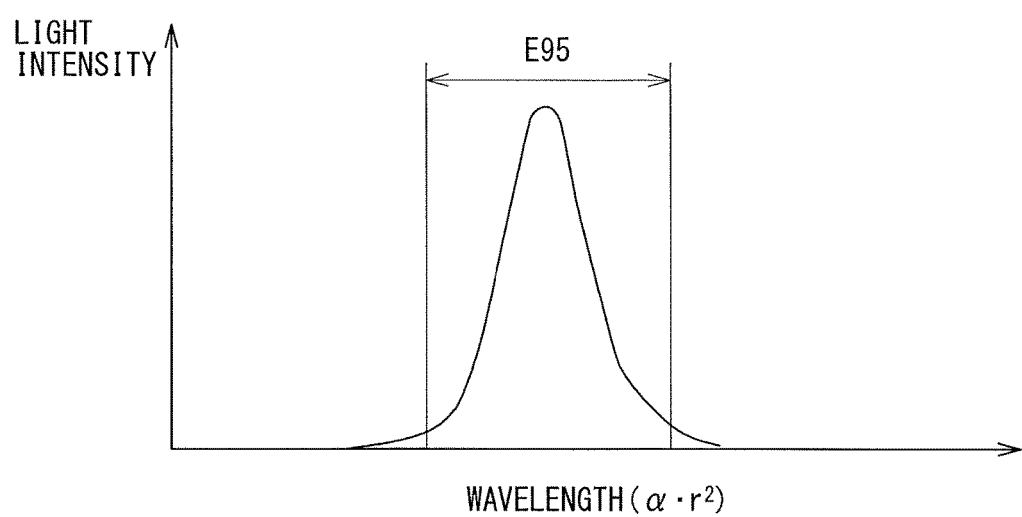
FIG. 39 schematically illustrates an example of a spectral linewidth measured by a spectrum measuring instrument of the monitor module illustrated in FIG. 38.

FIG. 39 schematically illustrates an example of the spectral linewidth Δλ measured by the spectrum measuring instrument 34.

The interference fringe may be converted into a spectral waveform indicating a relationship between light intensity and the wavelength λ by the foregoing expression (1), and thereafter, E95 may be calculated as the spectral linewidth Δλ. Alternatively, a full width at half maximum of the spectral waveform may be regarded as the spectral linewidth Δλ.

Other Examples

It is to be noted that the present embodiment involves an example in which one monitor etalon 342 performs measurement of the wavelength λ and measurement of the spectral linewidth Δλ; however, the present embodiment is not limited to this example. For example, a plurality of monitor etalons having different resolutions may be provided to measure an interference fringe with a plurality of line sensors. In this case, the focal length of the condenser lens 343 may be increased, and a monitor etalon having a small free spectral range (FSR) and high resolution may be used to measure the spectral linewidth Δλ.

Moreover, data of a waveform of the interference fringe and a peak light amount of the interference fringe may be measured at every predetermined shot number, and may be stored in the first data region that is accessible only by the laser maker of the server 110.

4.2 Specific Example of Pulse Power Module (4.2.1 Configuration)

Figure 40:
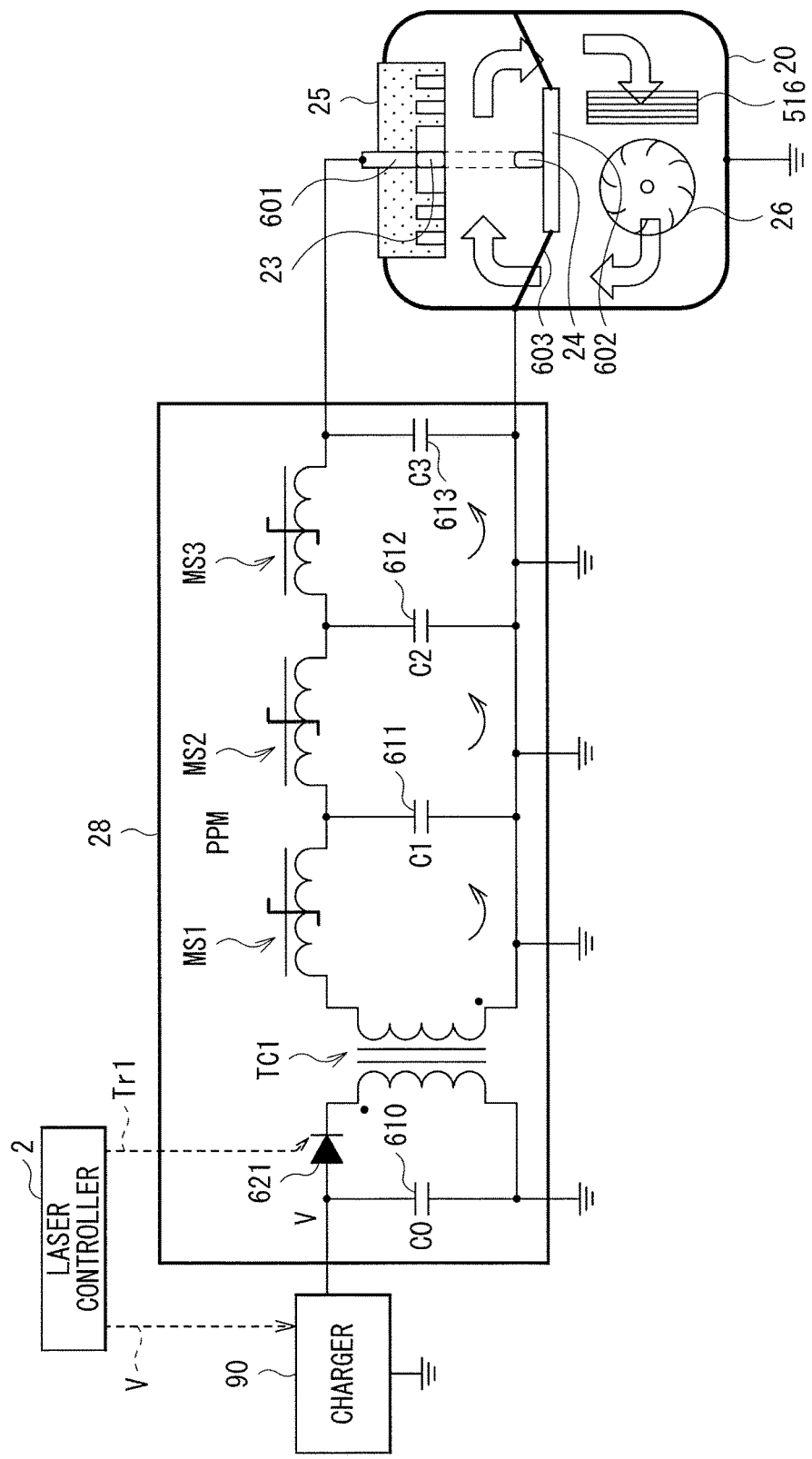
FIG. 40 schematically illustrates a configuration example of a pulse power module in the laser unit management system according to the first embodiment or the second embodiment.

FIG. 40 schematically illustrates a configuration example of the pulse power module 28 in the laser unit management system according to the foregoing first embodiment or the foregoing second embodiment.

The pulse power module 28 may include the charging capacitor 610, a semiconductor switch 621, a transformer TC1, magnetic switches MS1, MS2, and MS3, and capacitors 611, 612, and 613.

The capacity of the charging capacitor 610 may be defined as C0. The capacity of the capacitor 611 may be defined C1. The capacity of the capacitor 612 may be defined as C2. The capacity of the capacitor 613 may be defined as C3.

The pulse power module 28 may be electrically coupled to the charger 90 and the laser chamber 20. The pulse power module 28 and the charger 90 may be electrically coupled to the laser controller 2.

In the laser chamber 20, the discharge electrode 23 may be electrically coupled to the pulse power module 28 via a current feedthrough 601. The discharge electrode 24 may be electrically coupled to the pulse power module 28 via the electrode holder 602.

(4.2.2 Operation)

The charger 90 may apply the charging voltage V to the charging capacitor 610 upon reception of a signal of the charging voltage V from the laser controller 2. Energy stored in the charging capacitor 610 by the charging voltage V may be $(\frac{1}{2})C0 \cdot V^2$, where the capacity of the charging capacitor 610 is C0. Energy Ed for discharge per pulse in the laser chamber 20 may be equal to $(\frac{1}{2})C0 \cdot V^2$. The electric power consumption Wp for discharge may be equal to $Rep \cdot (\frac{1}{2}) C0 \cdot V^2$, where Rep is a pulse repetition frequency.

The laser controller 2 may transmit an oscillation trigger Tr1 to the semiconductor switch 621 of the pulse power module 28 to cause a pulse voltage in the pulse power module 28.

The transformer TC1, the magnetic switches MS1, MS2, and MS3, and the capacitors 611, 612, and 613 in the pulse power module 28 may form a magnetic pulse compression circuit. A pulse width of the pulse voltage may be compressed by the magnetic pulse compression circuit in the pulse power module 28.

The pulse voltage having a compressed pulse width may be applied to the current feedthrough 601 and the electrode holder 602 in the laser chamber 20. Thus, the pulse voltage may be applied between the discharge electrode 23 and the discharge electrode 24 via the current feedthrough 601 and the electrode holder 602. The pulse voltage applied between the discharge electrode 23 and the discharge electrode 24 may cause discharge in the laser gas provided between the discharge electrode 23 and the discharge electrode 24. The discharge of the laser gas may cause generation of the pulsed laser light Lp.

The laser gas provided between the discharge electrode 23 and the discharge electrode 24 may be circulated in the laser chamber 20 by the cross flow fan 26. The laser gas circulated by the cross flow fan 26 may be cooled by the heat exchanger 516.

Other configurations, operations, etc. may be substantially similar to those of the laser unit management system according to any of the foregoing comparative example, the foregoing first embodiment, and the foregoing second embodiment.

5. Hardware Environment of Controller

A person skilled in the art will appreciate that a general-purpose computer or a programmable controller may be combined with a program module or a software application to execute any subject matter disclosed herein. The program module, in general, may include one or more of a routine, a program, a component, a data structure, and so forth that each causes any process described in any example embodiment of the present disclosure to be executed.

Figure 41:
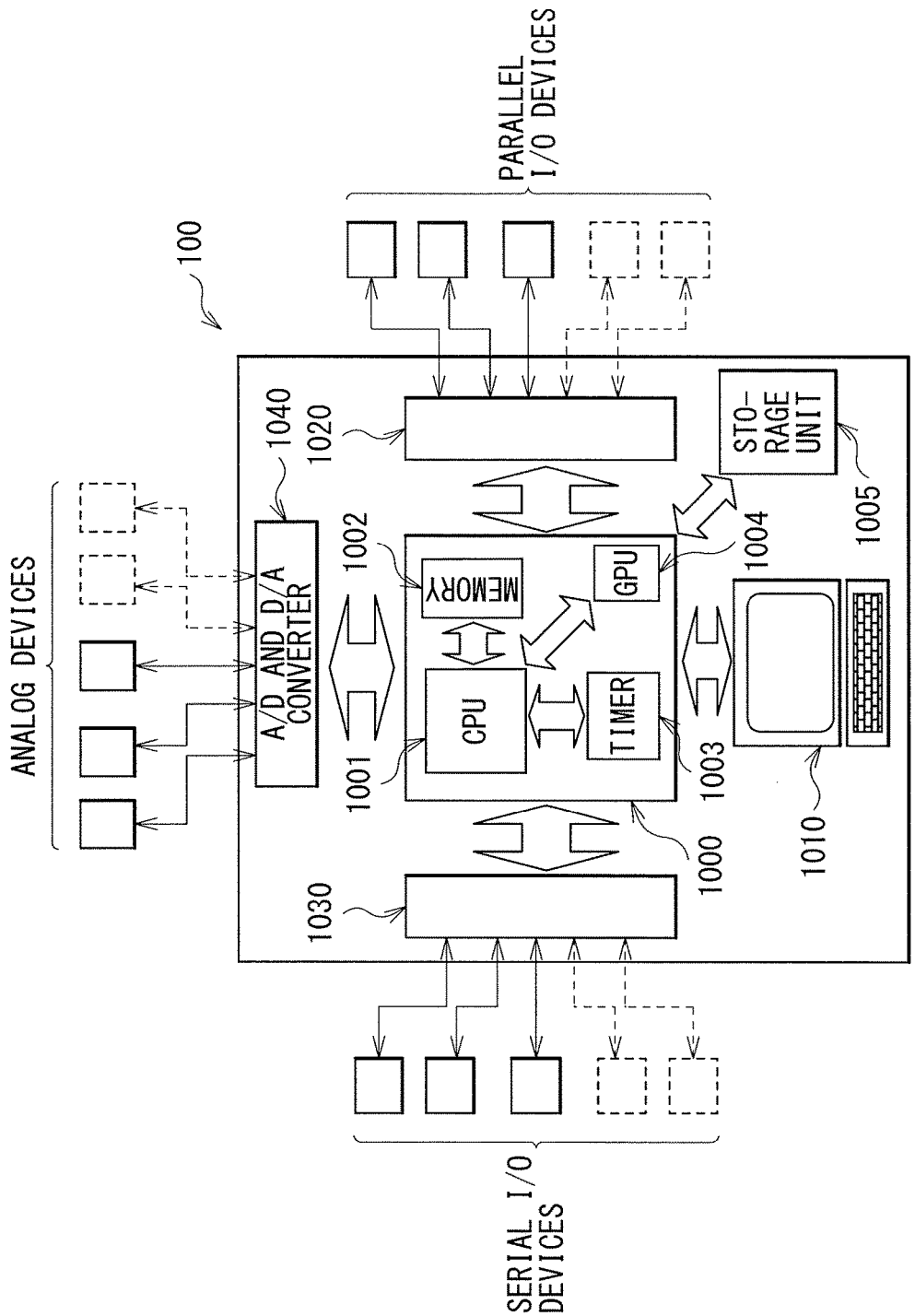
FIG. 41 illustrates an example of a hardware environment of a controller.

FIG. 41 is a block diagram illustrating an exemplary hardware environment in which various aspects of any subject matter disclosed therein may be executed. An exemplary hardware environment 100 in FIG. 41 may include a processing unit 1000, a storage unit 1005, a user interface 1010, a parallel input/output (I/O) controller 1020, a serial I/O controller 1030, and an analog-to-digital (A/D) and digital-to-analog (D/A) converter 1040. Note that the configuration of the hardware environment 100 is not limited thereto.

The processing unit 1000 may include a central processing unit (CPU) 1001, a memory 1002, a timer 1003, and a graphics processing unit (GPU) 1004. The memory 1002 may include a random access memory (RAM) and a read only memory (ROM). The CPU 1001 may be any commercially-available processor. A dual microprocessor or any other multi-processor architecture may be used as the CPU 1001.

The components illustrated in FIG. 41 may be coupled to one another to execute any process described in any example embodiment of the present disclosure.

Upon operation, the processing unit 1000 may load programs stored in the storage unit 1005 to execute the loaded programs. The processing unit 1000 may read data from the storage unit 1005 together with the programs, and may write data in the storage unit 1005. The CPU 1001 may execute the programs loaded from the storage unit 1005. The memory 1002 may be a work area in which programs to be executed by the CPU 1001 and data to be used for operation of the CPU 1001 are held temporarily. The timer 1003 may measure time intervals to output a result of the measurement to the CPU 1001 in accordance with the execution of the programs. The GPU 1004 may process image data in accordance with the programs loaded from the storage unit 1005, and may output the processed image data to the CPU 1001.

The parallel I/O controller 1020 may be coupled to parallel I/O devices operable to perform communication with the processing unit 1000, and may control the communication performed between the processing unit 1000 and the parallel I/O devices. Non-limiting examples of the parallel I/O devices may include the rotation stage 14, the linear stage 63, the laser controller 2, the wafer data acquisition controller 3, the exposure unit controller 5, the energy controller 6, the spectrum controller 7, the beam measurement controller 8, and the gas controller 9. The serial I/O controller 1030 may be coupled to a plurality of serial I/O devices operable to perform communication with the processing unit 1000, and may control the communication performed between the processing unit 1000 and the serial I/O devices. Non-limiting examples of serial I/O devices may include the laser controller 2, the water data acquisition controller 3, the exposure unit controller 5, the energy controller 6, the spectrum controller 7, the beam measurement controller 8, and the gas controller 9. The A/D and D/A converter 1040 may be coupled to various kinds of sensors and analog devices through respective analog ports. Non-limiting examples of the analog devices may include the image sensors 411, 421, and 431, the image sensor 344, and the optical sensor 332. The A/D and D/A converter 1040 may control communication performed between the processing unit 1000 and the analog devices, and may perform analog-to-digital conversion and digital-to-analog conversion of contents of the communication.

The user interface 1010 may provide an operator with display showing a progress of the execution of the programs executed by the processing unit 1000, such that the operator is able to instruct the processing unit 1000 to stop execution of the programs or to execute an interruption routine.

The exemplary hardware environment 100 may be applied to one or more of configurations of the exposure unit controller 5, the laser controller 2, and other controllers according to any example embodiment of the present disclosure. A person skilled in the art will appreciate that such controllers may be executed in a distributed computing environment, namely, in an environment where tasks may be performed by processing units linked through any communication network. In any example embodiment of the present disclosure, controllers such as the exposure unit controller 5 and the laser controller 2 may be coupled to one another through a communication network such as Ethernet (Registered Trademark) or the Internet. In the distributed computing environment, the program module may be stored in each of local and remote memory storage devices.

6. Et Cetera

The foregoing description is intended to be merely illustrative rather than limiting. It should therefore be appreciated that variations may be made in example embodiments of the present disclosure by persons skilled in the art without departing from the scope as defined by the appended claims.

The terms used throughout the specification and the appended claims are to be construed as "open-ended" terms. For example, the term "include" and its grammatical variants are intended to be non-limiting, such that recitation of items in a list is not to the exclusion of other like items that can be substituted or added to the listed items. The term "have" and its grammatical variants are intended to be non-limiting, such that recitation of items in a list is not to the exclusion of other like items that can be substituted or added to the listed items. Also, the singular forms "a", "an", and "the" used in the specification and the appended claims include plural references unless expressly and unequivocally limited to one referent.

What is claimed is:

1. A laser unit management system, comprising:
    a server configured to hold first information, second information, and third information, the first information being provided with access limitation that allows an access with a first access authorization, the second information being provided with access limitation that allows an access with a second access authorization, and the third information being provided with access limitation that allows both an access with the first access authorization and an access with the second access authorization; and
    a laser unit including a laser output section and a controller,
        the laser output section being configured to output pulsed laser light toward an exposure unit that is configured to perform wafer exposure,
        the controller being configured to receive a light emission trigger signal from the exposure unit, control the laser output section based on the light emission trigger signal, and store the first information, the second information, and the third information in the server,
    wherein the second information includes wafer-exposure-related information on the exposure unit and laser-control-related information on the laser unit that are in association with each other, the wafer-exposure-related information including wafer-identification information and scan-identification information both received from the exposure unit, the wafer-identification information being related to a wafer on which the wafer exposure is to be performed, and the scan-identification information being related to scan exposure included in the wafer exposure.

2. The laser unit management system according to claim 1, wherein the first information includes data of a control parameter related to control of the laser unit.

3. The laser unit management system according to claim 2, wherein
    the laser output section includes a laser chamber to which a laser gas is to be fed, and
    the control parameter includes one or more of:
    an energy control parameter related to control of pulse energy of the pulsed laser light;

a spectrum control parameter related to control of a wavelength of the pulsed laser light; and a gas control parameter related to control of the laser gas.

4. The laser unit management system according to claim 1, wherein the third information includes log data related to the laser unit.

5. The laser unit management system according to claim 4, wherein the log data includes a shot number of the pulsed laser light and the laser-control-related information that are in association with each other.

6. The laser unit management system according to claim 4, wherein the log data includes data of a total shot number of the pulsed laser light.

7. The laser unit management system according to claim 1, wherein
the laser output section includes a laser chamber to which a laser gas is to be fed, and
the laser-control-related information includes one or more of:
beam-measurement-related data including a beam profile and a beam pointing of the pulsed laser light;
energy-control-related data related to control of pulse energy of the pulsed laser light;
spectrum-control-related data related to control of a wavelength of the pulsed laser light; and
gas-control-related data related to control of the laser gas.

8. The laser unit management system according to claim 1, wherein the laser unit includes a memory section configured to delete the second information after a lapse of a predetermined time period.

9. The laser unit management system according to claim 8, wherein the predetermined time period is set with the second access authorization.

10. The laser unit management system according to claim 1, wherein a range of contents in the second information is changeable with the second access authorization.

11. The laser unit management system according to claim 1, wherein a range of contents in the first information is changeable with the first access authorization.

12. The laser unit management system according to claim 1, wherein the controller is configured to perform:
a first control to read data of a control parameter that is set for controlling the laser unit;
a second control to receive the wafer-exposure-related information from the exposure unit;
a third control to receive the laser-control-related information including measured data obtained by measuring the pulsed laser light;
a fourth control to store the data of the control parameter as the first information to be provided with the access limitation that allows the access with the first access authorization;
a fifth control to store the wafer-exposure-related information and the laser-control-related information in association with each other as the second information to be provided with the access limitation that allows the access with the second access authorization; and
a sixth control to store the laser-control-related information as the third information to be provided with the access limitation that allows both the access with the first access authorization and the access with the second access authorization.

13. The laser unit management system according to claim 12, wherein
the third control includes receiving the laser-control-related information in synchronization with the wafer-exposure-related information, and
the fifth control includes storing the wafer-exposure-related information and the laser-control-related information that is received in synchronization with the wafer-exposure-related information in association with each other as the second information.

* * * * *